US011225774B2

(12) United States Patent
Horii

(10) Patent No.: US 11,225,774 B2
(45) Date of Patent: Jan. 18, 2022

(54) WORKING MACHINE

(71) Applicant: KUBOTA CORPORATION, Osaka (JP)

(72) Inventor: Hiroshi Horii, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/453,508

(22) Filed: Jun. 26, 2019

(65) Prior Publication Data

US 2019/0338493 A1 Nov. 7, 2019

Related U.S. Application Data

(63) Continuation of application No. PCT/JP2018/024955, filed on Jun. 29, 2018.

(30) Foreign Application Priority Data

| Jul. 18, 2017 | (JP) | JP2017-139421 |
| Jul. 18, 2017 | (JP) | JP2017-139422 |
| Jul. 18, 2017 | (JP) | JP2017-139423 |
| Jul. 18, 2017 | (JP) | JP2017-139424 |
| Jul. 18, 2017 | (JP) | JP2017-139425 |
| Jul. 18, 2017 | (JP) | JP2017-139426 |
| Jul. 18, 2017 | (JP) | JP2017-139427 |
| Jul. 18, 2017 | (JP) | JP2017-139428 |
| Jul. 18, 2017 | (JP) | JP2017-139429 |
| Jul. 18, 2017 | (JP) | JP2017-139430 |

(Continued)

(51) Int. Cl.
*E02F 9/16* (2006.01)
*B60K 26/02* (2006.01)
(Continued)

(52) U.S. Cl.
CPC ............. *E02F 9/166* (2013.01); *B60K 26/02* (2013.01); *B60N 2/06* (2013.01); *B60N 2/12* (2013.01);
(Continued)

(58) Field of Classification Search
CPC . E02F 9/166; E02F 9/16; B60K 26/02; B60K 26/00; B62D 33/073; B62D 49/0692
See application file for complete search history.

(56) References Cited

U.S. PATENT DOCUMENTS 2,226,192 A 12/1940 Barreti
4,392,546 A * 7/1983 Brown .................... B60N 2/162
180/326

(Continued)

FOREIGN PATENT DOCUMENTS

CN 102019853 A 4/2011
CN 202809687 U 3/2013
(Continued)

*Primary Examiner* — Faye M Fleming
(74) *Attorney, Agent, or Firm* — Birch, Stewart, Kolasch & Birch, LLP

(57) ABSTRACT

A working machine according to an embodiment of the present invention includes an operator seat, an operation base arranged in front of the operator seat, an operation member arranged on the operation base and configured to be gripped and moved, and an armrest member extending from the operation base toward a side of the operator seat.

18 Claims, 61 Drawing Sheets

(30) Foreign Application Priority Data

| Jul. 18, 2017 | (JP) | JP2017-139431 |
|---|---|---|
| Jul. 18, 2017 | (JP) | JP2017-139432 |
| Jul. 18, 2017 | (JP) | JP2017-139433 |
| Dec. 22, 2017 | (JP) | JP2017-247023 |
| Jun. 29, 2018 | (JP) | JP2018-124381 |

(51) Int. Cl.
| | |
|---|---|
| *B60N 2/06* | (2006.01) |
| *B60N 2/12* | (2006.01) |
| *B60N 2/24* | (2006.01) |
| *B60N 2/50* | (2006.01) |
| *B60N 2/64* | (2006.01) |
| *B60R 1/00* | (2006.01) |
| *B62D 33/06* | (2006.01) |
| *E02F 9/02* | (2006.01) |
| *E02F 9/20* | (2006.01) |
| *E02F 9/26* | (2006.01) |
| *G05G 1/04* | (2006.01) |
| *G05G 1/445* | (2008.04) |
| *G05G 1/60* | (2008.04) |
| *G05G 1/62* | (2008.04) |
| *G05G 5/04* | (2006.01) |
| *G05G 5/05* | (2006.01) |
| *E02F 3/32* | (2006.01) |
| *E02F 3/96* | (2006.01) |
| *E02F 9/08* | (2006.01) |

(52) U.S. Cl.
CPC ............. *B60N 2/24* (2013.01); *B60N 2/505* (2013.01); *B60N 2/64* (2013.01); *B60R 1/00* (2013.01); *B62D 33/0617* (2013.01); *E02F 9/02* (2013.01); *E02F 9/2004* (2013.01); *E02F 9/26* (2013.01); *G05G 1/04* (2013.01); *G05G 1/445* (2013.01); *G05G 1/60* (2013.01); *G05G 1/62* (2013.01); *G05G 5/04* (2013.01); *G05G 5/05* (2013.01); *B60R 2300/20* (2013.01); *E02F 3/325* (2013.01); *E02F 3/964* (2013.01); *E02F 9/0866* (2013.01); *G05G 2505/00* (2013.01)

(56) References Cited

U.S. PATENT DOCUMENTS

| 4,821,837 | A * | 4/1989 | Fifer | E02F 9/2004 |
| | | | | 180/334 |
| 5,409,079 | A * | 4/1995 | Strong | B60K 20/00 |
| | | | | 180/326 |
| 6,450,284 | B1 * | 9/2002 | Sakyo | E02F 9/26 |
| | | | | 180/329 |
| 6,971,279 | B2 * | 12/2005 | Jo | E02F 9/2004 |
| | | | | 180/269 |
| 8,356,858 | B2 * | 1/2013 | Jang | B62D 33/0604 |
| | | | | 296/190.07 |
| 8,979,175 | B2 * | 3/2015 | Kim | B62D 33/073 |
| | | | | 296/190.04 |
| 9,745,719 | B1 * | 8/2017 | Boyce | E02F 9/2004 |
| 9,982,415 | B2 * | 5/2018 | Yamada | E02F 9/166 |
| 2003/0221402 | A1 | 12/2003 | Veike et al. | |
| 2008/0103019 | A1 | 5/2008 | Cronin et al. | |
| 2008/0290694 | A1 * | 11/2008 | Spellmeyer | B60N 2/753 |
| | | | | 296/190.01 |
| 2012/0318602 | A1 | 12/2012 | Bada Ghar Wala | |
| 2017/0120751 | A1 | 5/2017 | Anderton et al. | |

FOREIGN PATENT DOCUMENTS

| CN | 203358352 U | 12/2013 |
| CN | 203514155 U | 4/2014 |
| CN | 104066895 A | 9/2014 |
| JP | 3-68058 U | 7/1991 |
| JP | 3-118420 U | 12/1991 |
| JP | 6-108494 A | 4/1994 |
| JP | 7-6217 B2 | 1/1995 |
| JP | 7-216936 A | 8/1995 |
| JP | 9-105141 A | 4/1997 |
| JP | 10-17289 A | 1/1998 |
| JP | 10-131235 A | 5/1998 |
| JP | 10-131762 A | 5/1998 |
| JP | 10-252473 A | 9/1998 |
| JP | 11-13084 A | 1/1999 |
| JP | 11-93206 A | 4/1999 |
| JP | 11-158923 A | 6/1999 |
| JP | 11-193548 A | 7/1999 |
| JP | 2000-309945 A | 11/2000 |
| JP | 2002-21803 A | 1/2002 |
| JP | 2002-97670 A | 4/2002 |
| JP | 2002-322883 A | 11/2002 |
| JP | 2004-100759 A | 4/2004 |
| JP | 2004-108672 A | 4/2004 |
| JP | 2004-308132 A | 11/2004 |
| JP | 2005-163331 A | 6/2005 |
| JP | 3662636 B2 | 6/2005 |
| JP | 2006-70456 A | 3/2006 |
| JP | 2007-16415 A | 1/2007 |
| JP | 2007-126898 A | 5/2007 |
| JP | 4097055 B2 | 6/2008 |
| JP | 2008-230314 A | 10/2008 |
| JP | 2009-234365 A | 10/2009 |
| JP | 2010-84329 A | 4/2010 |
| JP | 2010-117046 A | 5/2010 |
| JP | 2010-168838 A | 8/2010 |
| JP | 2010-275735 A | 12/2010 |
| JP | 4606293 B2 | 1/2011 |
| JP | 4608088 B2 | 1/2011 |
| JP | 4753496 B2 | 8/2011 |
| JP | 2013-109582 A | 6/2013 |
| JP | 2014-84713 A | 5/2014 |
| JP | 2015-132055 A | 7/2015 |
| JP | 2016-69794 A | 5/2016 |
| JP | 2016-125432 A | 7/2016 |
| JP | 2018-204889 A | 12/2016 |
| JP | 2017-8582 A | 1/2017 |
| JP | 2017-53282 A | 3/2017 |
| JP | 2017-66789 A | 4/2017 |
| JP | 2017-66860 A | 4/2017 |
| JP | 2017-96006 A | 6/2017 |
| WO | WO 2009/010818 A2 | 1/2009 |
| WO | WO 2014/181488 A | 11/2014 |
| WO | WO 2017/075343 A1 | 5/2017 |

* cited by examiner

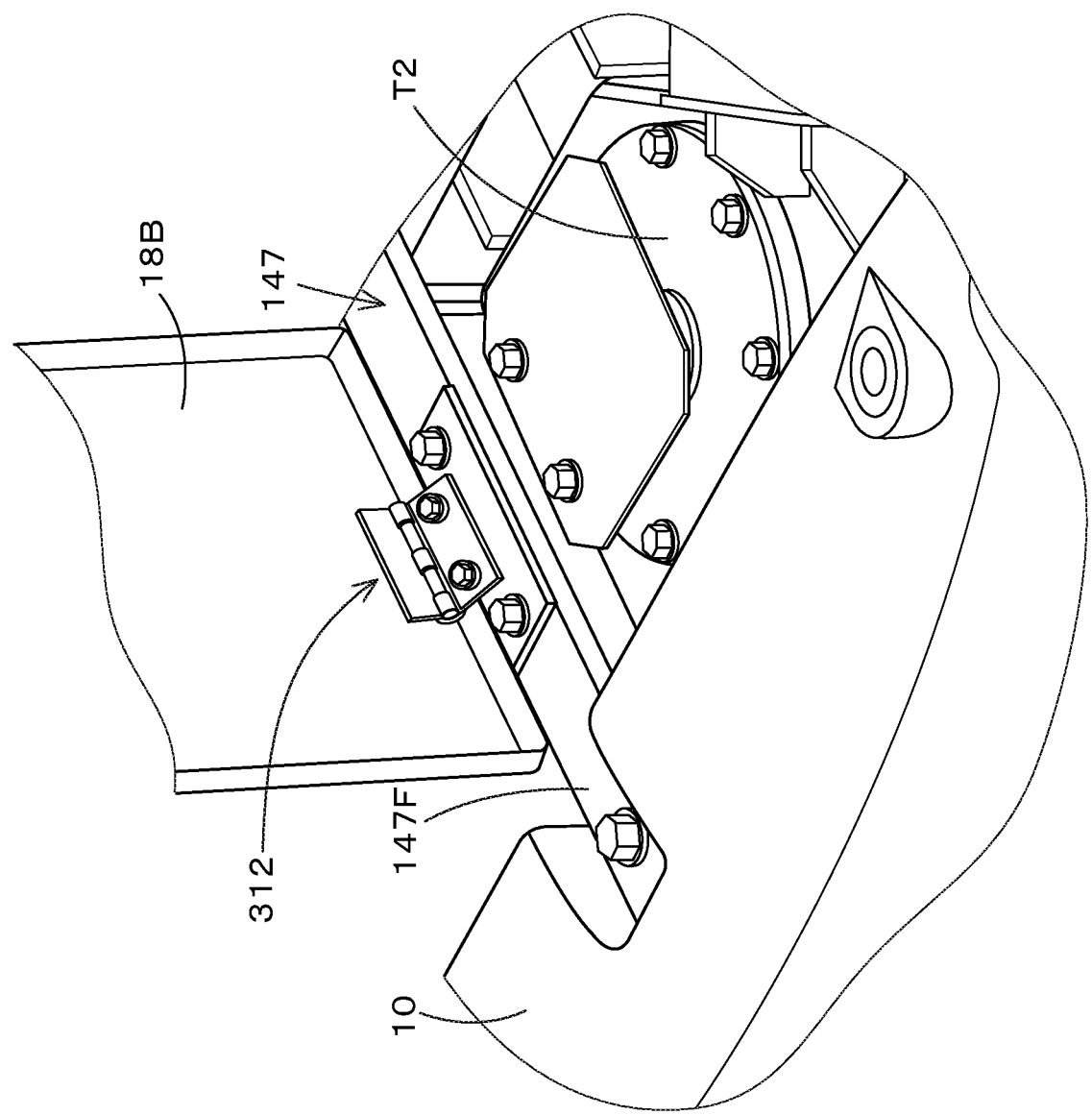

WORKING MACHINE

CROSS-REFERENCE TO RELATED APPLICATIONS

The present application is a continuation application of International Application No. PCT/JP2018/24955, filed Jun. 29, 2018, which claims priority to Japanese Patent Application No. 2017/139421, filed Jul. 18, 2017, to Japanese Patent Application No. 2017/139422, filed Jul. 18, 2017, to Japanese Patent Application No. 2017/139423, filed Jul. 18, 2017, to Japanese Patent Application No. 2017/139424, filed Jul. 18, 2017, to Japanese Patent Application No. 2017/139425, filed Jul. 18, 2017, to Japanese Patent Application No. 2017/139426, filed Jul. 18, 2017, to Japanese Patent Application No. 2017/139427, filed Jul. 18, 2017, to Japanese Patent Application No. 2017/139428, filed Jul. 18, 2017, to Japanese Patent Application No. 2017/139429, filed Jul. 18, 2017, to Japanese Patent Application No. 2017/139430, filed Jul. 18, 2017, to Japanese Patent Application No. 2017/139431, filed Jul. 18, 2017, to Japanese Patent Application No. 2017/139432, filed Jul. 18, 2017, to Japanese Patent Application No. 2017/139433, filed Jul. 18, 2017, to Japanese Patent Application No. 2017/247023, filed Dec. 22, 2017, and to Japanese Patent Application No. 2018/124381, filed Jun. 29, 2018. The contents of these applications are incorporated herein by reference in their entirety.

FIELD OF THE INVENTION

The present invention relates to a working machine such as a backhoe.

DISCUSSION OF THE BACKGROUND

Working machines disclosed in Patent Documents 1 to 9 are conventionally known.

The working machine disclosed in Japanese Unexamined Patent Application Publication No. 2007-126898 includes an operator seat and a operation base provided in front of the operator seat. The operation base is provided with an operation member configured to be gripped to be operated.

Further, the working machine disclosed in Japanese Unexamined Patent Application Publication No. 2007-126898 includes an operator seat supported on a floor portion by a seat stand, a lever stand arranged in front of the operator seat, and a pedal arranged in front of the operator seat. In this manner, the operator extends his/her legs forward from the operator seat to operate the pedals.

In the working machine disclosed in Japanese Patent Publication No. 4606293, the cabin is mounted on one side portion of the machine body in the width direction, and the prime mover is mounted on the other side portion of the machine body in the width direction.

Further, the working machine disclosed in Japanese Patent Publication No. 4606293 has the machine body configured to be turned about a turn shaft extending in the vertical direction. An operator seat is mounted on one side portion of the machine body, and the prime mover is arranged longitudinally on the other side portion of the machine body. A fuel tank is mounted on the machine body, and the fuel tank is arranged below the operator seat.

The working machine disclosed in Japanese Unexamined Patent Application Publication No. 2015-132055 includes an machine body and a cabin mounted on the machine body. A weight is provided behind a lower portion of the cabin.

The working machine disclosed in Japanese Patent Publication No. 4608088 has an machine body configured to be turned about a turn shaft. A cabin is mounted on the machine body, and the machine body is provided with a support bracket protruding forward. A swing bracket is supported swingably in a machine width direction by the support bracket, and a boom is supported swingably upward and downward by the swing bracket. A base portion of the boom is laterally offset with respect to the cabin, and the boom can stand up to the side portion of the cabin.

The working machine disclosed in Japanese Unexamined Patent Application Publication No. 2009-234365 is provided with a monitor at a position shifted in the lateral direction in front of the operator seat.

The working machine disclosed in Japanese Unexamined Patent Application Publication No. 2010-168838 is provided with a prime mover mounted on a base plate that constitutes the bottom portion of the machine body. In addition, a bonnet covering the prime mover is mounted on the machine body, and the outside air is introduced into the bonnet by a cooling fan and thereby the prime mover is cooled by a cooling air generated by the cooling fan.

The working machine disclosed in Japanese Patent Publication No. 4606293 is provided with an machine body, and an operator seat and a prime mover are mounted on the machine body. The prime mover is arranged in a longitudinal direction on the side of the operator seat. The prime mover is covered with the hood.

Further, in the working machine disclosed in Japanese Patent Publication No. 4606293, the prime mover is mounted in the longitudinal direction on a base plate that constitutes the bottom portion of the machine body. A hydraulic pump is attached to the rear portion of the prime mover.

The working machine disclosed in Japanese Unexamined Patent Application Publication No. 2010-117046 has an machine body, and the machine body is provided with a radiator and an oil cooler arranged opposed to the radiator. The radiator is attached to the radiator bracket, and the oil cooler is attached to the oil cooler bracket. The lower part of the radiator bracket is pivotally supported by a pivotally-supporting portion provided to a lower portion of the oil cooler bracket, and an upper portion of the oil cooler bracket is detachably fixed to the radiator bracket.

The hydraulic fluid tank structure disclosed in Japanese Unexamined Patent Application Publication No. 2000-309945 has a tank body for storing the hydraulic fluid. The tank body is provided with a suction pipe for letting out the hydraulic fluid stored in the lower chamber, and a return pipe for letting the returning hydraulic fluid into the upper chamber, the returning hydraulic fluid returning to the tank body.

SUMMARY OF THE INVENTION

A working machine according to an embodiment of the present invention includes an operator seat, an operation base arranged in front of the operator seat, an operation member arranged on the operation base and configured to be gripped and moved, and an armrest member extending from the operation base toward a side of the operator seat.

A working machine according to another embodiment of the present invention includes a floor portion, an operator seat arranged on the floor portion, and a footrest on which a foot of an operator can be placed, the footrest is provided on the floor portion and on a side of the operator seat.

A working machine according to further another embodiment of the present invention includes a machine body, an operating portion mounted on one side portion of the machine body in a width direction, the operating portion having an operator seat and an operation device. The working machine includes a prime mover mounted on the other side portion of the machine body in the width direction, and a hydraulic device arrangement portion in which a hydraulic device is arranged, the hydraulic device arrangement portion is provided between the operating portion and the prime mover.

A working machine according to further another embodiment of the present invention includes a machine body configured to turn about a turn shaft extending in a vertical direction, an operator seat mounted on one side portion of the machine body, a prime mover arranged on the other side portion of the machine body, and a fuel tank mounted on the machine body behind the operator seat. The fuel tank has a width extending in a height direction, the width being wider than a width extending in a machine width direction and a width extending in a front-rear direction of the machine body.

A working machine according to further another embodiment of the present invention includes a machine body, an operating portion mounted on the machine body, the operating portion having an operator seat and an operation device, a rear mounting member arranged behind the operating portion of the machine body, and a floor surface arranged behind the operating portion of the machine body and on a side of the rear mounting member. An upper space above the floor surface is opened toward an outside of the machine body.

A working machine according to further another embodiment of the present invention includes a machine body configured to turn about a turn shaft extending in a vertical direction, an operating portion mounted on the machine body, the operating portion including an operator seat and an operation device. The working machine includes a support bracket protruding forward and being arranged on the machine body, a swing bracket supported by the support bracket and configured to be swung about the swing shaft in a horizontal direction, and a boom pivotally supported by the swing bracket and configured to swing in the vertical direction. The operating portion is arranged on a portion closer to one side in a machine width direction from a center line passing through the turn shaft and extending in a front-rear direction. The swing shaft is arranged on a portion closer to the other side in the machine width direction from the operating portion.

A working machine includes an operator seat, a traveling device, and a traveling operation member configured to operate the traveling device in accordance with a pedaling operation. The traveling operation member includes a first traveling pedal arranged in front of one side portion of the operator seat in the machine width direction, and a second traveling pedal arranged in front of the other side portion of the operator seat in the machine width direction.

A working machine includes an operator seat, an operation base arranged in front of the operator seat, a first operation handle arranged on a portion closer to one side of the operation base from a center portion of the operation base in a machine width direction, a second operation handle arranged on a portion closer to the other side of the operation base from the center portion of the operation base in the machine width direction, and a monitor arranged between the first operation handle and the second operation handle.

A working machine according to further another embodiment of the present invention includes a base plate, a prime mover room formed on the base plate, a prime mover housed in the prime mover room, a cooling fan to generate a cooling airflow cooling the prime mover. The working machine includes a first discharging portion to discharge, to outside of the prime mover room, the cooling airflow flowing between the prime mover and a ceiling portion of the prime mover room, and a second discharging portion to discharge, to the outside of the prime mover room, the cooling airflow flowing between the prime mover and a bottom portion of the prime mover room.

A working machine according to further another embodiment of the present invention includes a machine body, an operator seat mounted on the machine body, a prime mover mounted on a side of the operator seat in the machine body, a first bonnet side portion covering a side of the prime mover on the operator seat side, and a covering member to cover an arrangement portion for devices provided between the first bonnet side portion and the operator seat. A side surface of the covering member on the prime mover side is arranged adjacent to and opposed to the first bonnet side portion.

A working machine according to further another embodiment of the present invention includes a machine body, a prime mover mounted on the machine body, a hydraulic pump attached to the prime mover, and a pump partition to separate a hydraulic device arrangement portion in which the hydraulic pump is arranged from the prime mover room housing the prime mover.

A working machine according to further another embodiment of the present invention includes a machine body, a radiator mounted on the machine body, an oil cooler arranged on a first position opposed to the radiator, a radiator bracket to which the radiator is attached, and an oil cooler bracket to which the oil cooler is attached. The oil cooler bracket is detachably attached to the radiator bracket and is configured to move the oil cooler to a position separating from the radiator and further from the first position when detached from the radiator bracket.

A working machine according to further another embodiment of the present embodiment includes a tank body to store an operation fluid, a partition wall separating an inside of the tank main body into an upper chamber arranged on an upper portion side and a lower chamber arranged on a lower portion side, a main passage to communicate the upper chamber and the lower chamber with each other, the main passage being provided on a center portion of the partition wall. The working machine further includes a suction pipe to output the operation fluid stored in the lower chamber to the outside of the tank, and a return pipe to supply, to the upper chamber, the operation fluid returning to the tank main body. The return pipe is arranged such that a flow direction of the operation fluid flowing from the return pipe to the upper chamber is directed to another direction other than the direction extending toward the main passage.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 61 is a perspective view illustrating an attachment portion of a second cover according to the embodiments.

DESCRIPTION OF THE EMBODIMENTS

Figure 1:
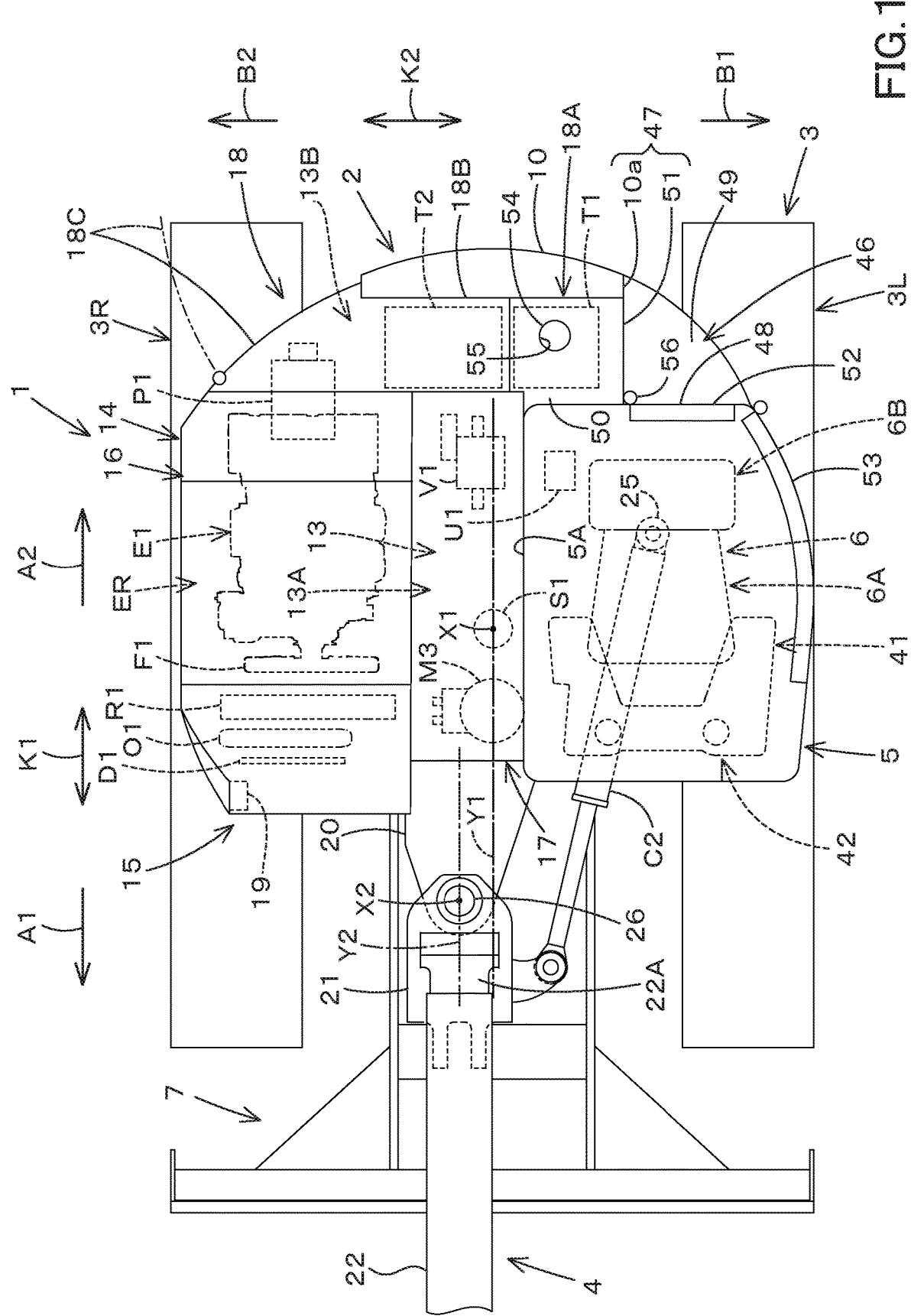
FIG. 1 is a plan view of a working machine according to embodiments of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments of the present invention will be described with reference to the drawings.

Figure 2:
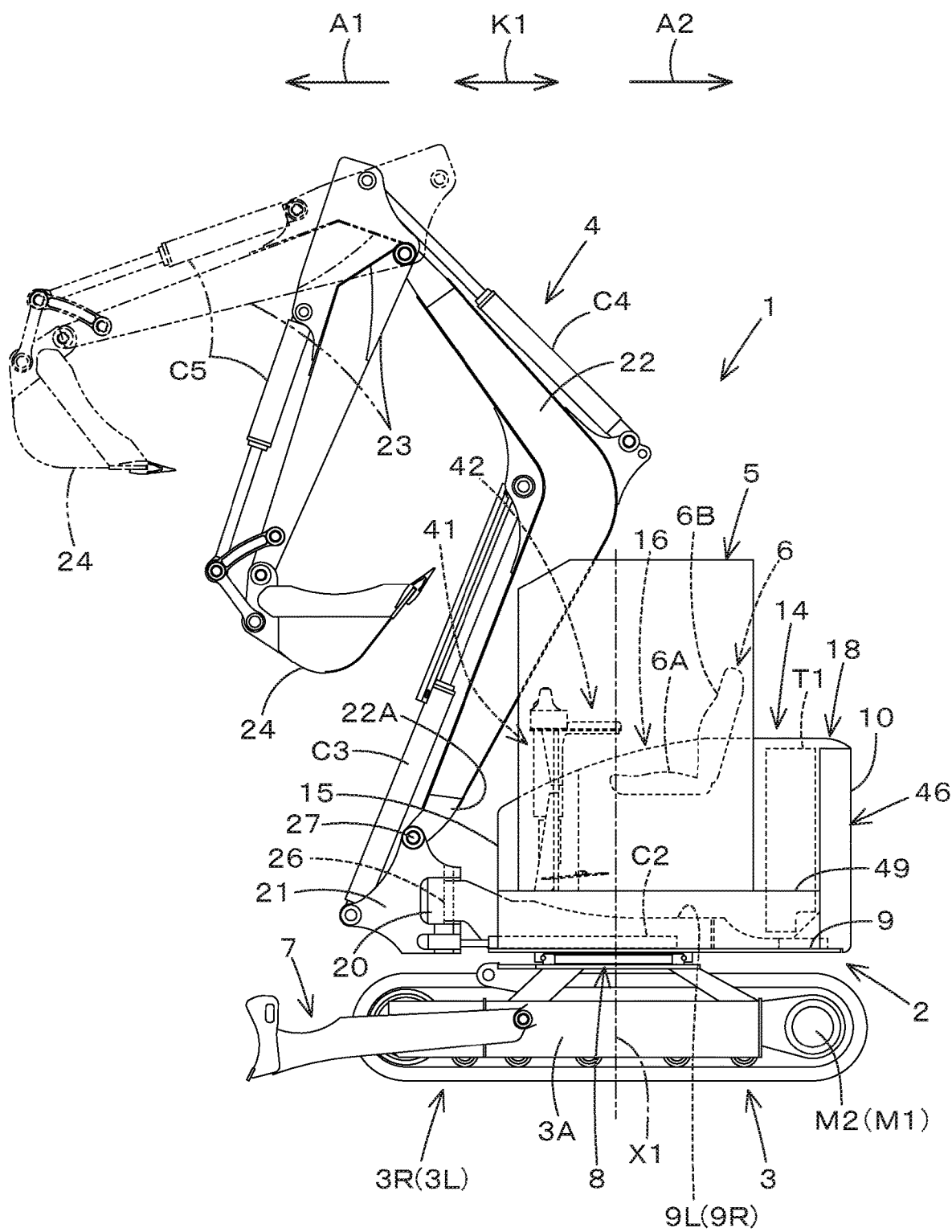
FIG. 2 is a side view of the working machine according to the embodiments.

FIG. 1 is a schematic plan view showing the overall configuration of a working machine 1 according to the present embodiment. FIG. 2 is a schematic side view of the working machine 1. In the present embodiment, a backhoe which is a turning working machine is illustrated as the working machine 1.

As shown to FIG. 1 and FIG. 2, the working machine 1 is provided with a machine body (turn base) 2, a traveling device 3, and a working device 4. A cabin 5 is mounted on the machine body 2. In the room of the cabin 5, an operator seat (a seat) 6 on which a driver (an operator) is seated is provided. In other words, the operator seat 6 is mounted on the machine body 2, and the cabin 5 surrounds the operator seat 6. The operator seat 6 has a seat portion 6A on which the operator is seated, and a backrest portion 6B on the operator's back is received.

In the embodiment of the present invention, the front side of the operator seated on the operator seat 6 of the working machine 1 (a direction indicated by an arrowed line A1 in FIG. 1 and FIG. 2) is referred to as the front, the rear side of the operator (a direction indicated by an arrowed line A2 in FIG. 1 and FIG. 2) is referred to as the rear, the left side of the operator (a direction indicated by an arrowed line B1 in FIG. 1) is referred to as the left, and the right side of the operator (a direction indicated by an arrowed line B2 in FIG. 1) is referred to as the right.

Further, as shown in FIG. 1, the horizontal direction which is a direction orthogonal to the front-rear direction K1 will be described as the machine width direction K2 (the width direction of the machine 2). The direction from the center portion in the width direction of the machine body 2 to the right portion or the left portion will be described as a machine outward direction (outward in the machine width direction). In other words, the machine outward direction is a direction separating away from the center in the width direction of the machine body 2 that is the machine width direction K2. The direction opposite to the machine outward direction is described as the machine inward direction (inward in the machine width direction). In other words, the machine inward direction is a direction approaching the center of the machine body 2, that is, the direction is the machine width direction K2.

As shown to FIG. 1 and FIG. 2, the traveling device 3 is a device which supports the machine body 2 so that the traveling of the machine body 2 can be performed. The traveling device 3 includes a traveling frame 3A, a first traveling device 3L arranged on the left side of the traveling frame 3A, and a second traveling device 3R arranged on the right side of the traveling frame 3A. The first travel device 3L and the second travel device 3R are crawler travel devices. The first traveling device 3L is driven by a first traveling motor M1. The second traveling device 3R is driven by a second traveling motor M2. The first traveling motor M1 and the second traveling motor M2 are constituted of hydraulic motors (hydraulic actuators).

At the front of the traveling device 3, a dozer device 7 is mounted. The dozer device 7 can move upward and downward (can move the blade upward and downward) by stretching and shortening the dozer cylinder (hydraulic actuator).

As shown in FIG. 2, the machine body 2 is pivotally supported on a traveling frame 3A by a pivot bearing 8 about a pivot axis X1. The pivot axis X1 is an axis extending in the vertical direction passing through the center of the pivot bearing 8.

Figure 3:
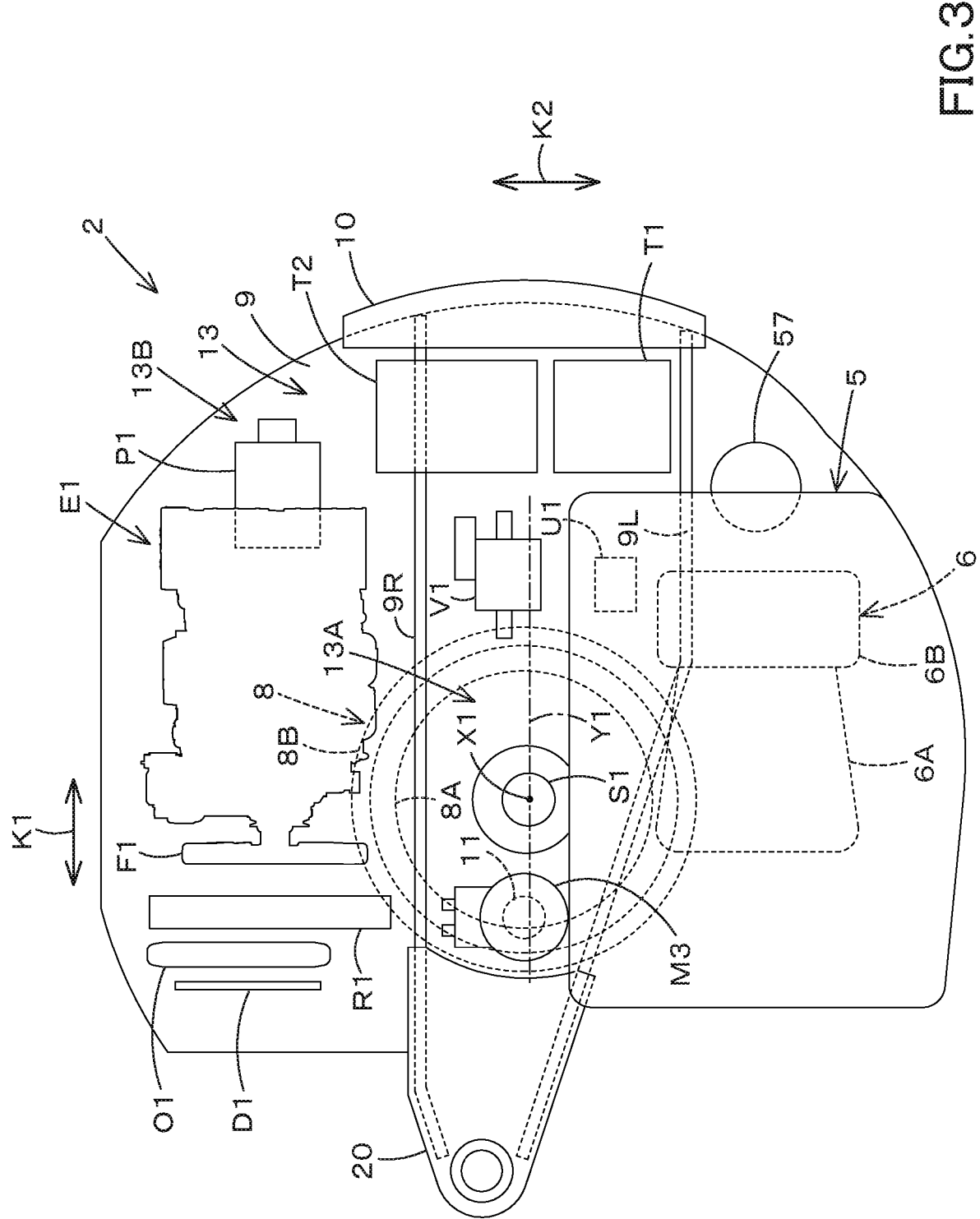
FIG. 3 is a plan view illustrating arrangement of a device and the like mounted on the working machine according to the embodiments.

As shown to FIG. 1 and FIG. 3, the cabin 5 is mounted in one side portion (left side portion) of the machine width direction K2 of the machine body 2. The cabin 5 is arranged closer to one side (left side) of the machine width direction K2 than a center line Y1 passing through the pivot axis X1 and extending in the front-rear direction K1. In addition, the cabin 5 is arranged on the machine body 2 near the front.

As shown to FIG. 1 and FIG. 3, the prime mover E1 is mounted on the other side portion (right side portion) of the machine width direction K2 of the machine body 2. The prime mover E1 is mounted on the machine body 2 in a vertical orientation. In the vertical orientation, the axis of the crankshaft of the prime mover E1 is arranged to extend in the front-rear direction.

The prime mover E1 is arranged closer to the other side (right side) in the machine width direction K2 than the center line Y1. The prime mover E1 is a diesel engine. The prime mover E1 may be a gasoline engine, an LPG engine or an electric prime mover, or may be a hybrid type having an engine and an electric prime mover.

A hydraulic pump P1 is provided at the rear of the prime mover E1. The hydraulic pump P1 is driven by the prime mover E1 to pressurize and discharge the hydraulic fluid used in the hydraulic drive portion. The hydraulic drive portion is, for example, a hydraulic actuator or the like provided in the working machine 1. A radiator R1, an oil cooler O1 and a condenser D1 are arranged in front of the prime mover E1 and mounted on the machine body 2.

The radiator R1 is a cooling device for cooling the cooling water of the prime mover E1, and the oil cooler O1 is a cooling device for cooling the hydraulic fluid. The condenser D1 is a cooling device (condenser) for cooling a refrigerant of an air conditioner (air conditioner) provided in the working machine 1.

The radiator R1 is arranged in front of the prime mover E1, and the oil cooler O1 is arranged at a position (first position) opposed to the front surface of the radiator R1. The condenser D1 is arranged to face the front of the oil cooler O1.

Between the radiator R1 and the prime mover E1, a cooling fan F1 for generating a cooling air for cooling the prime mover E1 is provided. The cooling fan F1 is driven by the prime mover E1 to generate the cooling air flowing from the front to the rear.

As shown in FIG. 2 and FIG. 3, the machine body 2 has a base plate (hereinafter referred to as a pivoting base plate) 9 which pivots about a pivot axis X1. The revolving base 9 is formed of a steel plate or the like, and constitutes the bottom of the machine body 2. The prime mover E1 is mounted on the swing base 9. On the center side of the upper surface of the turn base 9, vertical ribs 9L and 9R as reinforcing members are provided from the front to the rear. The vertical rib 9L is arranged closer to one side from the center in the machine width direction K2 of the machine body 2, and the vertical rib 9R is arranged closer to the other side. In addition to the vertical ribs 9L and 9R, a supporting member or the like for supporting a mounted object such as a device mounted on the machine body 2 is provided on the airing base plate 9, whereby a revolving frame serving as a framework of the machine body 2 is configured. The horizontal circumference of the pivoting frame is covered by the pivoting cover 12 (see FIG. 4 and FIG. 5).

At the rear portion of the machine body 2, a weight 10 is arranged. The weight 10 is arranged at the rear portion of the machine body 2 and the lower portion is attached to the turn base 9. Further, the weight 10 is protruded upward from the turn base 9. In addition, the weight 10 is arranged rearward from the cabin 5 and the operator seat 6.

Figure 4:
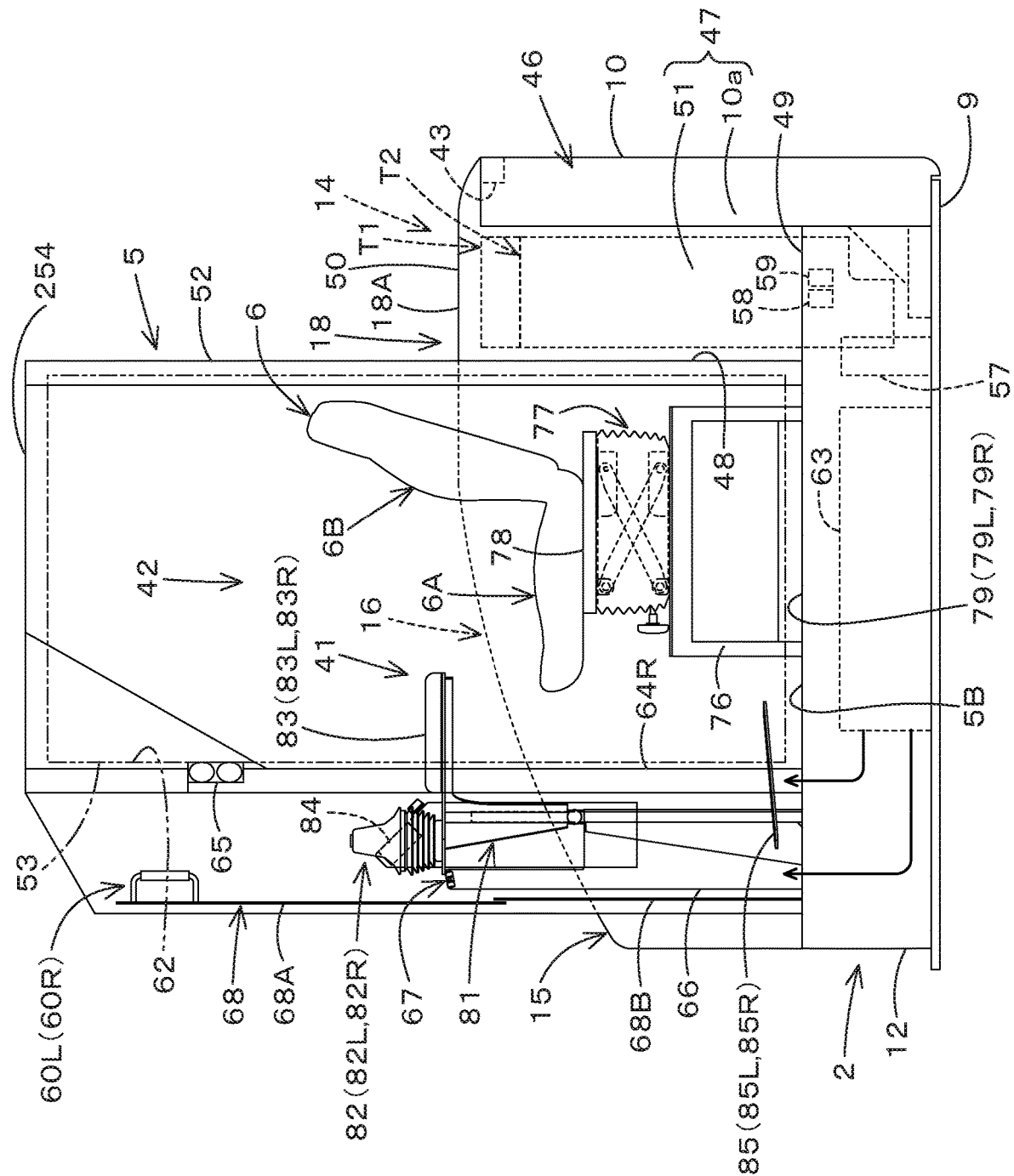
FIG. 4 is a side view of an upper portion of the working machine according to the embodiments.
Figure 5:
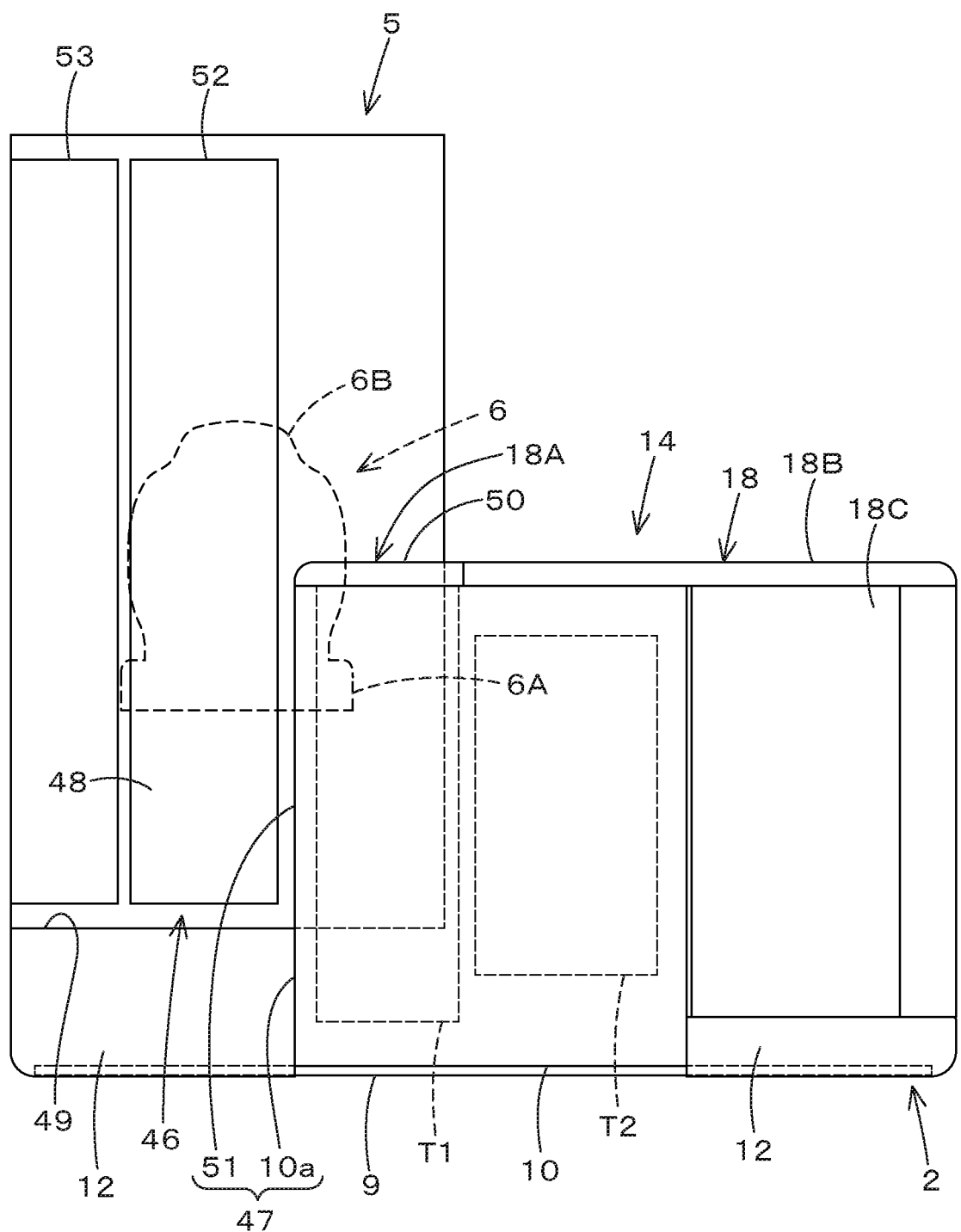
FIG. 5 is a back view of the upper portion of the working machine according to the embodiments.

As shown in FIG. 3, FIG. 4 and FIG. 5, the weight 10 is formed narrower than the width in the machine width direction K2 at the rear of the turn base 9 (approximately half the width of the rear of the machine 2), and is arranged on the center side of the turning board 9 in the machine width direction K2. The upper end of the weight 10 is located at the height position of the cabin 5 and the midway part of the operator seat 6. That is, the weight 10 is formed at a height from the turn base 9 to the midway position of the cabin 5 and the operator seat 6.

As shown in FIG. 1 to FIG. 3, a fuel tank T1 and a hydraulic fluid tank T2 which are arranged side by side along the machine width direction K2 are mounted at the rear of the machine body 2. The fuel tank T1 is a tank for storing the fuel of the prime mover E1. The hydraulic fluid tank T2 is a tank for storing hydraulic fluid. The fuel tank T1 and the hydraulic fluid tank T2 are arranged between the weight 10 and an operating portion 42 described later.

The fuel tank T1 and the hydraulic fluid tank T2 are arranged rearward of the cabin 5 and the operator seat 6. The fuel tank T1 and the hydraulic fluid tank T2 are attached to a mounting member whose lower portion is fixed to the turn base 9 and project upward from the turn base 9 (the lower part of the machine body 2). A weight 10 is arranged behind the fuel tank T1 and the hydraulic fluid tank T2. Further, the fuel tank T1 and the hydraulic fluid tank T2 are arranged to face the front of the weight 10 so as to be contained within the width of the weight 10 in the machine width direction K2. The fuel tank T1 is located on one side (left side) of the machine width direction K2 with respect to the hydraulic fluid tank T2, and the hydraulic fluid tank T2 is located on the other side (right side) of the machine width direction K2 with respect to the fuel tank T1.

As shown in FIG. 4 and FIG. 5, the upper ends of the fuel tank T1 and the hydraulic fluid tank T2 are positioned at the height position of the cabin 5 and the midway portion in the vertical direction of the operator seat 6 (substantially center portion in the vertical direction of the cabin 5). The upper end of the fuel tank T1 is substantially the same as the height position of the upper end of the weight 10, and the upper end of the hydraulic fluid tank T2 is lower than the upper end of the weight 10. In addition, the fuel tank T1 and the hydraulic fluid tank T2 have shapes that are relatively high in height and relatively small in cross-sectional area in the horizontal direction (longitudinal shapes), and more specifically, the fuel tank T1 and the hydraulic fluid tank T2 are formed to have a shape whose height in the vertical direction is larger than the width in the lateral direction and the width in the longitudinal direction. In this manner, even when the machine body 2 is inclined, the fuel in the fuel tank T1 can be appropriately supplied, and the fuel can be used effectively. The shape of the fuel tank T1 may be higher than the sum of the width in the left-right direction and the width in the front-rear direction.

Figure 6:
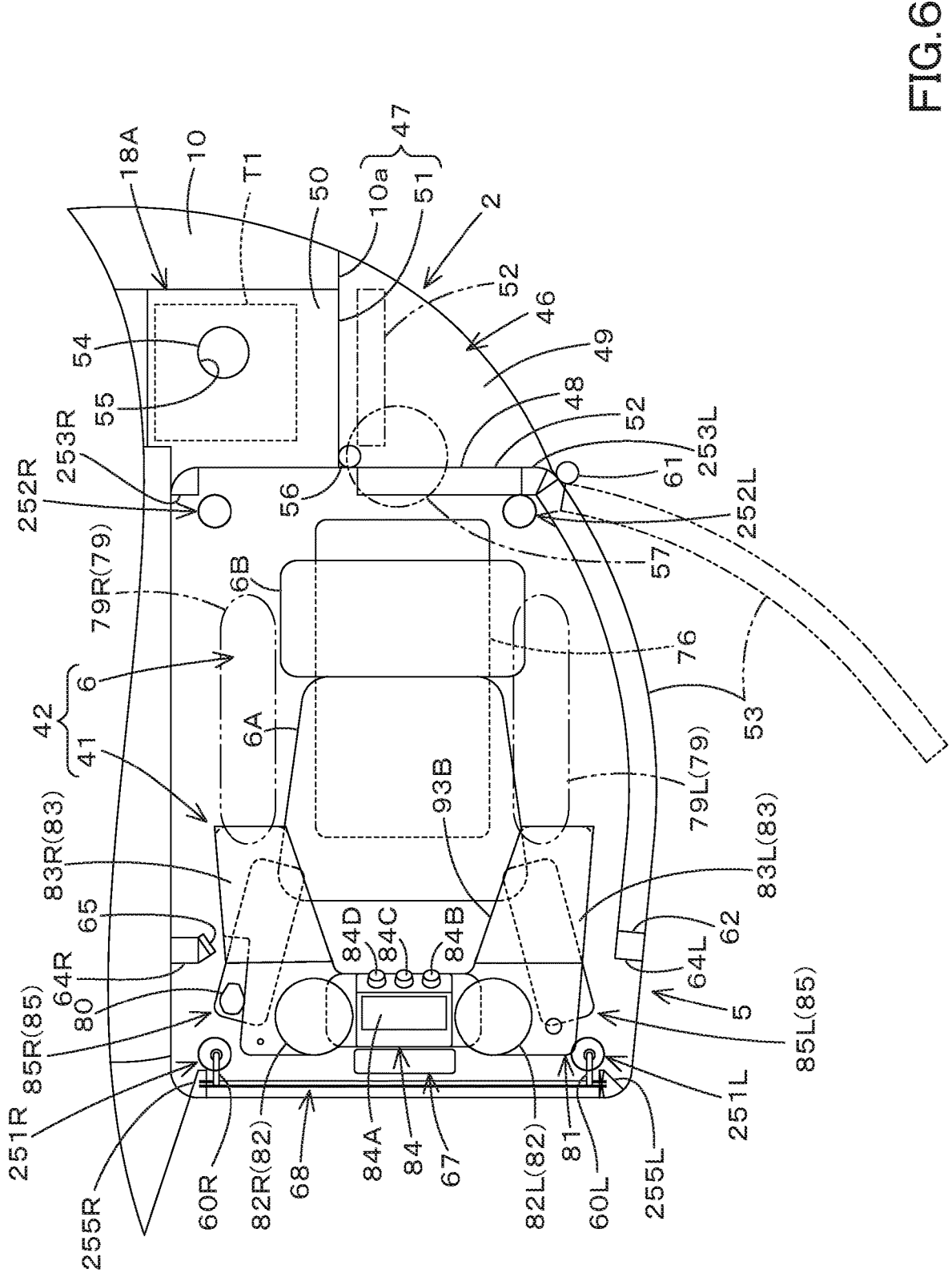
FIG. 6 is a plan view of a cabin according to the embodiments.

As shown in FIG. 4 to FIG. 6, a space 46 is provided behind the lower part of the cabin 5. The space 46 is formed on the rear side of the cabin 5 toward the outside of the vehicle. The space 46 is formed to have a first forming surface 47, a second forming surface 48, and a step (floor surface) 49.

The first forming surface 47 is formed of the side surface of the rear mounting member arranged rearward of the cabin 5. The side surface of the rear mounting member is a side located rearward of the lower portion of the cabin 5 and facing the exterior of the cabin. The rear mounting member is the first cover 18A and the weight 10 in the present embodiment. The first cover 18A is a cover member that covers the fuel tank T1, and is provided between the weight 10 and the operating portion 42. The first cover 18A also has an upper wall 50 covering the upper side of the fuel tank T1, and a side wall 51 covering the left side of the fuel tank T1. The side surface of the rear mounting member, that is, the first forming surface 47 is formed of the side surface of the first cover 18A (the outer surface of the side wall 51) and the left side surface 10a of the weight 10. The first forming surface 47 is located closer to the center in the width direction of the vehicle 2 than the center in the vehicle width direction K2 of the cabin 5. The first forming surface 47 is not limited to the configuration formed of the side surface of the first cover 18A and the side surface 10a of the weight 10, and may be formed of the side wall of the fuel tank (rear mounting member) T1, for example.

The second forming surface 48 is the back of the cabin 5.

The step 49 is provided on the lower end side of the cabin 5 and forms the lower surface of the space 46. That is, the space above the step (floor surface) 49 is the space 46. The step 49 is a member that forms the upper surface of the machine body 2 and allows an operator to step on. Further, the fuel tank T1 is arranged in the vicinity of the step 49.

As described above, the space 46 is formed of the first forming surface 47, the second forming surface 48, and the step 49 so as to be opened upwardly from the lower end of the cabin 5. The space 46 is also opened to the left (outside the vehicle) and to the rear.

As shown in FIG. 5, a rear window 52 capable of visually recognizing the rear of the cabin 5 from the room is provided on the rear side of the cabin 5. The rear window 52 is provided at the left of the rear of the cabin 5 (in the vehicle body side) and in front of the space 46. Further, the rear window 52 is formed from the top to the bottom of the cabin 5. The width of the rear window 52 in the machine width direction K2 is formed in a width from one end to the other end in the machine width direction K2 of the front of the space 46, and the lower portion of the rear window 52 corresponds to the space 46.

The rear window 52 can be opened and closed. As shown in FIG. 6, the rear window 52 is supported, at the right end side, by a hinge 56 rotatably about a longitudinal axis (axial center extending in the vertical direction). Thereby, the rear window 52 opens backward and intrudes into the space 46 as shown by a virtual line in FIG. 6. The rear window 52 may be a sliding or detachable window.

Further, step 49 is provided on the side of the fuel tank T1. As shown in FIG. 6, the upper wall portion 50 of the first cover 18A is provided at the upper portion (upper wall) of the fuel tank T1 and has an opening 55 formed above the fuel filler for fuel supplying. The opening 55 is closed by the lid member 54 so as to be openable and closable. In this manner, in the present embodiment, the position of the fuel filler port is high because the vertically long fuel tank T1 is mounted; however, the operator can easily refuel by stepping on the step 49 to carry out the fueling operation.

As shown in FIG. 4, the fuel supply device 57 for supplying fuel to the fuel tank T1 is provided in the machine body 2 below the step 49. The fuel supply device 57 has a fuel supply pump, a suction hose, and a fluid supply hose, sucks the fuel in the container for refueling through the suction hose with use of the fuel supply pump, and then feeds the sucked fuel to fuel tank T1 through the fuel supply hose.

Further, as shown in FIG. 4, a sedimenter 58 for removing water mixed in the fuel, a fuel pump 59 for sending the fuel to the prime mover E1, and the like are installed below the step 49 in the machine body 2.

In addition, the step 49 can be opened and closed, and by opening the step 49, the fuel supply device 57, the fuel pump 59, the sedimenter 58, and the like can be easily accessed. The opening and closing mechanism in the step 49 is not particularly limited, and may be, for example, hinged, sliding, or detachable.

As shown in FIG. 6, a door 53 is provided on the side (left side) of the cabin 5 on the vehicle body side of the cabin 5. The rear portion of the door 53 is supported by a hinge 61 rotatably about the longitudinal axis, and the front portion moves in the machine width direction K2 to open and close the entrance 62.

Figure 7:
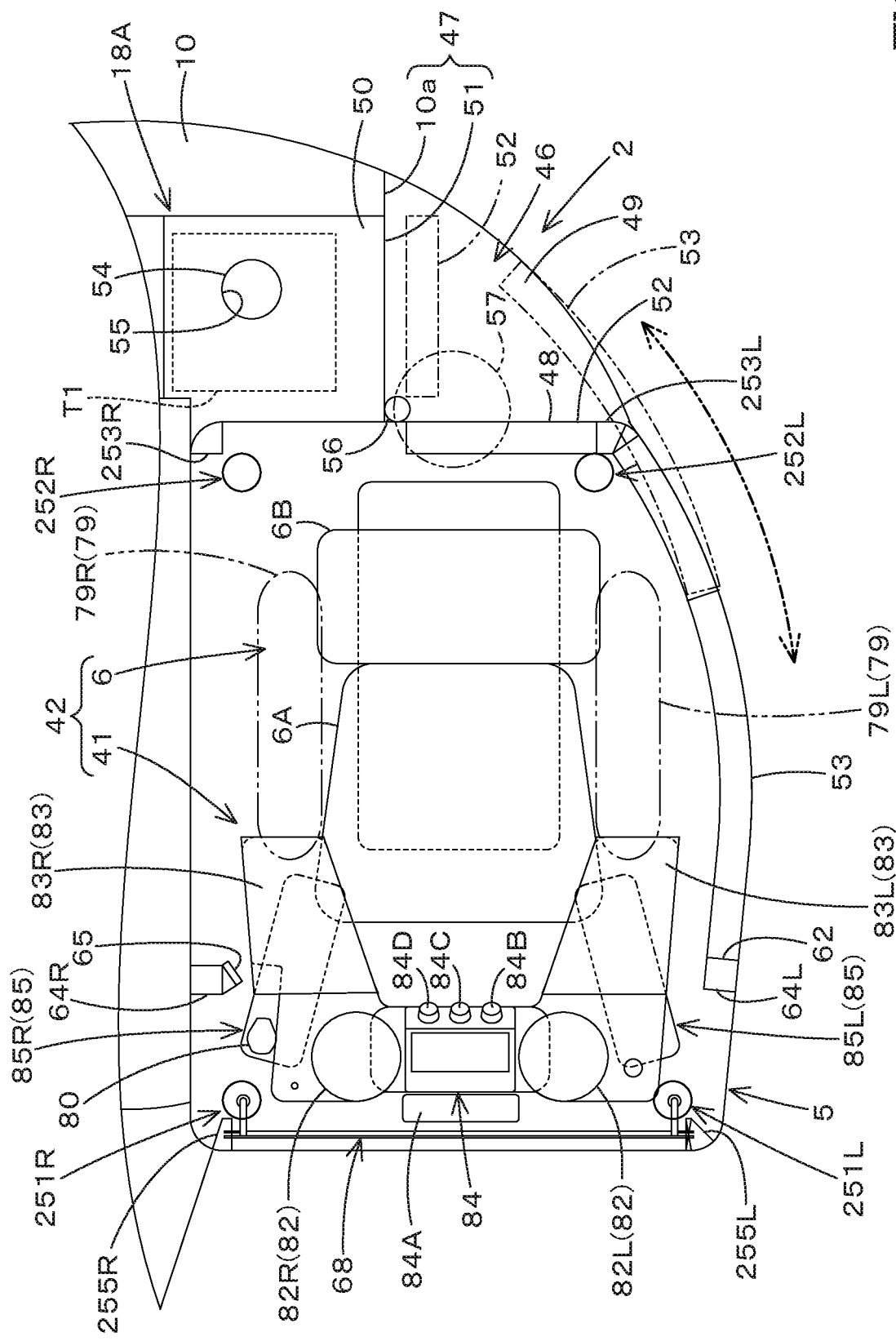
FIG. 7 is a plan view of a cabin according to another embodiment of the present invention.

In FIG. 7, the door 53 is replaced with a hinged door to be a slide door or a link door. The door 53 moves rearward along the cabin 5 and opens. Also, the door 53 opens to a position where the rear part enters (accommodates) the space 46. As a result, even when the turning operation is performed with the door 53 open, the door 53 is accommodated in the turning track of the machine body 2, so the risk of damaging the door 53 coming in contact with an object around the machine body can be reduced.

As shown in FIG. 4, an air conditioner main body 63 of an air conditioner is provided below the cabin 5 and in the machine body 2. The air conditioner main body 63 has an evaporator and a blower fan. The conditioned air blown out from the air conditioner main body 63 passes through the inside of the middle post 64R on the right side, and is blown out to the operator seat 6 side from a blowout port 65 provided at the upper portion of the middle post 64R. Further, the conditioned air blown out from the air conditioner main body 63 passes through the inside of the duct 66 provided at the front of the cabin 5, and is blown out to the upper glass 68A of the windshield 68 from the blowout port 67 provided at the upper part of the duct 66. The upper glass 68A is movable linearly in the vertical direction, and can move the upper front of the cabin 5 open by moving it downward. The lower glass 68B of the windshield 68 is fixed.

As shown in FIG. 4, on the upper portion of the upper glass 68A, gripping portions 60L and 60R are provided which are gripped when moving the upper glass 68A. As shown in FIG. 6, the grip portion 60L is provided on the left side of the upper glass 68A, and the grip portion 60R is provided on the right side of the upper glass 68A.

As shown in FIG. 3, the pivoting base plate 9 is connected to the pivoting bearing 8, and the machine body 2 is pivotably driven by the turn motor M3. The turn motor M3 is a hydraulic motor (hydraulic actuator, hydraulic equipment).

Figure 37:
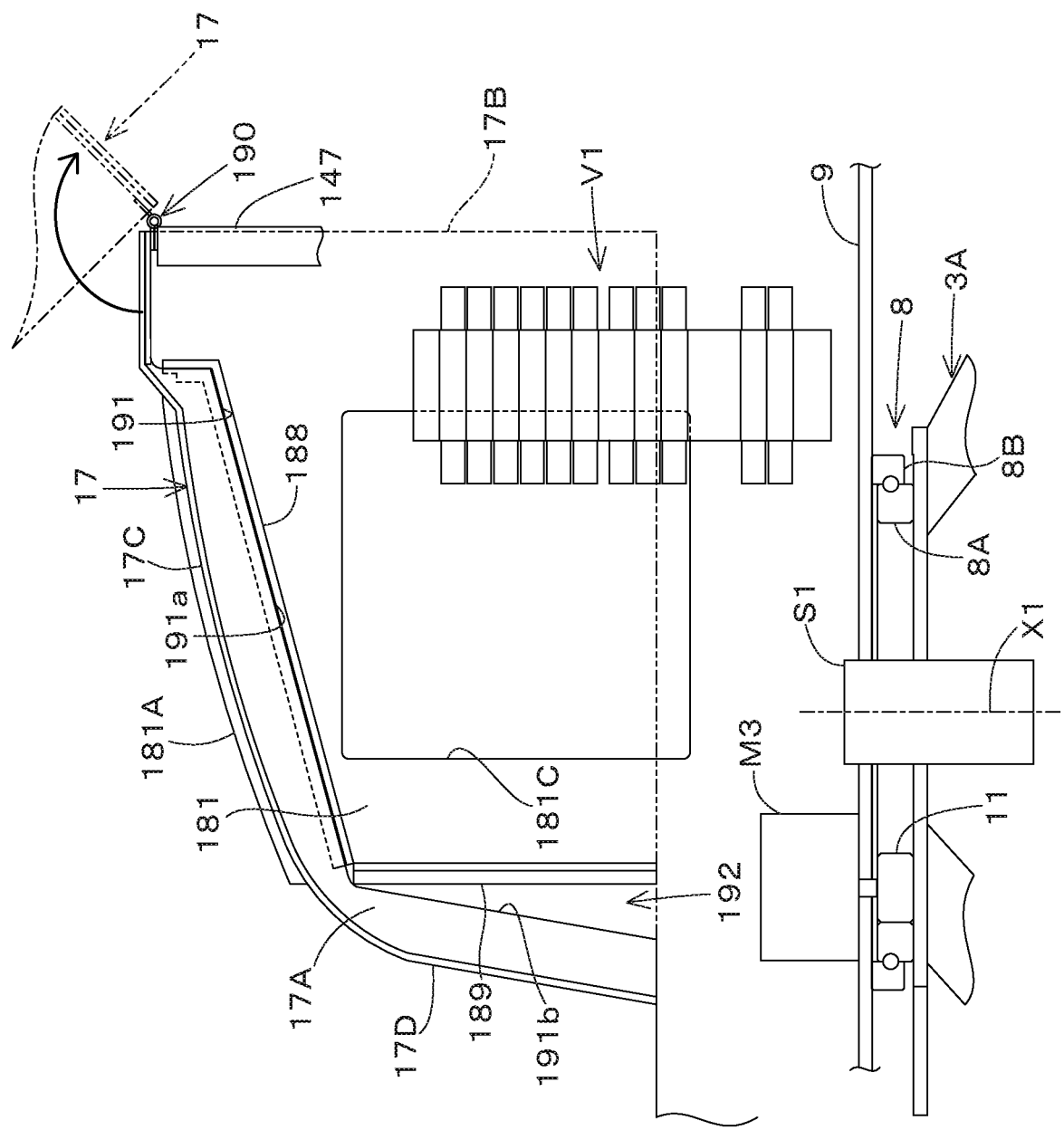
FIG. 37 is a side view of a hydraulic device arrangement portion according to the embodiments.

As shown in FIG. 3 and FIG. 37, the turn bearing 8 has an inner race 8A fixed to the traveling frame 3A and an outer race 8B fixed to the turn base 9. An inner tooth is formed on an inner peripheral portion of the inner race 8A, and a pinion 11 is engaged with the inner tooth. The pinion 11 is attached to the output shaft of the turn motor M3, and the turn motor M3 is fixed to the swing base 9. Thus, by driving the pinion 11 by the turning prime mover M3, the machine body 2 turns. The center of the turn bearing 8 is the turning center (turning axis X1) of the machine body 2.

As shown in FIG. 1 and FIG. 3, a swivel joint (hydraulic device) S1 is provided at the position of the pivot axis X1. The swivel joint S1 is a hydraulic device for circulating the hydraulic fluid, and is a rotary joint (rotary joint) for circulating the hydraulic fluid between the hydraulic device on the machine body 2 side and the hydraulic device on the traveling device 3 side. A turn motor M3 is arranged in front of the swivel joint S1. A control valve (hydraulic device) V1 is arranged behind the swivel joint S1. The control valve V1 is a hydraulic device constituted of integrating control valves that control hydraulic actuators such as a hydraulic cylinder and a hydraulic motor provided in the working machine 1. The control valve which comprises the control valve V1 is a control valve electrically controlled by the below-mentioned control device U1, for example, a pilot type solenoid valve is adopted. The pilot type solenoid valve is a valve that moves the main spool by a pilot pressure controlled by a solenoid to control the flow of hydraulic fluid. The control valve constituting the control valve V1 is a control valve to control, for example, the first traveling motor M1, the second traveling motor M2, the turn motor M3, the dozer cylinder, the swing cylinder C2, the boom cylinder C3, the arm cylinder C4, the bucket cylinder C5.

A hydraulic fluid tank T2 is arranged behind the control valve V1. A hydraulic pump P1 is arranged on the right side of the hydraulic fluid tank T2 and closer to the front.

An arrangement zone from the turn motor M3 to the hydraulic pump P1 through the swivel joint S1, the control valve V1 and the hydraulic fluid tank T2 is a hydraulic device arrangement portion 13 in which these hydraulic devices are arranged. Also, in other words, the hydraulic device arrangement portion 13 in which the hydraulic device is arranged is provided between the cabin 5 and the prime mover E1, and the hydraulic device arranged in the hydraulic device arrangement portion 13 includes the swivel joint S1, the turn motor M3, and the control valve V1. The hydraulic device arrangement portion 13 includes a first placement portion (placement portion) 13A for arranging the swivel joint S1, the turn motor M3 and the control valve V1, and includes a second placement portion 13B for arranging the hydraulic fluid tank T2 and the hydraulic pump P1 (see FIG. 1).

As shown in FIG. 3, a control device U1 is provided below the cabin 5. The control device U1 controls a control valve that constitutes control valve V1. The control device U1 is arranged on the left side of the control valve V1 and on the right side of the vertical rib 9L.

The swivel joint S1, the turn motor M3, and the control valve V1 are provided at positions where some or all of these devices deviate from the cabin 5 in the machine width direction K2. Thereby, at the time of maintenance and the like, the above-mentioned each device can be accessed without lowering the cabin 5.

As shown in FIG. 1, the machine body 2 is provided with a cover device 14 that covers a mounting member provided to the working machine 1. The cover device 14 has a first cover body (cover body) 15, a second cover body 16, a third cover body (cover member) 17, and a fourth cover body (rear cover body) 18.

The first cover body 15 is located at the front of the right portion of the machine body 2 and covers the radiator R1, the oil cooler O1, and the condenser D1. An outside air inlet port 19 for taking in the outside air into the first cover body 15 is provided on the side surface of the front portion of the first cover body 15. The outside air is taken in from the outside air intake 19 by being sucked by the cooling fan F1.

The second cover body 16 is located behind the first cover body 15 and covers the prime mover E1. That is, the second cover body 16 is the bonnet which forms prime mover room (engine room) ER which accommodates prime mover E1 (hereinafter referred to as a bonnet).

The third cover body 17 is located between the first cover body 15 and the second cover body 16 and the cabin 5 (operator seat 6), and covers the device placement portion 13. In the present embodiment, the third cover body 17 covers the first placement portion 13A which is the device placement portion 13 between the prime mover E1 and the cabin 5. That is, the third cover body 17 covers the swivel joint S1, the turn motor M3, and the control valve V1.

The fourth cover body 18 is located at the rear of the swing base 9 and covers the fuel tank T1, the hydraulic fluid tank T2, and the like. The fourth cover body 18 has a first cover 18A, a second cover 18B, and a third cover 18C. The first cover 18A covers the upper side and the left side of the fuel tank T1 (see FIG. 4). The second cover 18B covers the hydraulic fluid tank T2 and a part of the hydraulic pump P1. The third cover 18C is located on the right side of the weight 10 and covers the rear of the hydraulic pump P1. In addition, the third cover 18C can be opened and closed.

As shown in FIG. 3, the machine body 2 has a support bracket 20 at a front portion slightly to the right of the center in the machine width direction K2. The support bracket 20 is fixed to the front of the vertical ribs 9L and 9R, and is provided so as to project forward from the machine body 2.

As shown in FIG. 1 and FIG. 2, a swing bracket 21 is attached to a front portion of the support bracket 20 (a portion projecting from the machine body 2) so as to be pivotable about a longitudinal axis via a swing shaft 26. Accordingly, the swing bracket 21 is rotatable in the machine width direction K2 (horizontally around the swing shaft 26). Further, the swing shaft 26 is located on the other side of the driving portion 42 in the machine width direction K2.

As shown in FIG. 1, the swing bracket 21 is located in front of the swivel joint S1. The swing bracket 21 is arranged in front of the pivot axis X1 and at a position at least partially overlapping the center line Y1 when the boom 22 described later faces the front of the machine. In addition, a center line Y1 is located between the line Y2 in the front-rear direction passing through the axial center X2 of the swing shaft 26 and the right side surface 5A of the cabin 5 (approximately at the center). Line Y2 passes between prime mover E1 and operation portion 42.

The work device 4 is attached to the swing bracket 21.

As shown in FIG. 2, the working device 4 has a boom 22, an arm 23 and a bucket (working tool) 24. The base 22A of the boom 22 is pivotally mounted on the upper portion of the swing bracket 21 via a boom pivot 27 so as to be rotatable about a horizontal axis (an axis extending in the machine width direction K2). Thus, the boom 22 can swing up and down. Further, the boom 22 is bent so that the center portion in the longitudinal direction is convex rearward at the highest position shown in FIG. 2.

The arm 23 is pivotally mounted on the distal end side of the boom 22 so as to be rotatable about a lateral axis. As a result, the arm 23 can swing back and forth or up and down. The bucket 24 is provided on the tip side of the arm 23 so as to be able to perform a squeeze operation and a dumping operation. The squeeze operation is an operation of swinging the bucket 24 in a direction close to the boom 22, and is an operation in the case of covering sand and the like, for example. The dumping operation is an operation of swinging the bucket 24 away from the boom 22. For example, the dumping operation is an operation in the case of dropping (discharging) soil and the like.

The working machine 1 can mount other work (hydraulic attachment) that can be driven by a hydraulic actuator, instead of or in addition to the bucket 24. As other working tools, a hydraulic breaker, a hydraulic crusher, an angle bloom, an earth auger, a pallet fork, a sweeper, a mower, a snow blower, and the like can be exemplified.

The swing bracket 21 is swingable by stretching and shortening a swing cylinder C2 provided in the machine body 2. The boom 22 is rockable by the stretching and shortening the boom cylinder C3. The arm 23 is rockable by stretching and shortening the arm cylinder C4. The bucket 24 is capable of a squeeze operation and a dumping operation by stretching and shortening a bucket cylinder (work implement cylinder) C5. The swing cylinder C2, the boom cylinder C3, the arm cylinder C4, and the bucket cylinder C5 are constituted of hydraulic cylinders (hydraulic actuators).

As shown in FIG. 1, the swing cylinder C2 is provided in the machine body 2 below the cabin 5. The attachment portion 25 on the base end side of the swing cylinder C2 is attached to the turn base 9 and located below the operator seat 6. A tool box may be provided below the cabin 5.

As shown in FIG. 1, the base 22A of the boom 22 is located closer to the center line Y1 than the cabin 5. In other words, the swing bracket 21 and the base 22A of the boom 22 are arranged in front of the space between the prime mover E1 and the cabin 5. Thus, when the boom 22 is raised (the highest position) with the swing bracket 21 faced forward (the front), the lower portion of the boom 22 overlaps the cabin 5 in a side view, and the connection portion between the boom 22 and the arm 23 is arranged substantially vertically above the swing bracket 21 (see FIG. 2).

When the arm 23 is swung in a direction approaching the boom 22 with the bucket 24 in the squeeze position at the maximum lifting position of the boom 22, substantially-whole of the bucket 24 is positioned rearward of the front end of the dozer device 7 (a direction of the A2), and a part of the bucket 24 is arranged rearward of the front end of the swing bracket 21, as shown by the solid line in FIG. 2.

As described above, the arm 23 and the bucket 24 can be brought closer to the machine body 2 so that a part of the bucket 24 is positioned rearward of the front end of the swing bracket 21 when the boom 22 is at the highest position. When rotating the work device 4, the working device 4 can be turned at a small radius. Thus, the operation can be stabilized, for example, in the case where work such as loading earth and sand or the like on a loading platform of a dump truck, or in the case of hanging a transported object on a hook provided on the tip end side of the arm 23 is performed. In addition, since the bucket 24 can be brought closer to the machine body 2 and raised when the boom 22 is at the highest position, the working machine 2 can be brought closer to the loading platform when loading the earth and sand on the loading platform of the dump truck. In this manner, the workability can be improved. Also, when the arm 23 is rocked in a direction away from the boom 22 from the state shown by the solid line in FIG. 2, the locus of the bottom of the bucket 24 will be upward, so the dumping operation when loading earth and sand and the like on the loading platform of the dump truck will be smooth.

Figure 8:
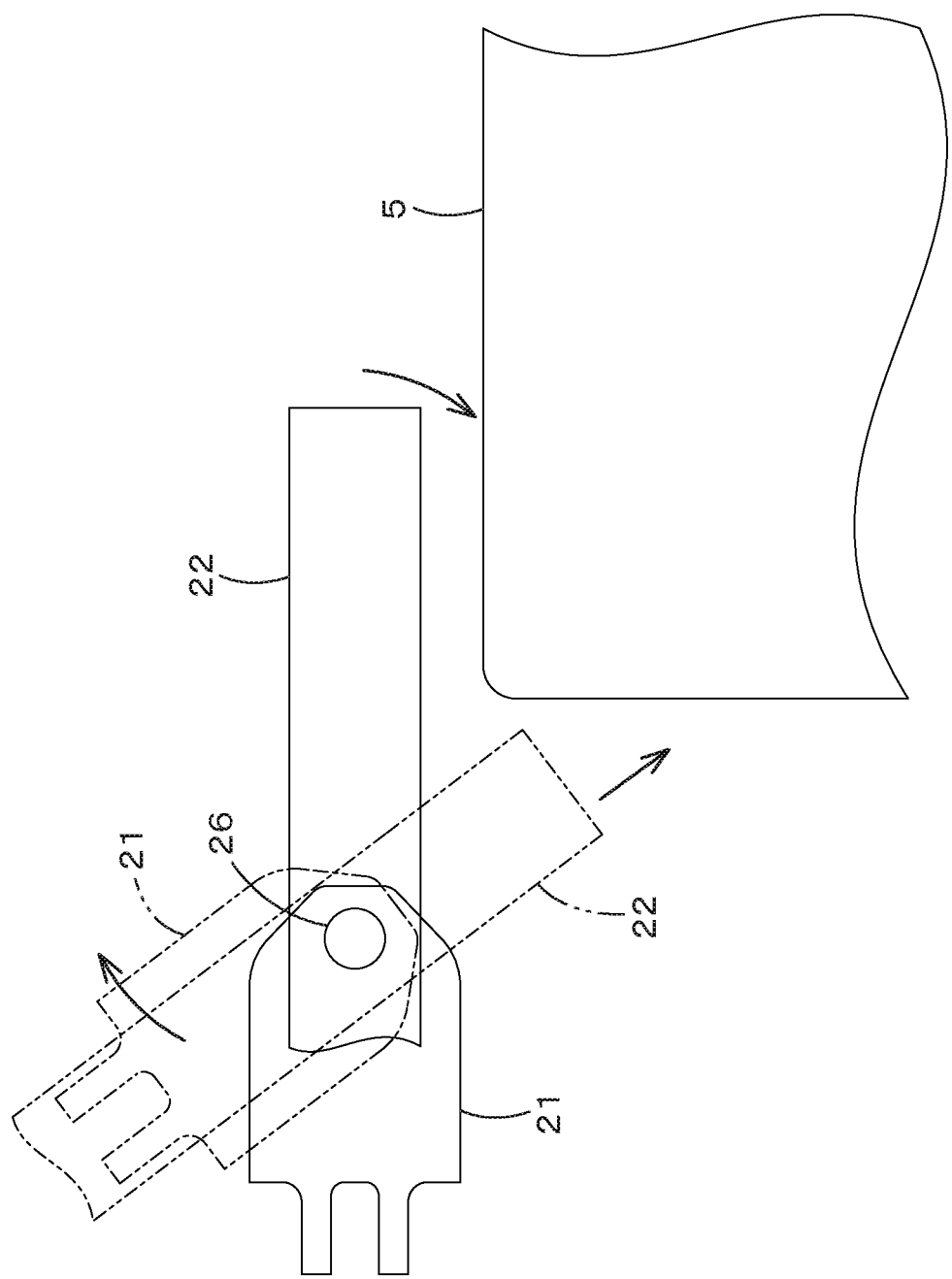
FIG. 8 is a plan view illustrating a relation between the cabin and a boom according to the embodiments.

As shown by a solid line in FIG. 8, when the boom 22 is raised with the swing bracket 21 facing forward, the boom 22 overlaps the cabin 5 in the machine width direction K2. From this state, as shown by the arrow, when the swing bracket 21 is swung to the right, the boom 22 approaches the cabin 5 and then may interfere with the cabin 5. Further, as shown by the imaginary line, even when raising the boom 22 in a state where the swing bracket 21 is swung to the right, the boom 22 approaches the cabin 5 and then may interfere with the cabin 5.

Thus, the working machine 1 has an interference prevention function to prevent the boom 22 from interfering with the cabin 5. The interference prevention function will be described with reference to FIG. 9.

Figure 9:
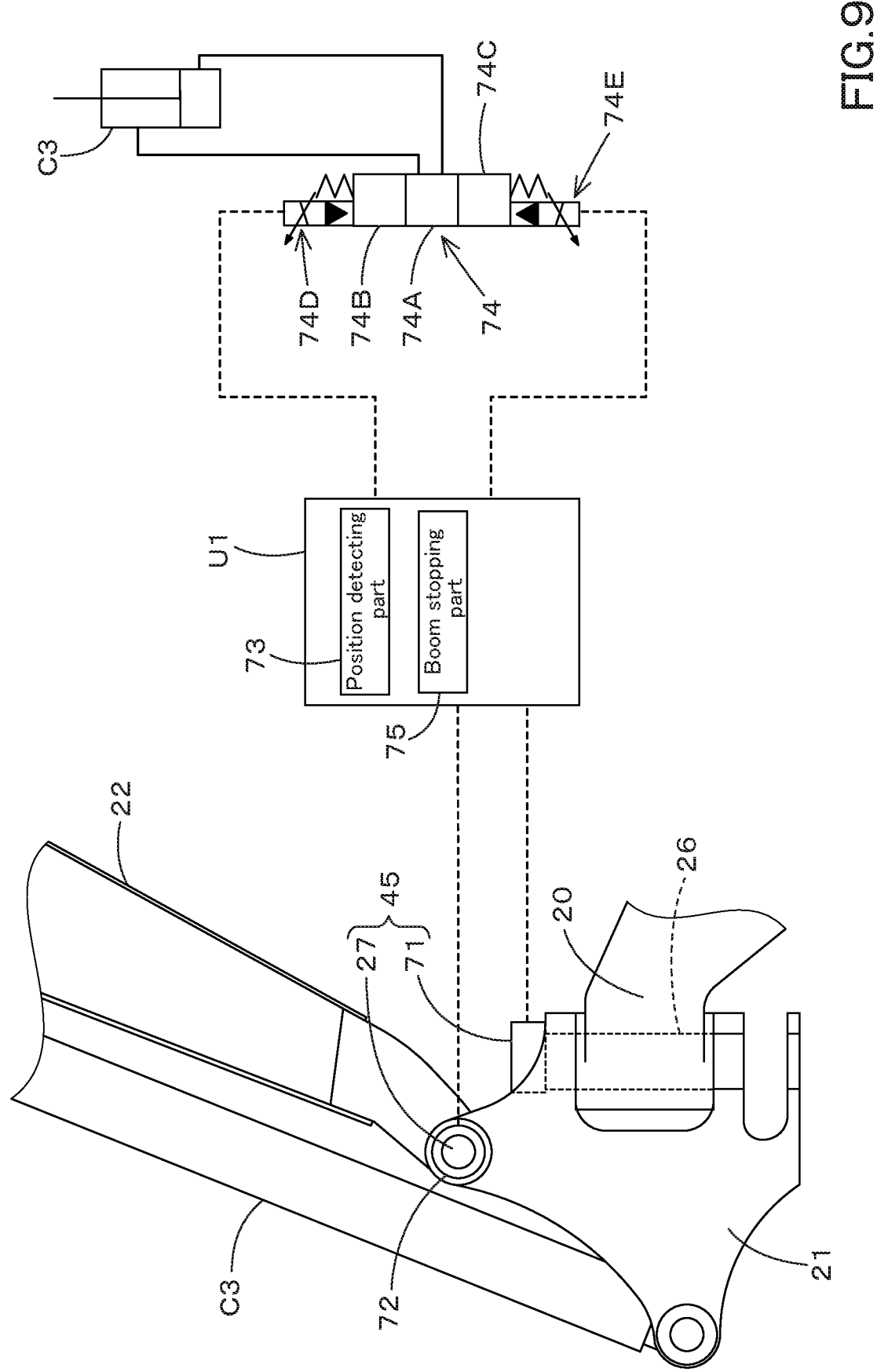
FIG. 9 is a schematic diagram explaining contact prevention of the boom according to the embodiments.

As shown in FIG. 9, the boom cylinder C3 is controlled by a boom control valve 74 which is one of the control valves V1. The boom control valve 74 has a neutral position 74A for stopping the boom 22, a raised position 74B for raising the boom 22, and a lowered position 74C for lowering the boom 22. The boom control valve 74 also has a first solenoid 74D that switches to the raised position 74B and a second solenoid 74E that switches to the lowered position 74C. The first solenoid 74D and the second solenoid 74E are connected to the control device U1.

The operation direction and the operation amount of the operation member (for example, the second steering handle 82R described later) for operating the boom 22 are detected by the angle sensor and sent to the control device U1. The control device U1 outputs a signal to the first solenoid 74D or the second solenoid 74E based on the acquired operation direction and operation amount. As a result, the boom cylinder C3 is expanded and contracted to swing the boom 22 up and down.

The support bracket 20 or the swing bracket 21 is provided with a first angle sensor 71. The first angle sensor 71 is a sensor that detects a rotation angle (swing angle) of the swing bracket 21 with respect to the support bracket 20 about the swing shaft 26. The swing bracket 21 or the boom 22 is provided with a second angle sensor 71. The second angle sensor 71 is a sensor that detects a rotation angle around the boom pivot 27 with respect to the swing bracket 21 of the boom 22. The first angle sensor 71 and the second angle sensor 71 are formed, for example, of potentiometers.

The first angle sensor 71 and the second angle sensor 71 constitute a detection device 45 that detects the position of the boom 22. The first angle sensor 71 and the second angle sensor 71 are connected to the control device U1.

The control device U1 acquires detection signals of the detection device 45 (the first angle sensor 71 and the second angle sensor 71). The control device U1 has a position detecting portion 73 and a boom stopping portion 75.

The position detecting portion 73 detects the position of the boom 22 based on detection signals from the first angle sensor 71 and the second angle sensor 71. The boom stopping portion 75 outputs a signal for stopping the boom 22 before the boom 22 interferes with the cabin 5 (when the boom 22 approaches the cabin 5), based on the position of the boom 22 detected by the position detecting portion 73. Specifically, when the boom stopping portion 75 is operated to swing the boom 22 from the raised state to the right or when the boom 22 is moved to the right from the swung state, the boom stopping portion 75 judges whether the boom 22 approaches the cabin 5 or not if the movement corresponding to the operation is performed, and then stops or restricts the movement of the boom 22 so as to prevent the boom 22 from interfering with the cabin 5 if it is determined that the boom 22 closely approaches the cabin 5.

As shown in FIG. 2, FIG. 4 and FIG. 6, the operator seat 6 is arranged at the rear in the cabin 5. An operating device 41 is provided in the cabin 5. The control device 41 is provided in front of the operator seat 6. The operator seat 6 and the control device 41 constitute an operating portion 42 for operating (operating) the working machine 1. In addition, although this embodiment describes the structure (cabin configuration) by which the operation part 42 is arranged in the cabin 5; however, not only this, the operation part 42 may have a configuration opened outward in the front-back direction K1 and the machine width direction K2 and having a roof covering the operation part 42 from above (the canopy configuration). Further, the configuration externally opened upward, in the front-back direction K1, and in the machine width direction K2.

Figure 10:
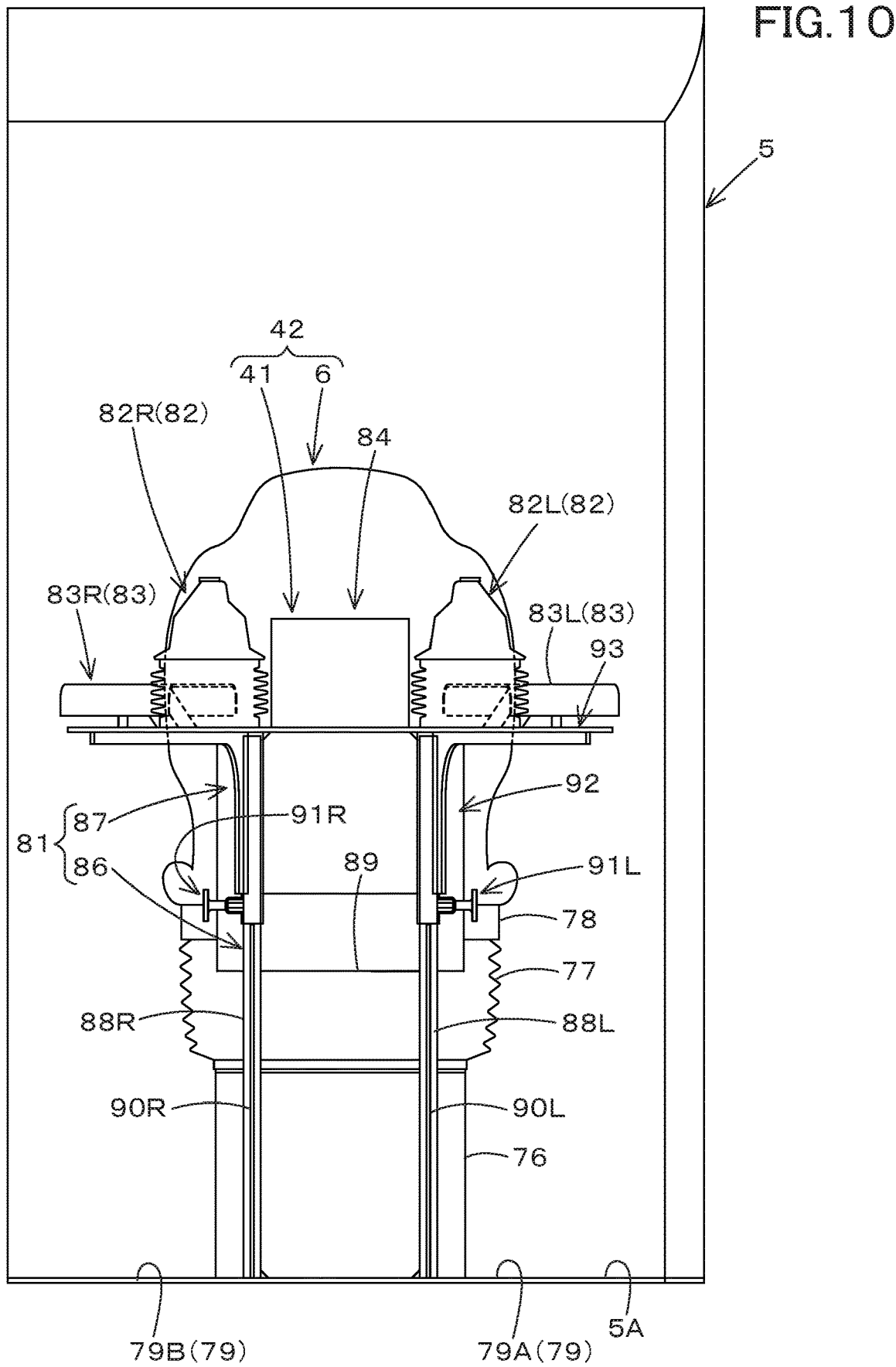
FIG. 10 is a front view of the cabin according to the embodiments.

As shown in FIG. 4 and FIG. 10, the operator seat 6 is supported by a floor 5B that constitutes the bottom of the cabin 5. A seat base 76 is mounted on the floor portion 5B and at the center portion in the machine width direction K2. A suspension device 77 is provided on the seat stand 76, and the operator seat 6 is provided on the suspension device 77 via a slide rail 78 so as to be able to adjust the position in the longitudinal direction.

The operator seat 6 may be rotatable around the vertical axis. That is, the center of the seat portion 6A may be rotatably supported on the seat base 76 about the vertical axis, and the direction of the operator seat 6 may be freely changed left or right about the vertical axis.

Figure 20:
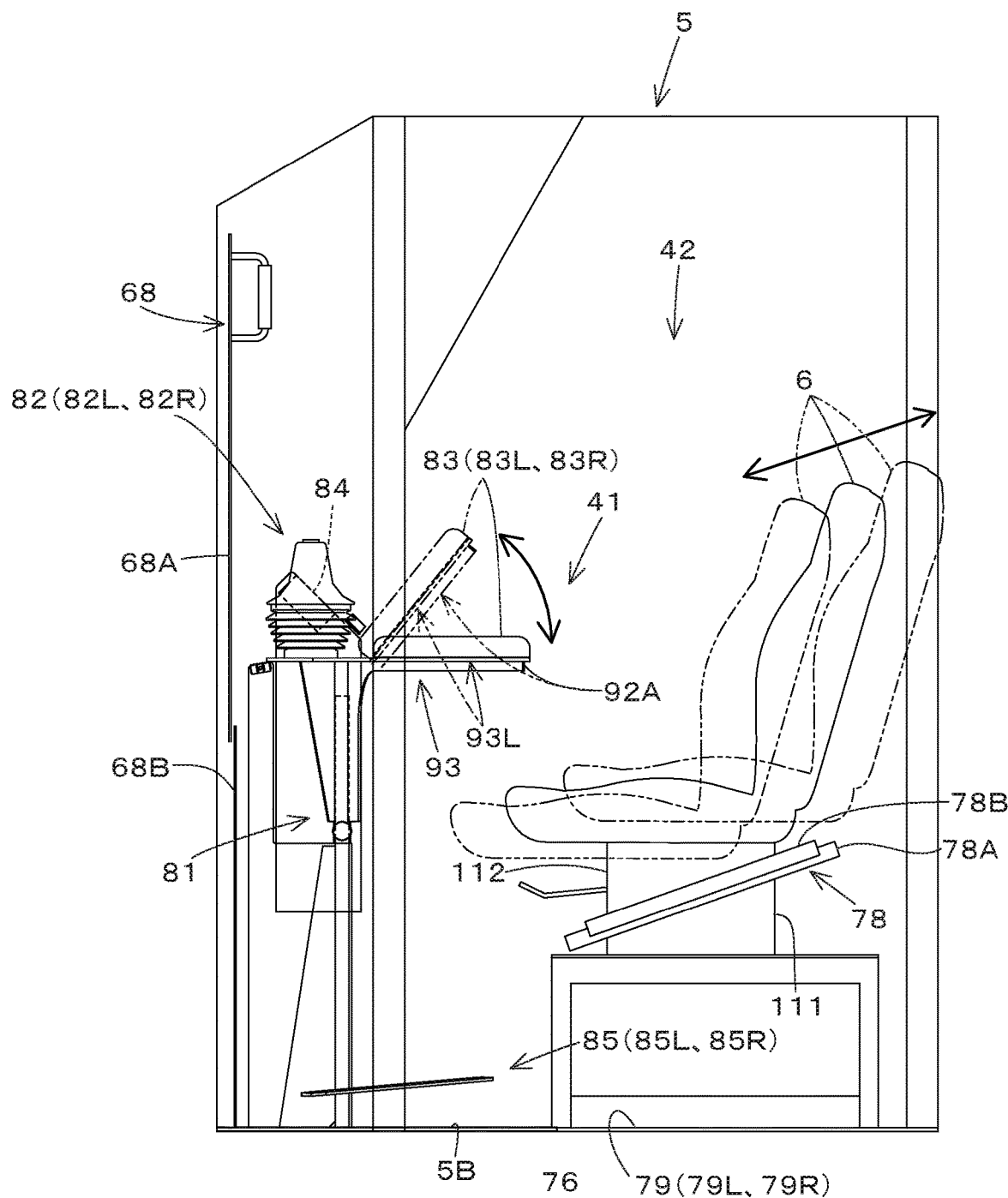
FIG. 20 is a side view of a cabin according to another example of the embodiments.

Further, as shown in FIG. 20, the slide rail 78 may be formed in an inclined shape in which it moves upward as it goes to the rear. The slide rail 78 has a fixed rail 78A and a movable rail 78B. The fixed rail 78A and the movable rail 78B are inclined such that they move upward as going backward. The fixed rail 78A is attached to a fixed base 111 fixed to the seat base 76. The movable rail 78B is attached to a movable base 112 fixed to the lower surface of the seat 6A. The movable rail 78B is movable along the fixed rail 78A and can be fixed to the fixed rail 78A.

By making the slide rail 78 in the shape of a backward tilt, it is possible to adjust the position in the tilt direction in which the operator seat 6 moves upward as going backward. That is, when the movable rail 78B is moved rearward, the position of the seat portion 6A becomes high, and adjustment corresponding to a tall operator can be performed.

Figure 13:
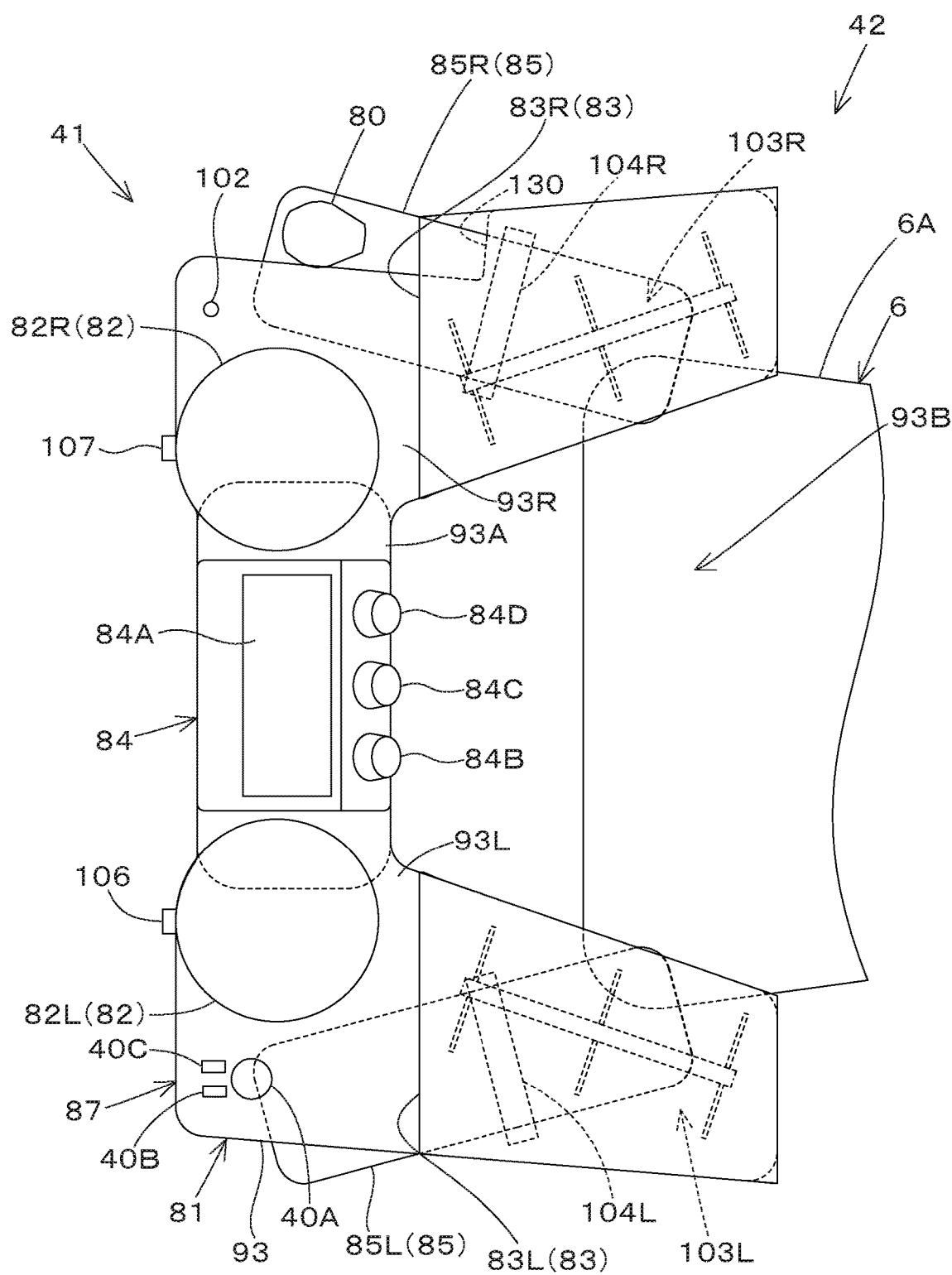
FIG. 13 is a plan view of the operating portion according to the embodiments.

As shown in FIG. 4, FIG. 6 and FIG. 13, the control device 41 includes a operation base 81, an operation member 82, an elbow rest member 83, a monitor 84, a travel operation member 85, and a dozer lever (control lever) 80.

Figure 11:
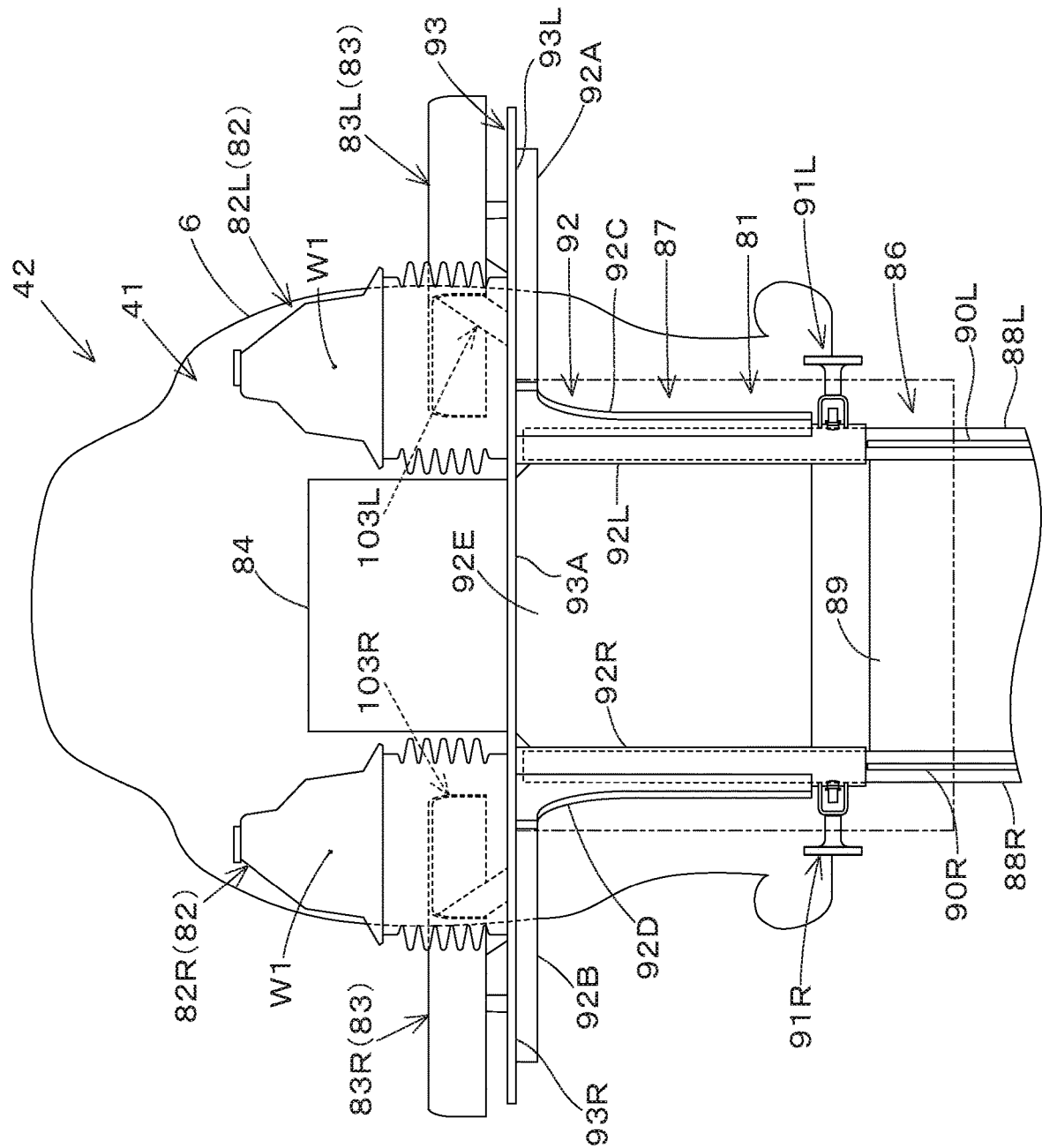
FIG. 11 is a front view of an operating portion according to embodiments.
Figure 12:
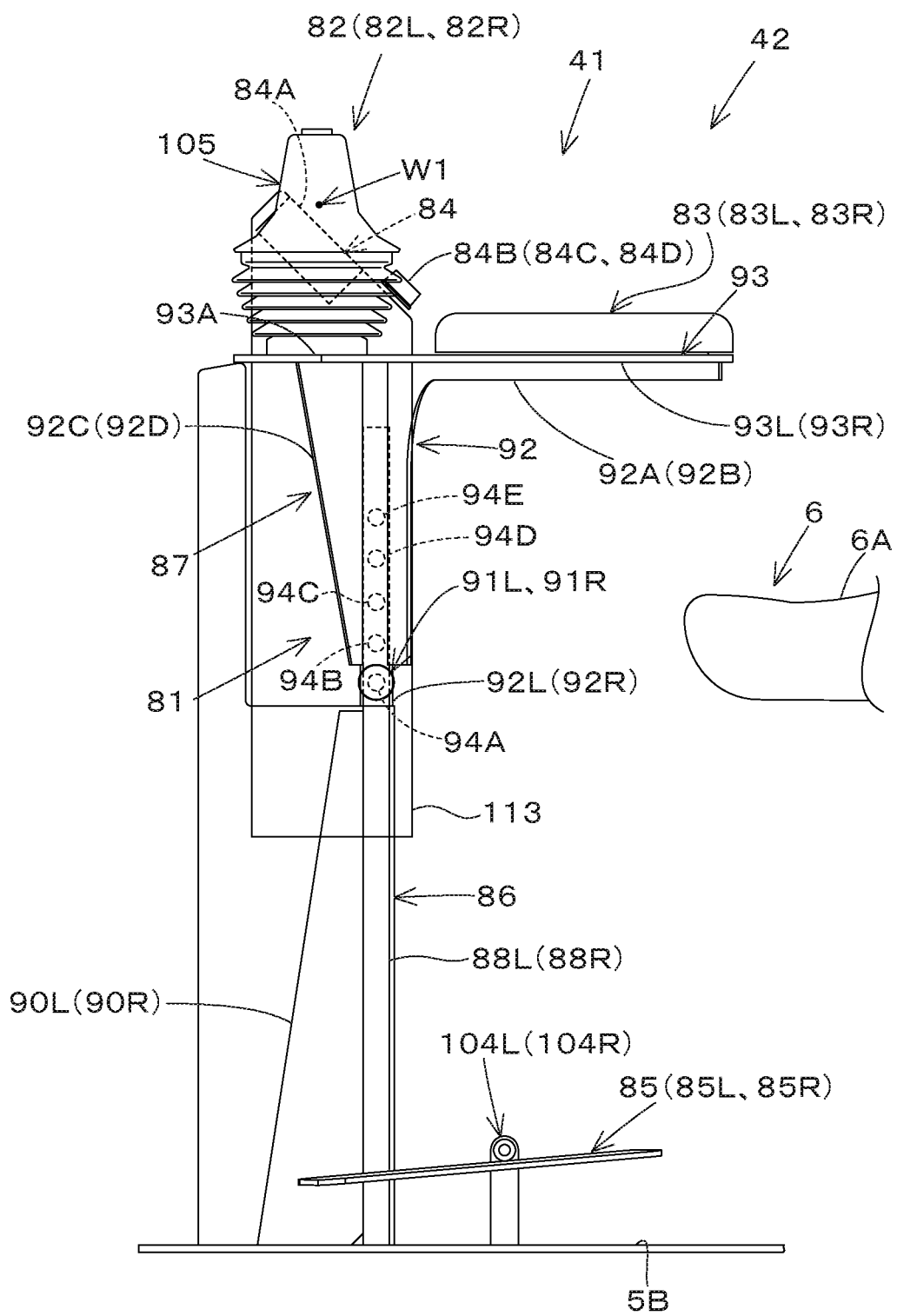
FIG. 12 is a side view of the operating portion according to the embodiments.

As shown in FIG. 10, FIG. 11 and FIG. 12, the operation base 81 is provided in front of the operator seat 6 and at the center side of the cabin width direction K2 of the cabin 5. The operation base 81 has a base 86 erected on the floor 5B and a support 87 supported on the base 86 so as to be adjustable in the vertical position.

As shown in FIG. 10 to FIG. 12 and FIG. 14, the base 86 includes a first support 88L, a second support 88R, a connection plate 89, a first reinforcing plate 90L, and a second reinforcing plate 90R. The first support post 88L and the second support post 88R are formed of a cylindrical body having an axial center in the vertical direction, and are standing on the floor 5B. The first support post 88L is arranged to the left of the center of the cabin width direction K2 of the cabin 5, and the second support post 88R is arranged to the left of the center of the cabin 5 width direction K2.

Figure 15:
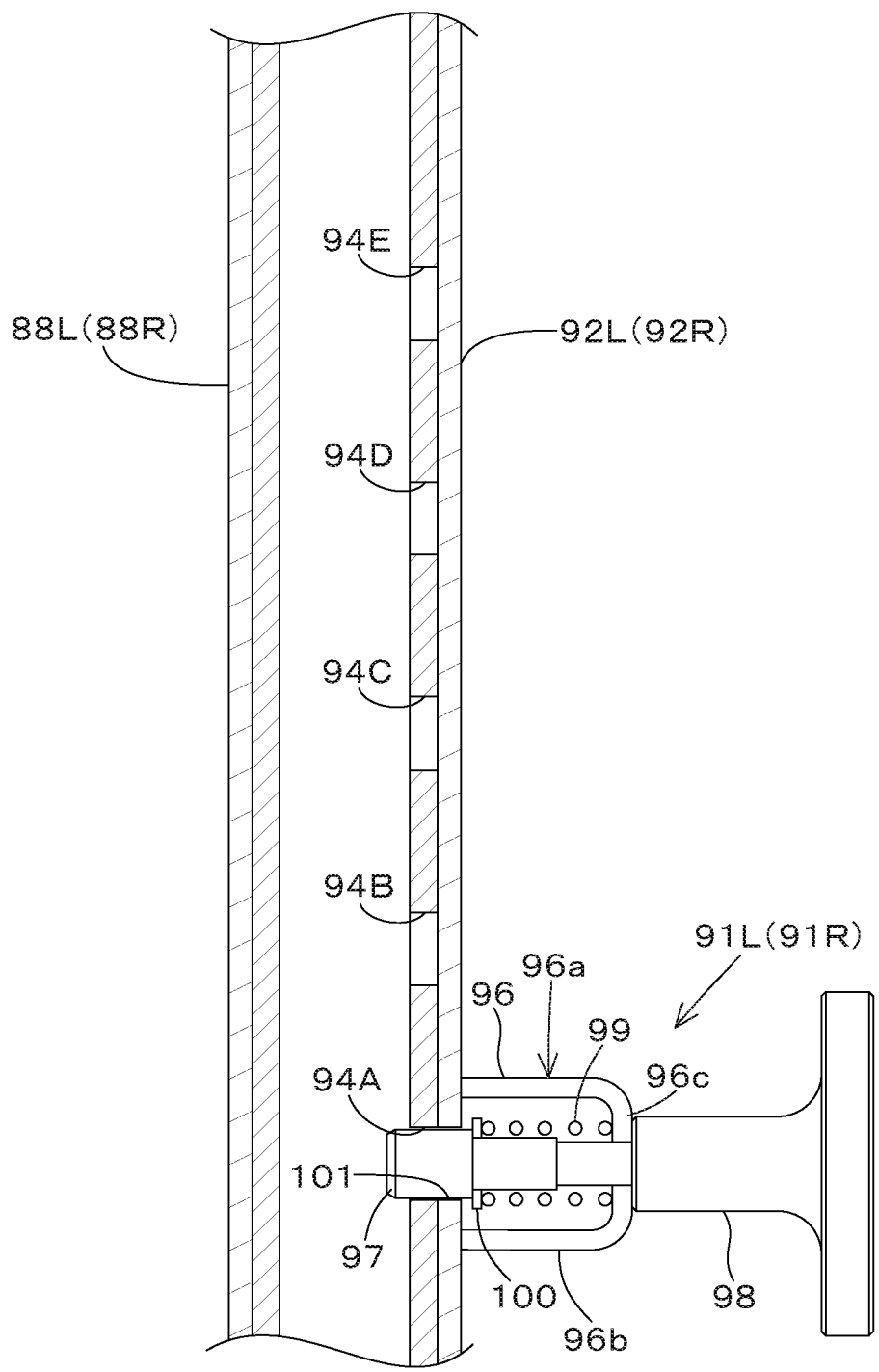
FIG. 15 is a cross-section view illustrating a vertical position adjustment portion of an operation base according to the embodiments.

As shown in FIG. 15, a plurality of lock holes (a first lock hole 94A to a fifth lock hole 94E) are formed in the lower portions of the first support 88L and the second support 88R at intervals in the vertical direction.

Figure 14:
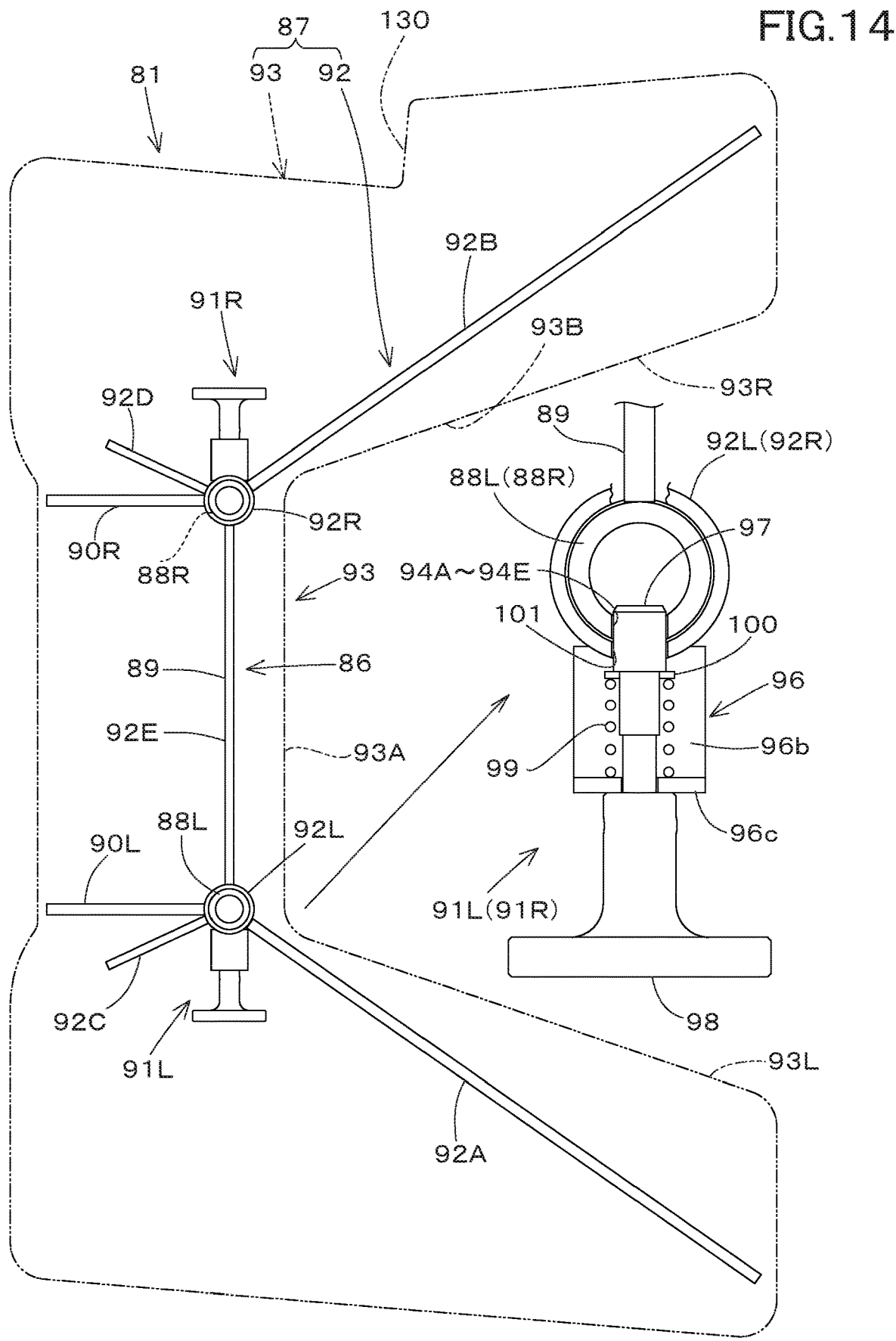
FIG. 14 is a plan view of a support base according to the embodiments.

As shown in FIG. 10, FIG. 11, and FIG. 14, the connecting plate 89 is arranged between the lower portions of the first support 88L and the second support 88R, and connects the first support 88L and the second support 88R. The first reinforcing plate 90L is fixed to the lower portion of the front surface of the first support 88L, and the second reinforcing plate 90R is fixed to the lower portion of the front surface of the second support 88R. The lower ends of the first reinforcing plate 90L and the second reinforcing plate 90R are fixed to the floor portion 5B.

As shown in FIG. 11, FIG. 12, and FIG. 14, the support base 87 has an attachment body 92 mounted on the upper portion of the base 86 so that the vertical position adjustment is possible and includes a attachment base 93 fixed to the attachment body 92. In the present embodiment, the attachment base 93 is supported by the base 86 via the attachment body 92 so as to be adjustable in the vertical position.

As shown in FIG. 14, the attachment body 92 is provided on the lower surface side of the attachment base 93. The attachment body 92 includes a first movable member 92L, a second movable member 92R, a plurality of reinforcing plates (first reinforcing plate 92A to fifth reinforcing plate 92E), a first fixing device (fixing device) 91L, and a second fixing device (fixing device) 91R. The first movable member 92L and the second movable member 92R are constituted of a cylinder (cylindrical body) having an axial center in the vertical direction. The first movable member 92L is vertically and movably fitted to the first support 88L, and the second movable member 92R is vertically and movably fitted to the second support 88R (see FIG. 15). Accordingly, the attachment body 92 is vertically movable with respect to the base 86.

As shown in FIG. 14 and FIG. 15, an insertion hole 101 penetrating in the radial direction is formed in the first movable member 92L and the second movable member 92R. By moving the first movable member 92L and the second movable member 92R upward and downward, the insertion hole 101 can be made to coincide with any of the plurality of lock holes (the first lock hole 94A to the fifth lock hole 94E).

The first reinforcing plate 92A extends in an inclined direction rearward from the first movable member 92L, gradually shifting toward the machine outward direction (to the left). The second reinforcing plate 92B extends in an inclined direction rearward from the second movable member 92R, gradually shifting toward the machine inward direction (to the right). The third reinforcing plate 92C extends in an inclined direction forward from the first movable member 92L, gradually shifting the machine outward direction (to the left). The fourth reinforcing plate 92D extends in an inclined direction rearward from the second movable member 92L, gradually shifting toward the machine inward direction (to the right). The fifth reinforcing plate 92E connects the first movable member 92L and the second movable member 92L.

The first fixing device 91L and the second fixing device 91R are devices for fixing the attachment body 92 (support base 87) to the base 86. Since the second fixing device 91R has the same configuration as the first fixing device 91L, the first fixing device 91L will be described, and the description of the second fixing device 91R will be omitted.

As shown in FIG. 14 and FIG. 15, the first fixing device 91L has a support member 96, a lock member 97, an imaging member 98, and a biasing member 99. The support member 96 has an upper wall 96A and a lower wall 96B fixed to the first movable member 92L (the second movable member 92R), and a support wall 96C connecting the upper wall 96A and the lower wall 96B.

The lock member 97 is formed of a rod, and one end of the lock member 97 is insertable into the insertion hole 101 and selectively insertable into any one of the first lock hole 94A to the fifth lock hole 94E. By inserting the lock member 97 into the insertion hole 101 and any of the first lock hole 94A to the fifth lock hole 94E, the vertical movement of the attachment body 92 with respect to the base 86 is restricted. The other end side of the lock member 97 penetrates the support wall 96C. An pinch 98 is fixed to the other end of the lock member 97. The lock member 97 is movable in the radial direction of the first movable member 92L (the second movable member 92R).

By holding the pickup 98 and removing the lock member 97 from the lock holes (the first lock hole 94A to the fifth lock hole 94E), the vertical movement of the support base 87 relative to the base 86 is permitted. In this state, the support base 87 is moved up and down, and the lock member 97 is inserted into the insertion hole 101 and the lock hole at an arbitrary position, whereby the upper and lower positions of the support base 87 are fixed with respect to the base 86. Thus, the vertical position adjustment (height adjustment) of the support base 87 can be performed.

The biasing member 99 is provided between the spring receiving member 100 provided on the lock member 97 and the support wall 96C, and biases the lock member 99 in the direction of inserting the insertion hole 101 and the lock hole.

As shown in FIG. 11, the attachment base 93 is formed of a plate material, and is arranged such that the plate surface is directed vertically.

As shown in FIG. 14, the attachment base 93 has a main portion 93A, a first extending portion 93L, and a second extending portion 93R. The main portion 93A is formed horizontally long in the machine width direction K2. The first extending portion 93L extends rearward from one side of the main portion 93A in the machine width direction K2. Specifically, the first extending portion 93L is extended in an inclined direction rearward from a portion (left portion) on the vehicle outside of the main portion 93A, gradually shifting to the machine outward direction. The second extending portion 93R extends rearward from the other side of the main portion 93A in the vehicle machine width direction K2. Specifically, the second extending portion 93R is extended in an inclined direction rearward from a portion (right portion) of the main portion 93A toward the inside of the vehicle, gradually shifting toward the machine inward direction.

An open recess 93B is formed on the rear side of the attachment base 93 by an edge on the back of the center portion 93A, a right edge of the first extending portion 93L, and a left edge of the second extension 93R. The recess 93B is expanded toward the rear. By forming the recess 93B, the operator can easily approach the upper glass 68A, for example, when moving the upper glass 68A upward and downward.

The steering member 82 is a member (grip) that the operator holds and operates. As shown in FIG. 11 to FIG. 13, the steering member 82 includes a first steering handle 82L and a second steering handle 82R. The first steering handle 82L is provided on one side (left side) relative to the center portion of the main portion 93A in the machine width direction K2. The second steering handle 82R is provided on the other side (right side) than the center portion of the main portion 93A in the machine width direction K2 and on the side of the first steering handle 82L.

The first steering handle 82L and the second steering handle 82R are devices capable of operating two operation targets equipped on the working machine 1. For example, the first steering handle 82L is capable of pivotally operating the machine body 2 as the first operation target, and is capable of pivotally operating the arm 23 as the second operation target. Further, for example, the second steering handle 82R is capable of swinging the bucket 24, which is a first operation target, and capable of swinging the boom 15, which is a second operation target. The operating direction and swing amount of the operation member 82 are detected by an angle sensor. The detection signal of this angle sensor is sent to the control device U. The control device U1 controls a control valve that controls an operation target based on a detection signal from the angle sensor.

The first steering handle 82L and the second steering handle 82R are swingably supported by the attachment base 93, and can be operated in any oblique direction between the front and the rear (the front-rear direction K1), between the left and the right (the machine width direction K2), and between the front-rear direction K1 and the machine width direction K2. As shown in FIG. 11 and FIG. 12, the pivot point W1 of the first steering handle 82L and the second steering handle 82R is provided inside the steering wheel. Thus, the structure including the first steering handle 82L and the second steering handle 82R, the support mechanism for supporting them, and the like has a compact structure with a low height. As the result, the first steering handle 82L and the second steering handle 82R can be reduced in the hand operation amount, and have a steering wheel structure that can be stably operated even when the machine body 2 is shaken.

As a countermeasure against the drop of the water droplet, the periphery of the operation base 81 may be inclined forward. As shown in FIG. 12, a fuse box 113 is provided on the lower surface side of the attachment base 93.

The elbow rest member 83 is a member on which the operator places an elbow. As shown in FIG. 13, the elbow rest member 83 is provided on the attachment base 93 (operation base 81). The elbow rest member 83 extends from the attachment base 93 (pilot table 81) toward the operator seat 6. In the present embodiment, the elbow rest member 83 extends rearward from the rear side of the steering member 82.

The elbow rest member 83 includes a first arm rest 83L and a second arm rest 83R. The first arm rest 83L extends rearward from the rear side of the first steering handle 82L. Specifically, the first arm rest 83L extends in an inclined direction in which the vehicle moves to the outside (left) as it goes from the rear to the rear of the first steering handle 82L. In addition, the first arm rest 83L is arranged above the first extending portion 93L along the first extending portion 93L. The first arm rest 83L is attached to the first extending portion 93L via the support member 103L.

The second arm rest 83R extends rearward from the rear side of the second steering handle 82R. More specifically, the second arm rest 83R extends in an inclined direction in which the second armrest 83R shifts toward the inside of the vehicle (rightward) from the rear side to the rear side of the second steering handle 82R. The second arm rest 83R is arranged above the second extension 93R along the second extension 93R. The second arm rest 83R is attached to the second extending portion 93R via the support member 103R.

In the control device 41 of the present embodiment, the operator places the elbow of the left arm on the first armrest 83L and holds the first steering handle 82L with the left hand, and places the elbow of the right arm on the second armrest 83R and holds the second steering handle 82R with the right hand. Thus, the operator operates the steering member 82 in a state in which the upper body is in the forward leaning posture in the state where the operator seat 6 is seated. As a result, the operator takes a posture to operate the first steering handle 82L and the second steering handle 83R in a state where the upper body approaches the front side of the cabin 5.

Further, in the present embodiment, by positioning the steering member 82 and the elbow rest member 83 in front of the operator seat 6, the left side surface and the right side surface of the cabin 5 are brought close to the operator seat 6, thereby reducing the dimensions of the cabin 5 in the machine width direction K2.

Further, the first arm rest 83L largely protrudes leftward from the operator seat 6, and the second armrest 83R protrudes largely rightward from the operator seat 6, widening the distance between the first armrest 83L and the second armrest 83R.

In addition, the first arm rest 83L and the second arm rest 83R are provided extending backward and inclining so that the distance between them in the widthwise direction K2 of the vehicle body increases.

Further, as shown in FIG. 13, the first arm rest 83L and the first extending portion 93L partially overlap with the left portion of the seat portion 6A in the vertical direction. The second arm rest 83R and the second extension 93A partially overlap the right portion of the seat 6A in the vertical direction. In the present embodiment, by arranging the control device 41 (operation base 81) and the operator seat 6 close to each other in the front-rear direction and by bringing the operator seat 6 closer to the control device 41, the operation portion 42 (cabin 5) is configured in compact in the longitudinal direction.

As shown by imaginary lines in FIG. 20, the first arm rest 83L (elbow placing member 83) may be pivotally supported at the front by the operation base 81 and may be pivotable upward at the rear. In the case of this embodiment, together with the first arm rest 83L, the first extending portion 93L is also swingable upward.

In addition, the first arm rest 83L and the second arm rest 83R may be supported by the attachment base 93 so as to be adjustable in position in the front-rear direction K1. This makes it possible to stabilize the arm angle with respect to a tall operator. In addition, at the time of getting on and off, the first arm rest 83L can be moved forward to widen the width of path for boarding.

As shown in FIG. 11 and FIG. 13, the monitor 84 is arranged on the upper surface side of the attachment base 93, and is provided between the first steering handle 82L and the second steering handle 82R. Specifically, the monitor 84 is arranged at the center portion of the attachment base 93 in the machine width direction K2, the first steering handle 82L is arranged on one side of the machine width direction K2 of the monitor 84, and the second steering handle 82R is arranged on the other side of the monitor 84 in the machine width direction K2. The first steering handle 82L, the second steering handle 82R, and the monitor 84 are arranged side by side in the vehicle width direction K2. The monitor 84 is positioned in front of a operator who holds the first steering handle 82L and the second steering handle 82R and leans forward to drive the working machine 1.

The monitor 84 has, on the rear surface (operator seat 6 side), an inclined surface which shifts to the rear as it goes downward, and a display section (screen) 84A for performing display is provided on this inclined surface. That is, the display portion (screen) 84A is an inclined surface that inclines backward, and it is easy for a operator who operates the operation member 82 to look forward at the display portion (screen) 84A.

The display portion 84A displays basic information of the working machine 1, an image around the working machine 1, information necessary for performing various settings of the working machine 1, and the like. The basic information is, for example, an operating condition, mode change, various settings, warnings, remaining amount of fuel, time (time) and the like. The image around the working machine 1 is, for example, an image behind the working machine 1. As shown in FIG. 4, an imaging device 43 (such as a camera) capable of imaging the rear of the machine 2 is provided above the weight 10, and an image captured by the imaging device 43 can be displayed on the display portion 84A. The monitor 84 and the imaging device 43 can communicate with each other via an on-vehicle communication network such as CAN (Controller Area Network) or FlexRay. The imaging device 43 may be capable of capturing an image around the machine body 2 by making it possible to change the direction by remote control or the like. In addition, an imaging device for displaying an image other than the rear of the machine body 2 on the display portion 84A may be appropriately provided in the cabin 5, the machine body 2, the cover device 14 or the like.

Information necessary for performing various settings of the working machine 1 is, for example, information necessary for machine setting such as height control setting, A1 control setting, and arm restriction setting.

Below the display portion 84A of the monitor 84, a plurality of operation switches (a first switch 84B, a second switch 84C, and a third switch 84D) are provided.

The first switch 84B is, for example, a switch that changes the rotational speed of the prime mover E1. The change of the rotational speed can be changed stepwise. Moreover, the change of rotation speed may be changeable continuously.

The second switch 84C is, for example, a switch for setting the work speed of the working machine 1. The working speed can be set stepwise. The setting of the working speed may be changeable continuously. The work speed is, for example, the swing speed of the boom 22, the arm 23, the bucket 24, the swing bracket 21, and the swing speed of the machine body 2. In addition, the second switch 84C may be a switch that switches between an inoperable state in which the operation on the operation target of the steering member 82 can not be performed and an operable state in which the operation on the operation target of the steering member 82 is enabled. In this case, the second switch 84C may also serve as a display lamp for displaying whether the operation is inoperable or operable. Further, the second switch 84C may be a switch that combines the setting of the work speed and the switching between the inoperable state and the operable state.

The third switch 84D is a switch that lights and extinguishes a light equipped to the working machine 1, for example, a boom lamp, a headlight, a rear lamp, and the like. In addition, the third switch 84D may be a key switch that starts the prime mover E1. In addition, the third switch 84D may be used as a key switch and a switch for turning on and off the light.

The state operated by the first switch 84B, the second switch 84C, and the third switch 84D may be displayed on the display portion 84A.

As shown in FIG. 13, on the left side of the first steering handle 82L (monitor 84), a plurality of operating tools (a first operating tool 44A, a second operating tool 44B, and the like) for operating display items displayed on the screen. A third operating tool 44C) is provided. The second operating tool 44B and the third operating tool 44C are arranged side by side in the machine width direction K2 in front of the first operating tool 44A. For example, the first operation tool 44A is an operation tool capable of rotating operation, and the second operation tool 44B and the third operation tool 44C are switches capable of pressing operation. The first operation tool 44A changes the selection item candidate among the plurality of selection items displayed on the display portion 84A by performing the rotation operation. The selection item is determined by pressing the third operation tool 44C. Further, the second operation tool 44B cancels the selection item determined by the pressing operation.

The first operating tool 44A, the second operating tool 44B, and the third operating tool 44C may be provided on the right side of the first steering handle 82L (monitor 84). Further, the change of the selection item candidate, the determination of the selection item, and the cancellation of the selection item may be performed by a single operation tool. In addition, the display portion 84A may have a touch panel that doubles as a display and an operation tool, that is, a touch operation portion that receives a touch operation on the display portion by the operator.

The operator can easily move his hands from the operation member 82 to the monitor 84 (display portion 84A, first switch 84B, second switch 84C or third switch 84D, and the like) while keeping the elbow on the elbow holder 83 (centering on the elbow). in addition, with the elbow attached to the elbow rest member 83, the display portion 84A, the first switch 84B, the second switch 84C, the third switch 84D, and the like can be operated.

In addition, while the elbow is attached to the first arm rest 83L, it is possible to easily move the hand from the first steering handle 82L to the first operating tool 44A, the second operating tool 44B and the third operating tool 44C. Further, the first operation tool 44A, the second operation tool 44B, and the third operation tool 44C can be easily operated while the elbow rest member 83 is attached to the elbow.

A stop switch 102 for stopping the prime mover E1 is provided on the right side of the second steering handle 82R (monitor 84). It is easy to move the hand from the second steering handle 82R to the stop switch 102 while holding the elbow on the second arm rest 83R. Further, as shown in FIG. 6, an outlet 67 is provided in front of the monitor 84.

The travel operation member 85 is a pedal that operates the travel device 3 by a stepping operation.

As shown in FIG. 6 and FIG. 13, the travel operation member 85 includes a first traveling pedal 85L arranged in front of one side portion of the operator seat 6 in the machine width direction K2 and includes a second traveling pedal 85R arranged in front of the other side portion of the operator seat 6 in the machine width direction K2. The first traveling pedal 85L is a pedal that operates the first travel device 3L (first traveling motor M1). The second traveling pedal 85R is a pedal that operates the second travel device 3R (second traveling motor M2).

The first traveling pedal 85L and the second traveling pedal 85R are pedals that perform forward and reverse operation and steering operation of the working machine 1. That is, when the first traveling pedal 85L and the second traveling pedal 85R are depressed forward, the vehicle travels forward, and when the vehicle travels backward, the vehicle travels backward. Further, when the depression direction and the depression amount of the first traveling pedal 85L and the second traveling pedal 85R are the same, the vehicle travels straight. The rotation speed of the first traveling motor M1 can be changed by the depression amount of the first traveling pedal 85L, and the rotation speed of the second traveling motor M2 can be changed by the depression amount of the second traveling pedal 85R.

In the working machine 1 of the present embodiment, when the working machine 1 travels straight, the first traveling pedal 85L and the second traveling pedal 85R are depressed to the maximum position (solid stepping) in order to achieve straightness. The change of the traveling speed is possible by an acceleration/deceleration switch provided on the operation member 82.

As shown in FIG. 13, the acceleration/deceleration switch is a deceleration switch 106 provided on the first steering handle 82L and an acceleration switch 107 provided on the second steering handle 82R. The operator can accelerate or decelerate the traveling speed of the working machine 1 while holding the operation member 82. The speed increasing switch 107 is a switch for increasing the traveling speed. The speed increasing switch 107 is, for example, a momentary switch, and the gear position is increased each time it is pressed. The deceleration switch 106 is a switch for reducing the traveling speed. The decrease switch 106 is, for example, a momentary switch, and the shift position decreases with each pressing. The acceleration and deceleration of the traveling speed may be continuous. That is, while the speed reduction switch 106 is being pressed, the speed is reduced, and while the speed increasing switch 107 is being pressed, the speed is increased.

As shown in FIG. 4 and FIG. 6, on the floor 5B on the side of the operator seat 6 (seat base 77), a foot rest 79 for placing a operator's foot is provided. The foot placement portion 79 includes a first portion 79L on one side (left side) of the operator seat 6 and the seat base 77, and includes a second portion 79R on the other side (right side) of the operator seat 6 and the seat base 77.

As shown in FIG. 6, the first traveling pedal 85L is located in front of the first portion 79L, and the second traveling pedal 85R is located in front of the second portion 79R. There is nothing between the first traveling pedal 85L and the first portion 79L that impedes the movement of the foot, and the foot can move on the floor portion 5B from the first traveling pedal 85L to the first portion 79L. In addition, there is nothing between the second traveling pedal 85R and the second portion 79R that prevents movement of the foot, and the foot can move on the floor 5B from the second traveling pedal 85R to the second portion 79R.

When the operator places his or her foot in the foot support 79, the operator bends the leg so that the leg is positioned behind the knee, and can rest in this position when the traveling device 3 is not operated. In addition, since the upper body is in a forwardly inclined posture during driving, the posture can be facilitated by positioning the foot backward.

Further, the foot rest portion 79 has a longitudinal length corresponding to the longitudinal position adjustment of the operator seat 6. That is, even when the position of the operator seat 6 is adjusted back and forth, the foot rest portion 79 has a front and rear length that allows the operator's foot to be moved according to the movement of the operator seat 6.

As shown in FIG. 13, the first traveling pedal 85L is provided below one side (first extension portion 93L) of the attachment base 93 in the machine width direction K2, and the second traveling pedal 85R is attached to the attachment base 93. It is provided below the other side (second extending portion 93R) in the machine width direction K2. When the traveling operation member 85 is operated, the operator's leg is inserted below the attachment base 93. That is, the left leg is inserted between the first extending portion 93L and the first traveling pedal 85L, and the right leg is inserted between the second extension 93R and the second traveling pedal 85R.

As shown in FIG. 13, the mutual distance between the first traveling pedal 85L and the second traveling pedal 85R in the vehicle machine width direction K2 gradually becomes wider as it goes forward. The rear of the first traveling pedal 85L is located below one side of the operator seat 6 in the machine width direction K2. Specifically, the rear end portion of the first traveling pedal 85L overlaps the front end portion of the left portion of the seat portion 6A in plan view. The rear of the second traveling pedal 85R is located below the other side of the operator seat 6 in the machine width direction K2. Specifically, the rear end portion of the second traveling pedal 85R overlaps the front end portion of the right portion of the seat portion 6A in plan view.

Figure 16:
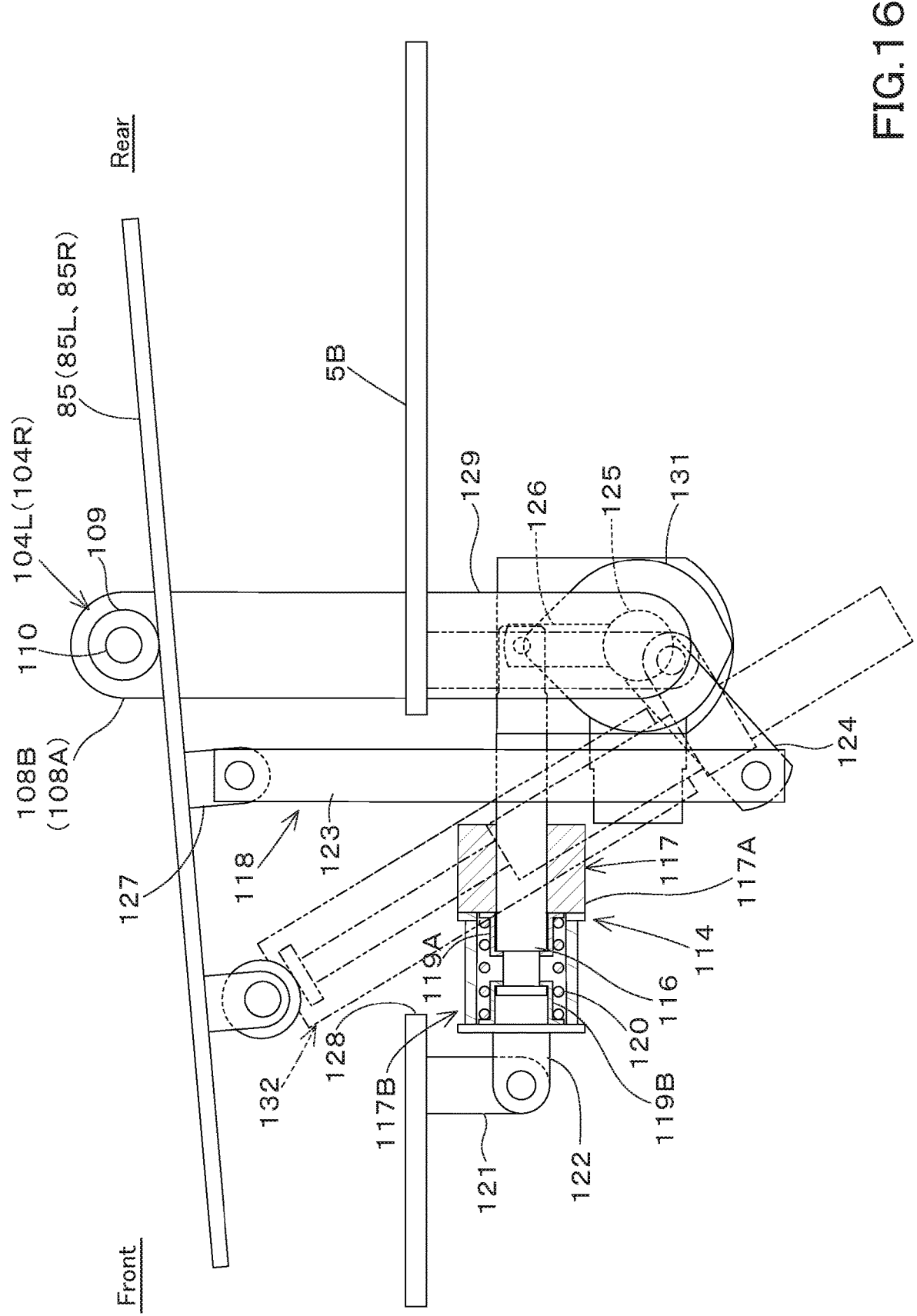
FIG. 16 is a side view of a traveling pedal and a support device of the traveling pedal according to the embodiments.

As shown in FIG. 12 and FIG. 16, the first traveling pedal 85L and the second traveling pedal 85R are inclined (forwardly inclined) moving downward as they go forward. The operator operates the operation member 82 with the upper body in the forwardly inclined position, and thus it is easy to depress the pedal because the first traveling pedal 85L and the second traveling pedal 85R are in the forwardly inclined state.

As shown in FIGS. 12 and 13, the first traveling pedal 85L is supported so as to be able to swing back and forth by the first pedal shaft 104L. The first pedal shaft 104L is located on the upper surface side of the first traveling pedal 85L. In addition, the first pedal shaft 104L is arranged rearward of the front-rear center portion of the first traveling pedal 85L. Furthermore, the first pedal shaft 104L is arranged in an inclined manner moving toward the outside of the vehicle as it goes to the rear, and is parallel to a direction orthogonal to the longitudinal direction of the first traveling pedal 85L.

The second traveling pedal 85R is supported swingably back and forth by the second pedal shaft 104R. The second pedal shaft 104R is located on the upper surface side of the second traveling pedal 85R. In addition, the second pedal shaft 104R is arranged rearward of the front-rear center portion of the second traveling pedal 85L. Furthermore, the second pedal shaft 104R is arranged in an inclined shape moving toward the outside of the vehicle as it goes rearward, and is parallel to a direction orthogonal to the longitudinal direction of the second traveling pedal 85R.

The first pedal shaft 104L and the second pedal shaft 104R are positioned at positions corresponding to the arch when the operator puts their feet on the first traveling pedal 85L and the second traveling pedal 85R.

Figure 17:
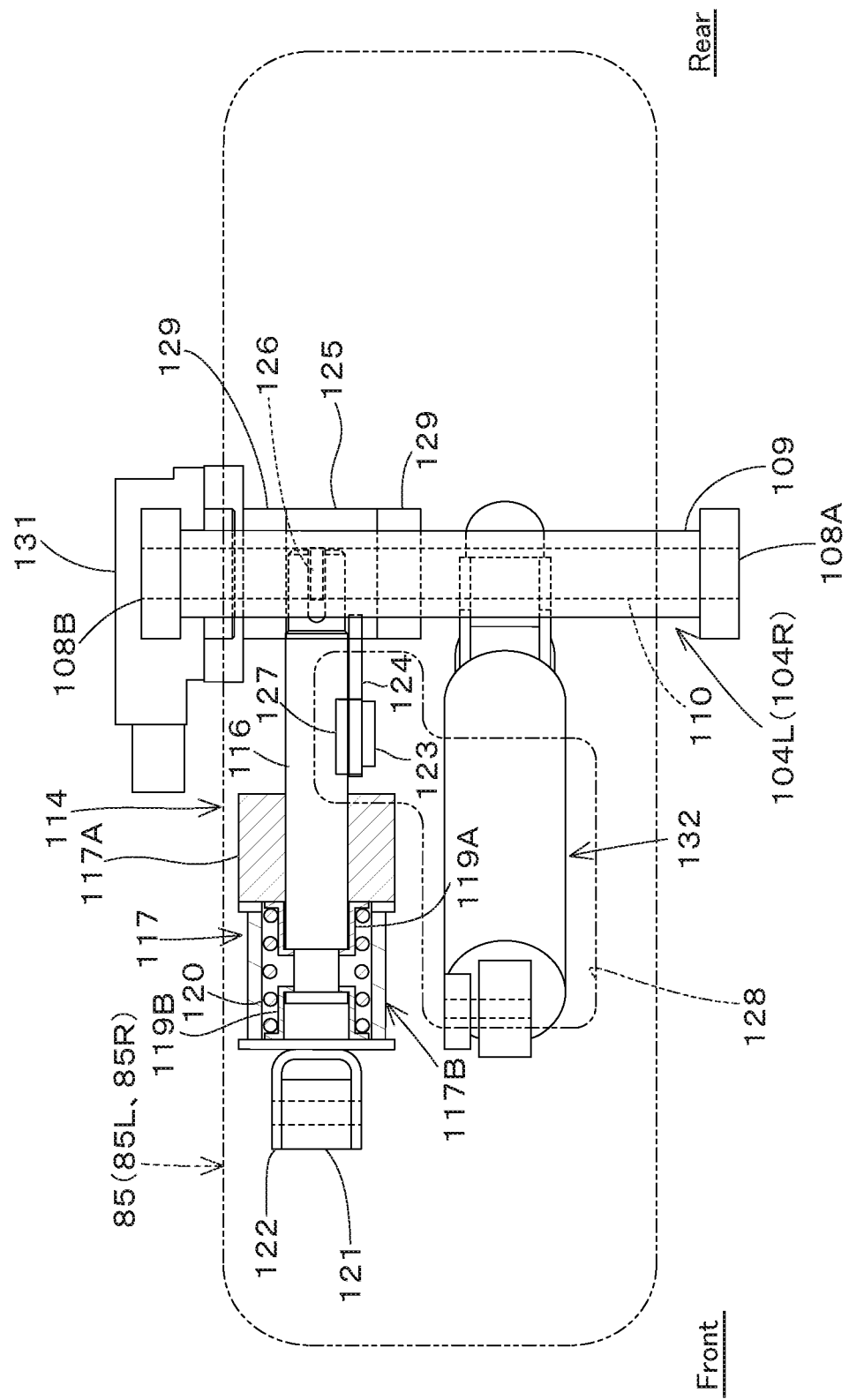
FIG. 17 is a plan view of the traveling pedal and the support device of the traveling pedal according to the embodiments.

FIG. 16 shows a side view of the first traveling pedal 85L, and FIG. 17 shows a plan view of the first traveling pedal 85L. Since the support structure of the second traveling pedal 85R is similar to the support structure of the first traveling pedal 85L, the support structure of the first traveling pedal 85L will be described, and the description of the support structure of the second traveling pedal 85R will be omitted.

As shown in FIG. 16 and FIG. 17, the first pedal shaft 104L (second pedal shaft 104R) includes a cylindrical rotary shaft 109 fixed to the first traveling pedal 85L (second traveling pedal 85R), and a rotary shaft. And a support shaft 110 which is inserted through 109. The support shaft 110 is fixed to pedal brackets 108A and 108B erected on the floor 5B. The pedal bracket 108A is located outside the first pedal shaft 104L, and the pedal bracket 108B is located inside the first pedal shaft 104L.

The first traveling pedal 85L (second traveling pedal 85R) is rockably supported on the floor 5B back and forth via the first pedal shaft 104L and the pedal brackets 108A and 108B.

In addition, the first traveling pedal 85L is regulated by the pedal regulation mechanism 114 to swing. The pedal regulation mechanism 114 has a rod member 116, a holder member 117 for supporting the rod member 116, and a transmission mechanism 118 for transmitting the movement of the first traveling pedal 85L to the rod member 116.

The rod member 116 is arranged below the first traveling pedal 85L and on the lower surface side of the floor 5B along the floor 5B. The front portion of the rod member 116 is inserted into the holder member 117. The holder member 117 has a support portion 117A that slidably supports the rod member 116 in the axial direction, and an accommodation portion 117B.

In the housing portion 117B, spring receiving members 119A and 119B engaged with the rod member 116, and a biasing member 120 provided in a compressed state between the spring receiving member 119A and the spring receiving member 119B are provided. The biasing member 120 is formed of a coil spring, and the rod member 116 is inserted through the biasing member 120. A attachment piece 122 is fixed to the front of the holder member 117, and the attachment piece 122 is pivotally supported by a stay 121 fixed to the lower surface of the floor 5B.

The transmission mechanism 118 has a link 123, a first arm 124, a pivoting member 125, and a second arm 126. The upper end of the link 123 is pivotally supported by a attachment piece 127 fixed on the lower surface of the first traveling pedal 85L and on the front side of the first pedal shaft 104L. The link 123 is inserted through an insertion hole 128 formed through the floor 5B, and the lower end side is pivotally supported by the first arm 124. The first arm 124 is fixed to a pivoting member 125 rotatably supported by a stay 129 fixed to the lower surface of the floor 5B. The second arm 126 is fixed to the pivoting member 125 and pivotally supported on the rear end side of the rod member 116.

When the first traveling pedal 85L is stepped forward, the link 123 is pushed downward and the first arm 124, the pivoting member 125 and the second arm 126 integrally rotate to push the rod member 116 forward. Then, the spring receiving member 119A moves integrally with the rod member 116 and compresses the biasing member 120. When the spring receiving member 119A abuts on the spring receiving member 119B, swinging of the first traveling pedal 85L in the stepping-in direction in front is restricted.

Further, when the first traveling pedal 85L is depressed rearward, the link 123 is pulled upward and the first arm 124, the pivoting member 125 and the second arm 126 integrally rotate to draw the rod member 116 rearward. Then, the spring receiving member 119B moves integrally with the rod member 116 to compress the biasing member 120. When the spring receiving member 119B abuts on the spring receiving member 119A, swinging of the first traveling pedal 85L in the rear in the stepping-in direction is restricted.

When the first traveling pedal 85L is released from the front or the back, the biasing member 120 returns the first traveling pedal 85L to neutral. The biasing member 120 applies an operation load to the first traveling pedal 85L.

Further, the amount of depression and the direction of depression of the first traveling pedal 85L are detected by the angle sensor 131. The angle sensor 131 is formed, for example, by a potentiometer. The angle sensor 131 detects the depression amount and depression direction of the first traveling pedal 85L by detecting the rotation angle and the rotation direction of the rotation member 125. A detection signal from the angle sensor 131 is sent to the control device U1. The control device U1 controls a control valve that controls the first traveling motor M1 based on a detection signal of the angle sensor 131.

Further, the front portion of the first traveling pedal 85L is supported by the damper device 132 in order to give a natural pedal operation feeling.

The dozer lever 80 is an operation lever for operating the dozer device 7.

Figure 18:
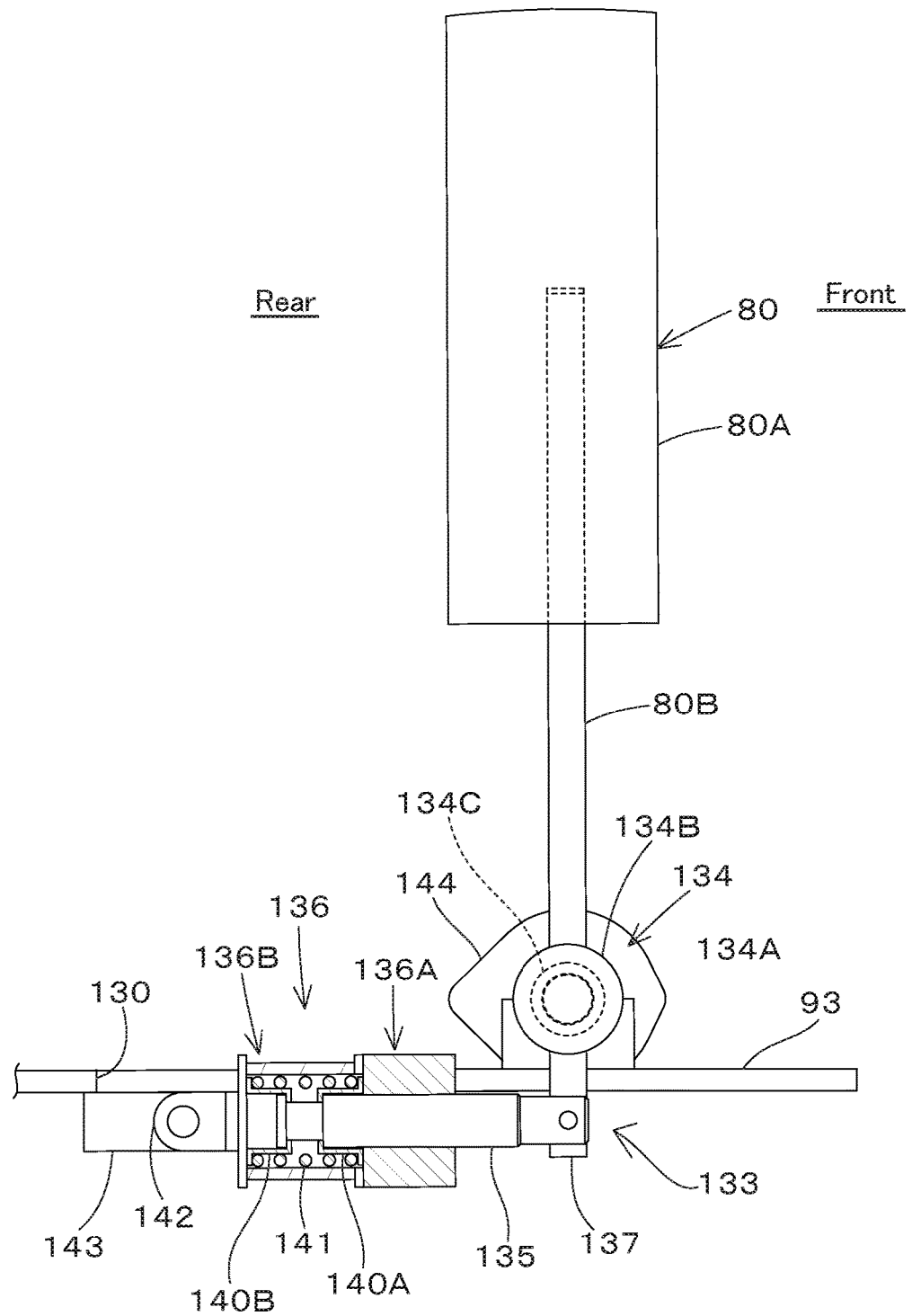
FIG. 18 is a side view of a dozer lever and a support device of the dozer lever according to the embodiments.
Figure 19:
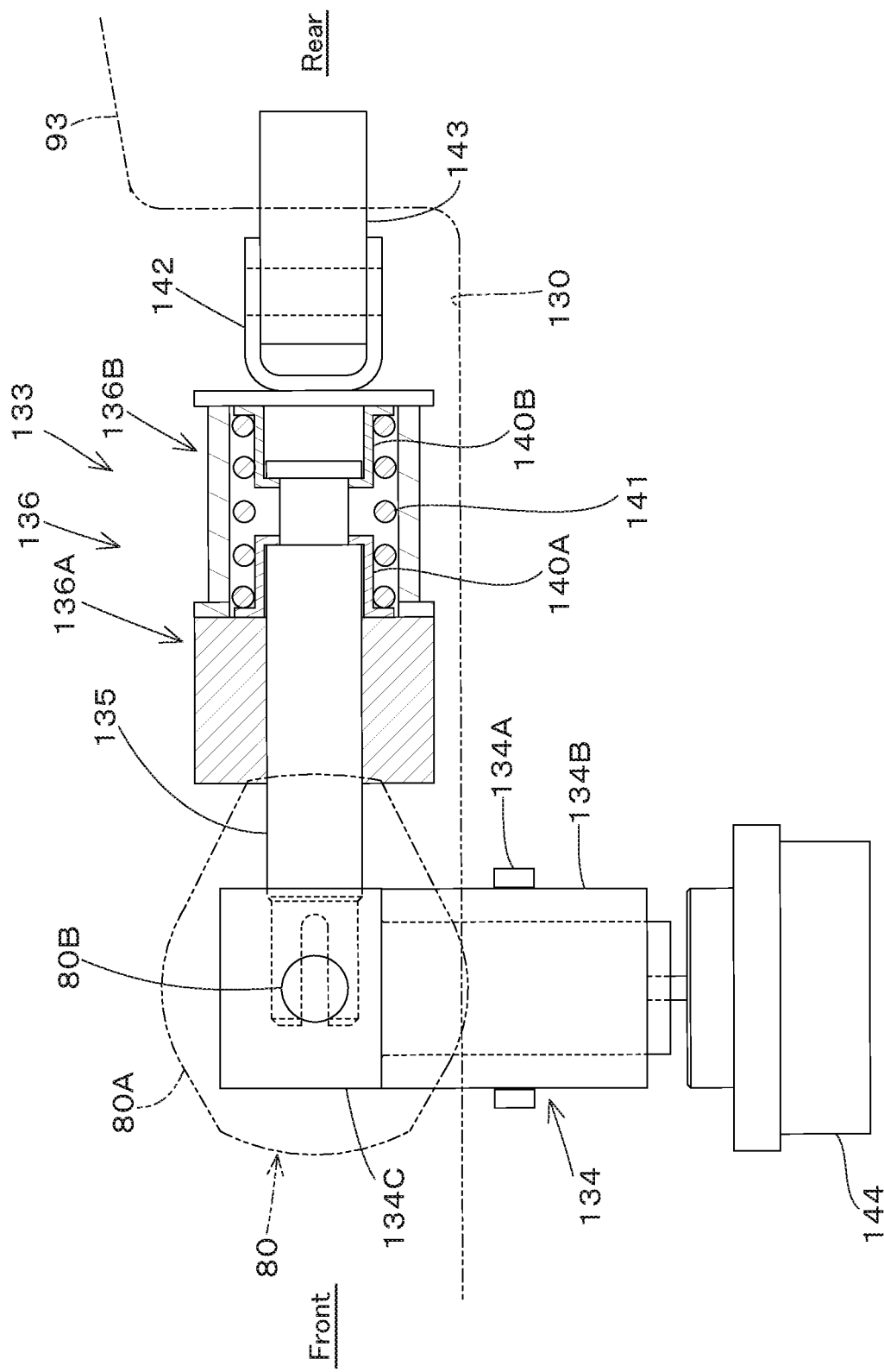
FIG. 19 is a view illustrating the dozer lever and the support device of the dozer lever according to the embodiments.

As shown in FIG. 18 and FIG. 19, the dozer lever 80 has a grip 80A gripped by the operator and a lever shaft 80B to which the grip 80A is attached. As shown in FIG. 13, the dozer lever 80 is provided on the right side of the attachment base 93. On the right side of the attachment base 93, a notch 130 is provided to avoid interference with the lever restricting mechanism 136 described later.

As shown in FIG. 18 and FIG. 19, the dozer lever 80 is supported by the lever support portion 134. The lever support portion 134 has a support bracket 134A fixed to the upper surface of the attachment base 93, a support cylinder 134B fixed to the support bracket 134A, and a pivoting member 134C rotatably supported by the support cylinder 134B. The lower end of the lever shaft 80B is fixed to the rotation member 134C. Thus, the dozer lever 80 is supported by the attachment base 93 so as to be able to swing back and forth.

As shown in FIGS. 18 and 19, a lever restricting mechanism 133 that restricts the swing of the dozer lever 80 is provided on the lower surface side of the attachment base 93. The lever support mechanism 133 has a rod member (interlocking member) 135, a holder member 136 for supporting the rod member 135, and an interlocking arm 137 for transmitting the movement of the dozer lever 80 to the rod member 135.

The rod member 135 is arranged on the lower surface side of the attachment base 93 and along the lower surface. The rear portion of the rod member 135 is inserted into the holder member 136. The front portion of the rod member 135 is pivotally supported by the distal end (lower end) of the interlocking arm 137. The base end (upper end) of the interlocking arm 137 is fixed to the pivoting member 134C. Thus, the rod member 135 moves following the swing of the dozer lever 80.

The holder member 136 has a support portion 136A that slidably supports the rod member 135 in the axial direction, and a housing portion 136B. In the housing portion 136B, spring receiving members 140A and 140B engaged with the rod member 135, and a neutral spring 141 provided in a compressed shape between the spring receiving member 140A and the spring receiving member 140B are provided. The neutral spring 141 is formed of a coil spring, and the rod member 135 is inserted through the neutral spring 141. That is, the neutral spring 141 is provided along the rod member 135. The attachment piece 142 is fixed to the rear of the holder member 136, and the attachment piece 142 is pivotally supported by a stay 143 fixed to the lower surface of the attachment base 93.

When the dozer lever 80 is pivoted to the front side, the interlocking arm 137 is pivoted to the rear and the rod member 135 is pushed in a direction along the lower surface of the attachment base 93 at the rear. Then, the spring receiving member 140A moves integrally with the rod member 135 and compresses the neutral spring 141. When the spring receiving member 140A abuts on the spring receiving member 140B, the forward swing of the dozer lever 80 is restricted.

Further, when the dozer lever 80 is swung rearward, the interlocking arm 137 is swung forward, and the rod member 135 is pulled forward in the direction along the lower surface of the attachment base 93. Then, the spring receiving member 140B moves integrally with the rod member 135 and compresses the neutral spring 141. When the spring receiving member 140B abuts on the spring receiving member 140A, the rearward swing of the dozer lever 80 is restricted.

The movement of the rod member 135 in a predetermined range in the direction along the lower surface of the attachment base 93 restricts the swing of the dozer lever 80.

When the swing operation of the dozer lever 80 is released, the neutral spring 141 returns the dozer lever 80 to the neutral position from the swing position. In addition, an operating load is applied to the dozer lever 80 by the neutral spring 141.

In the dozer lever 80, the angle sensor 144 detects the swing amount and the swing direction. The angle sensor 144 is formed, for example, by a potentiometer. The angle sensor 144 detects the depression amount and depression direction of the first traveling pedal 85L by detecting the rotation angle and the rotation direction of the rotation member 125. The detection signal from the angle sensor 144 is sent to the controller U1. The control device U1 controls a control valve that controls the dozer cylinder based on the detection signal of angle sensor 144.

Figure 21:
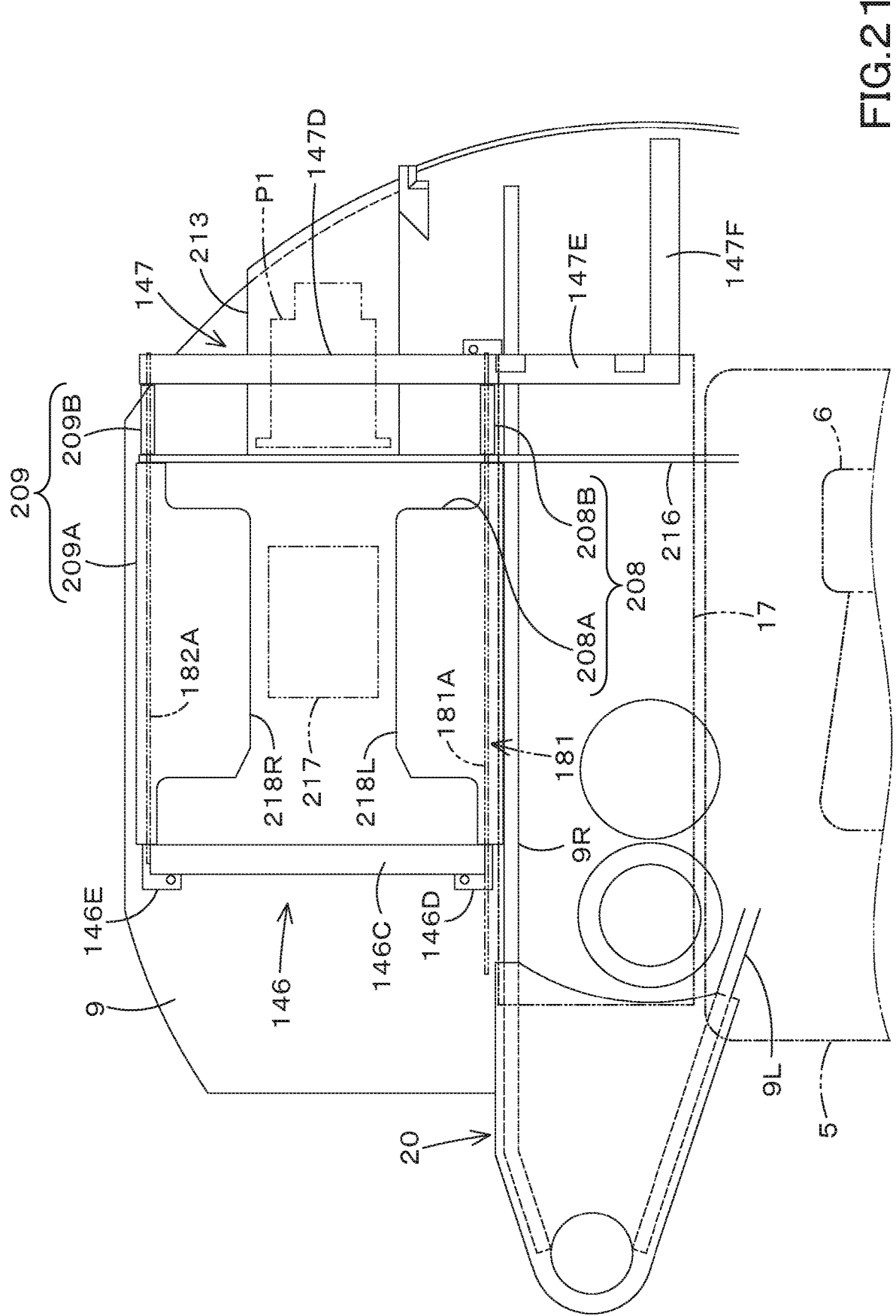
FIG. 21 is a plan view illustrating a right side of a machine body according to the embodiments.

As shown in FIG. 21, a front support frame (support frame) 146 and a rear support frame (support frame) 147 are provided on the other side (right side) of the turn base 9 in the machine width direction K2. The front support frame 146 is provided on the front side of the swivel base 9, and the rear support frame 147 is provided on the rear side of the swivel base 9. The cover device 14 and the like are supported by the front support frame 146 and the rear support frame 147.

Figure 22:
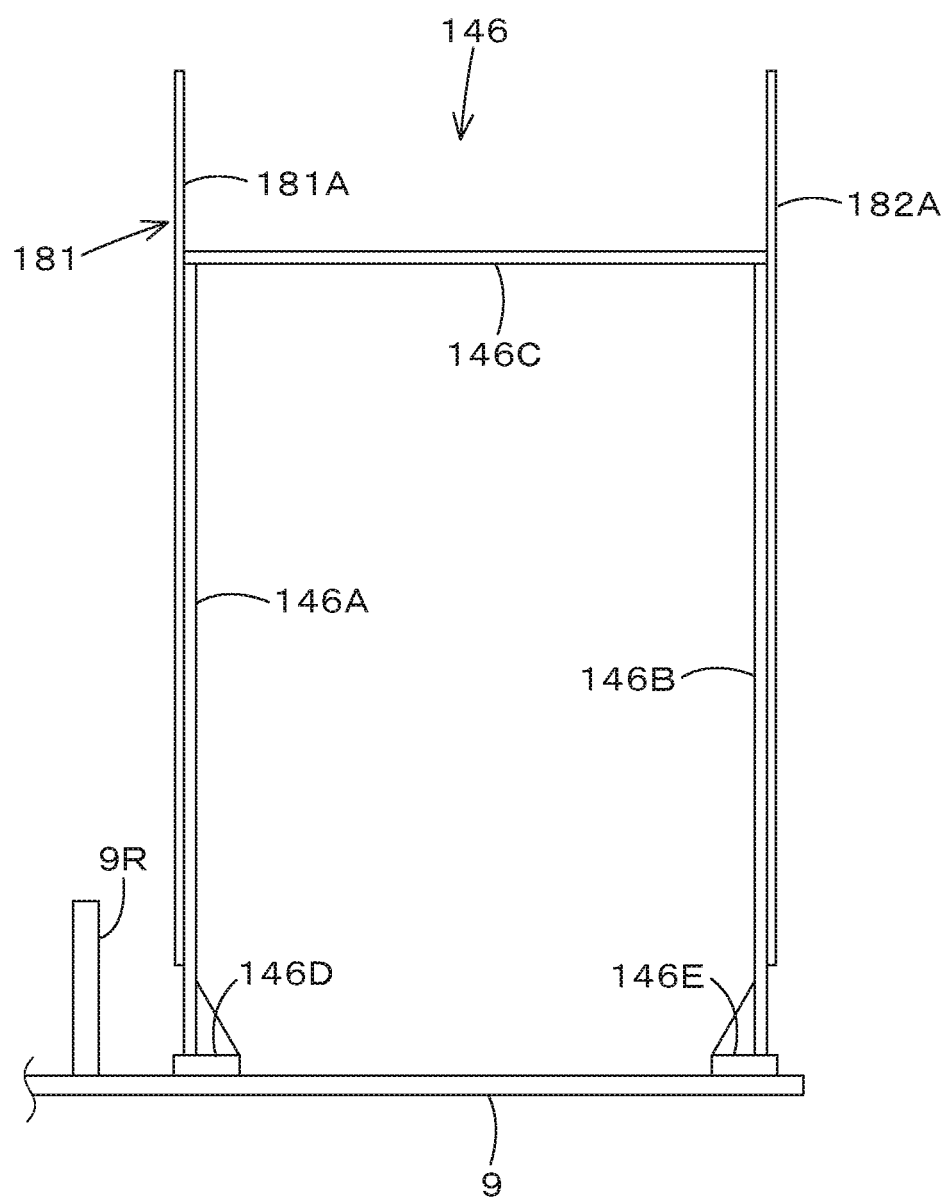
FIG. 22 is a back view of a front support frame according to the embodiments.

As shown in FIG. 22, the front support frame 146 includes the first front support post 146A and the second front support post 146B arranged in the machine width direction K2, and includes a front beam member 146C connecting the upper portions of the first front support post 146A and the second front support post 146B. The first front support post 146A is located on the right side of the vertical rib 9R, and is erected on the turn base 9 via a base plate 146D. The second front support post 146B is located on the right end side of the turn base 9 and is erected on the turn base 9 via the base plate 146E.

Figure 23:
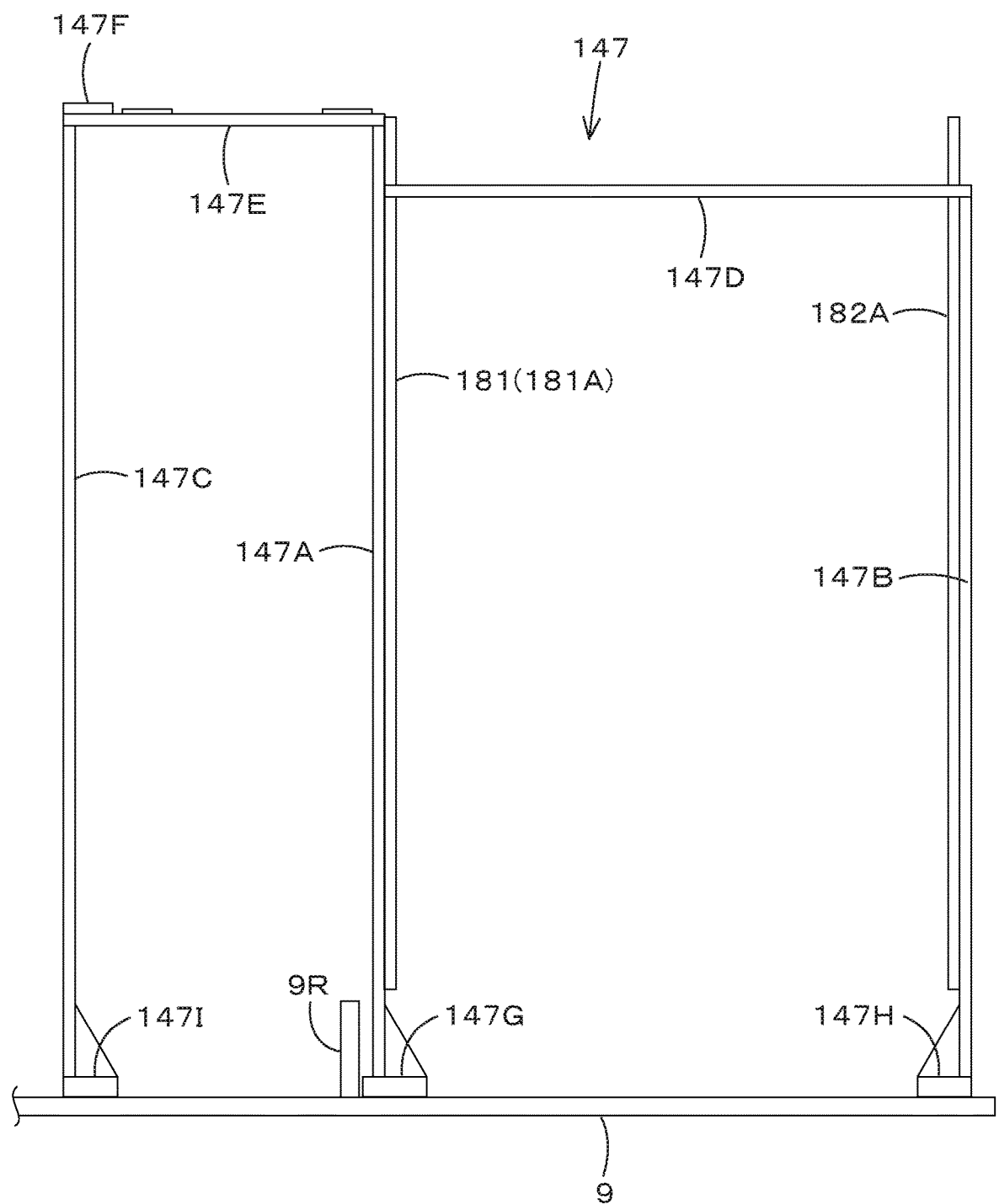
FIG. 23 is a back view of a rear support frame according to the embodiments.
Figure 24:
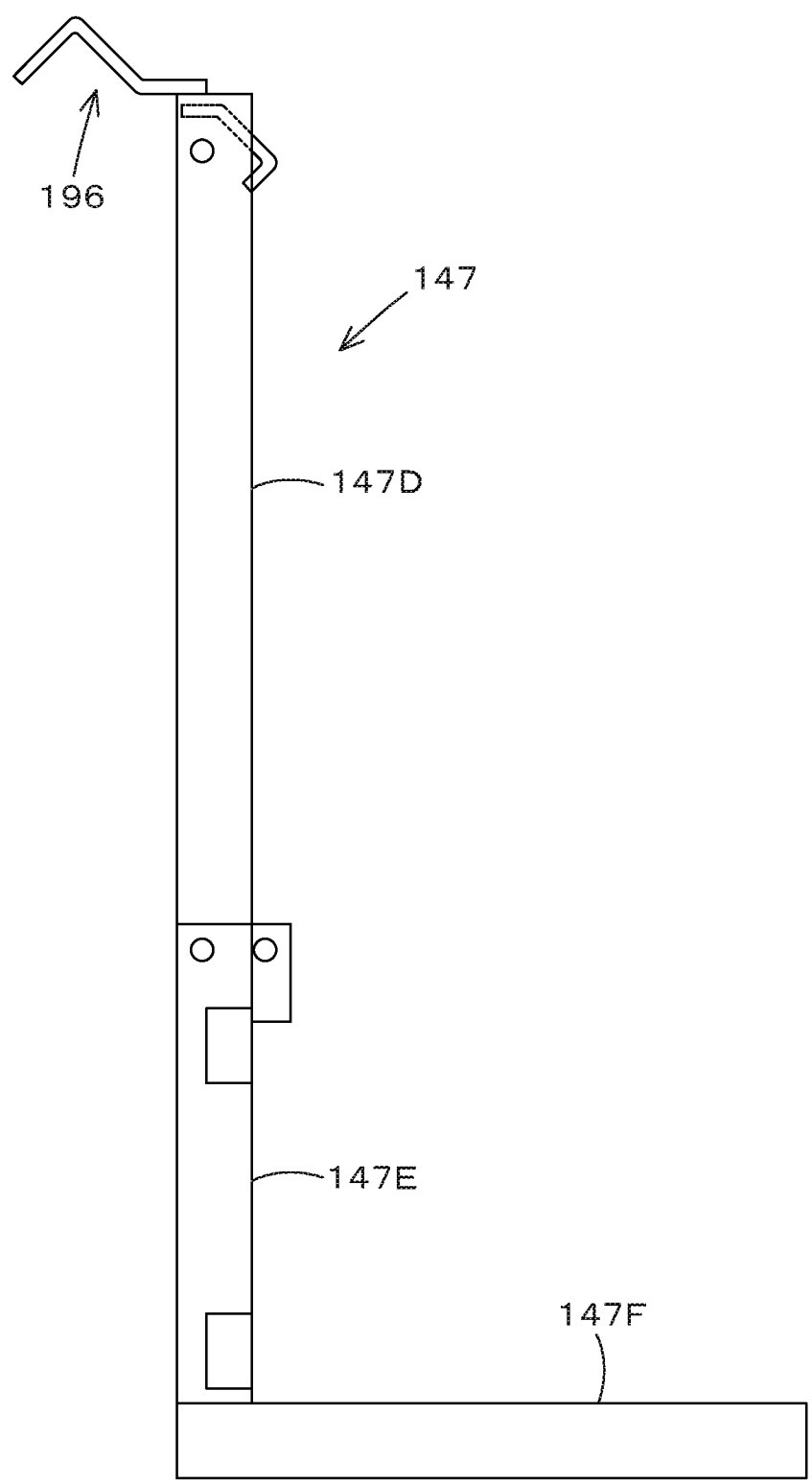
FIG. 24 is a plan view of the front support frame according to the embodiments.

As shown in FIG. 23, the rear support frame 147 includes a first rear support (first support) 147A, a second rear support (second support) 147B, a third rear support 147C, and a first rear beam member Beam member 147D, a second back beam member 147E, and an upper frame member 147F.

The first back support 147A, the second back support 147B, and the third back support 147C are arranged side by side in the machine width direction K2. The first rear support post 147A is located on the right side of the vertical rib 9R, and is erected on the turn base 9 via the base plate 147G. The second rear support post 147B is located on the right end side of the turn base 9 and is erected on the turn base 9 via the base plate 147H. The third rear support column 147C is located on the left side of the first rear support column 147A and substantially in the center of the turn base 9 in the machine width direction K2, and is erected on the turn base 9 via the base plate 147I. The first back beam member 147D connects the tops of the first back support 147A and the second back support 147B. The second rear beam member 147E connects the upper portions of the second rear support 147B and the third rear support 147C. The upper frame member 147F protrudes rearward from the left end of the second rear beam member 147E.

Figure 25:
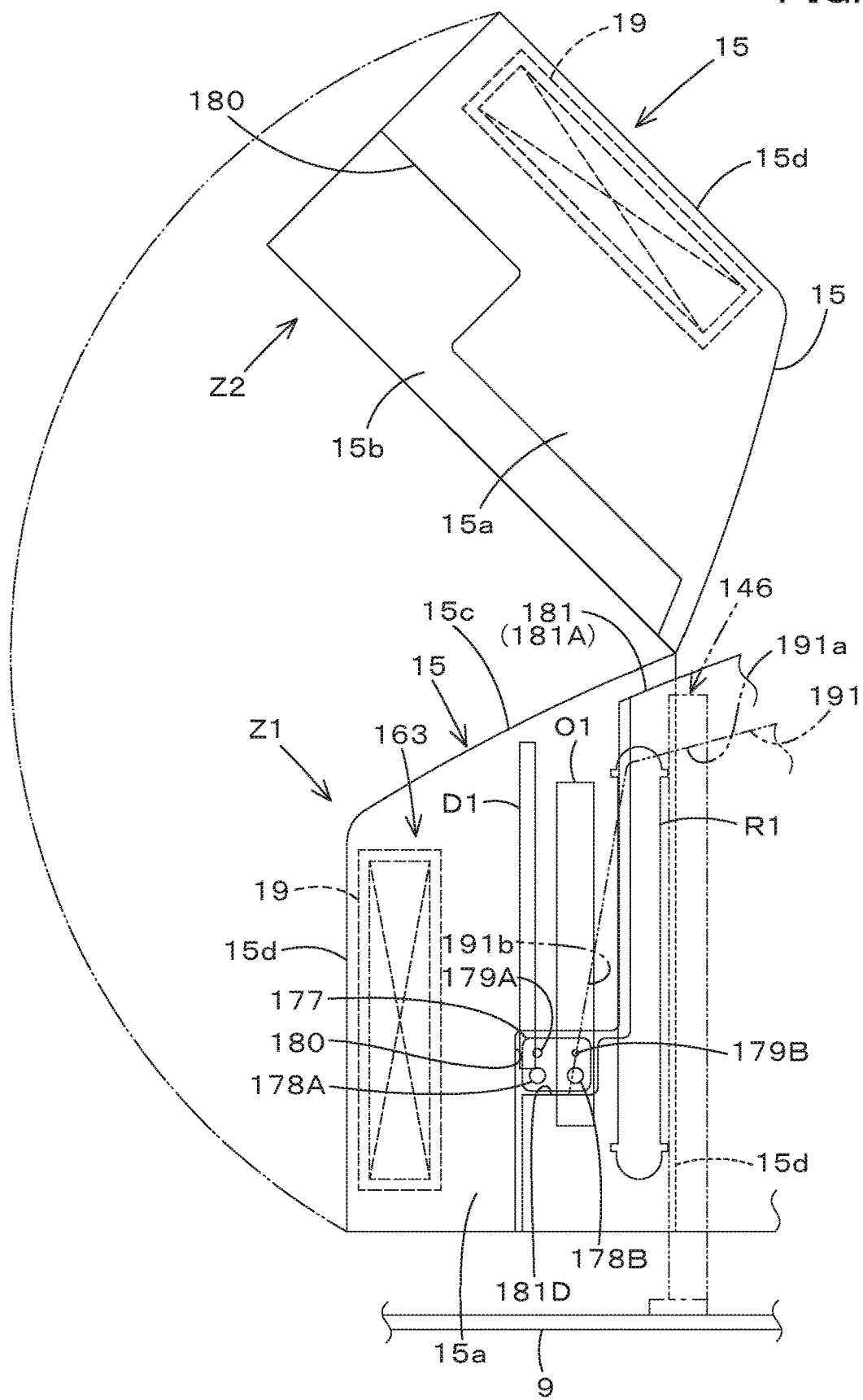
FIG. 25 is a side view illustrating a right front portion of the machine body according to the embodiments.

As shown in FIG. 25, on the front side of the front support frame 146, a first cover body 15 covering the radiator R1, the oil cooler O1, the condenser D1 (referred to as a cooling device unit) and the cooling device unit are arranged.

The first cover body 15 includes a first side surface portion 15a covering the left side of the cooling device unit, a second side surface portion 15b covering the right side, an upper surface portion 15c covering the upper side, and a front surface portion 15d covering the front, and the lower side and the rear side are open. Further, the first cover body 15 is pivotally supported at its rear upper portion by the front beam member 146C of the front support frame 146 via a hinge or the like (not shown), and the installing portion of the cooling device unit are opened and closed by swinging the front portion up and down.

In FIG. 25, reference sign Z1 indicates a state in which the first cover body 15 is closed, and reference sign Z2 indicates a state in which the first cover body 15 is closed. By lifting the first cover body 15 upward and opening it, it is possible to open the arrangement portion of the cooling device unit (in front of the oil cooler O1 and the condenser D1). The outside air inlet port 19 formed on the side surface of the front of the first cover body 15 (the front of the second side surface portion 15b) is located on the front side of the condenser D1. Further, between the outside air intake port 19 and the condenser DE there is not provided a device that greatly impedes the flow of cooling air (outside air) flowing from the outside air intake port 19 to the condenser D1.

Figure 26:
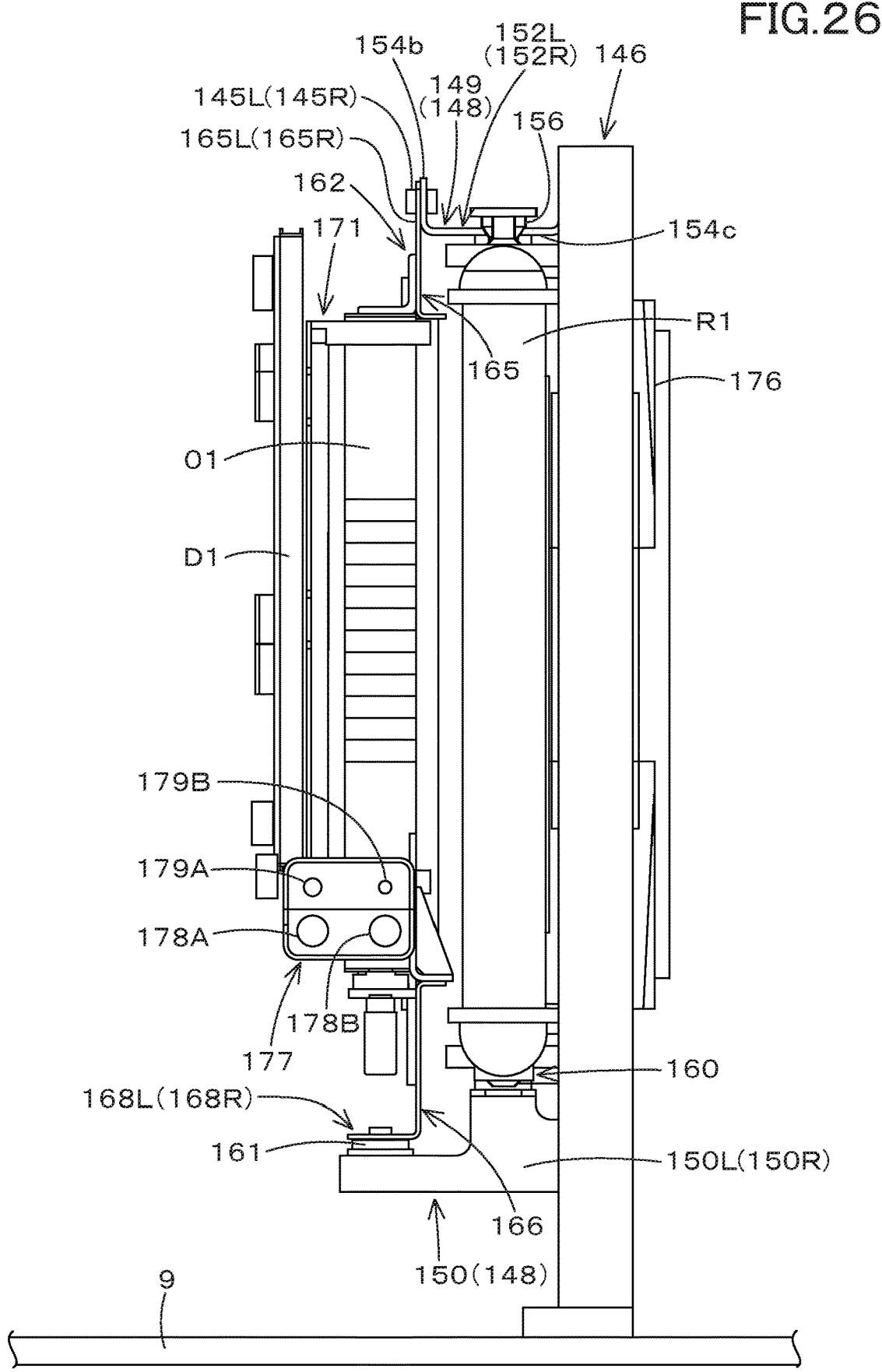
FIG. 26 is a side view of a cooling device unit according to the embodiments.
Figure 27:
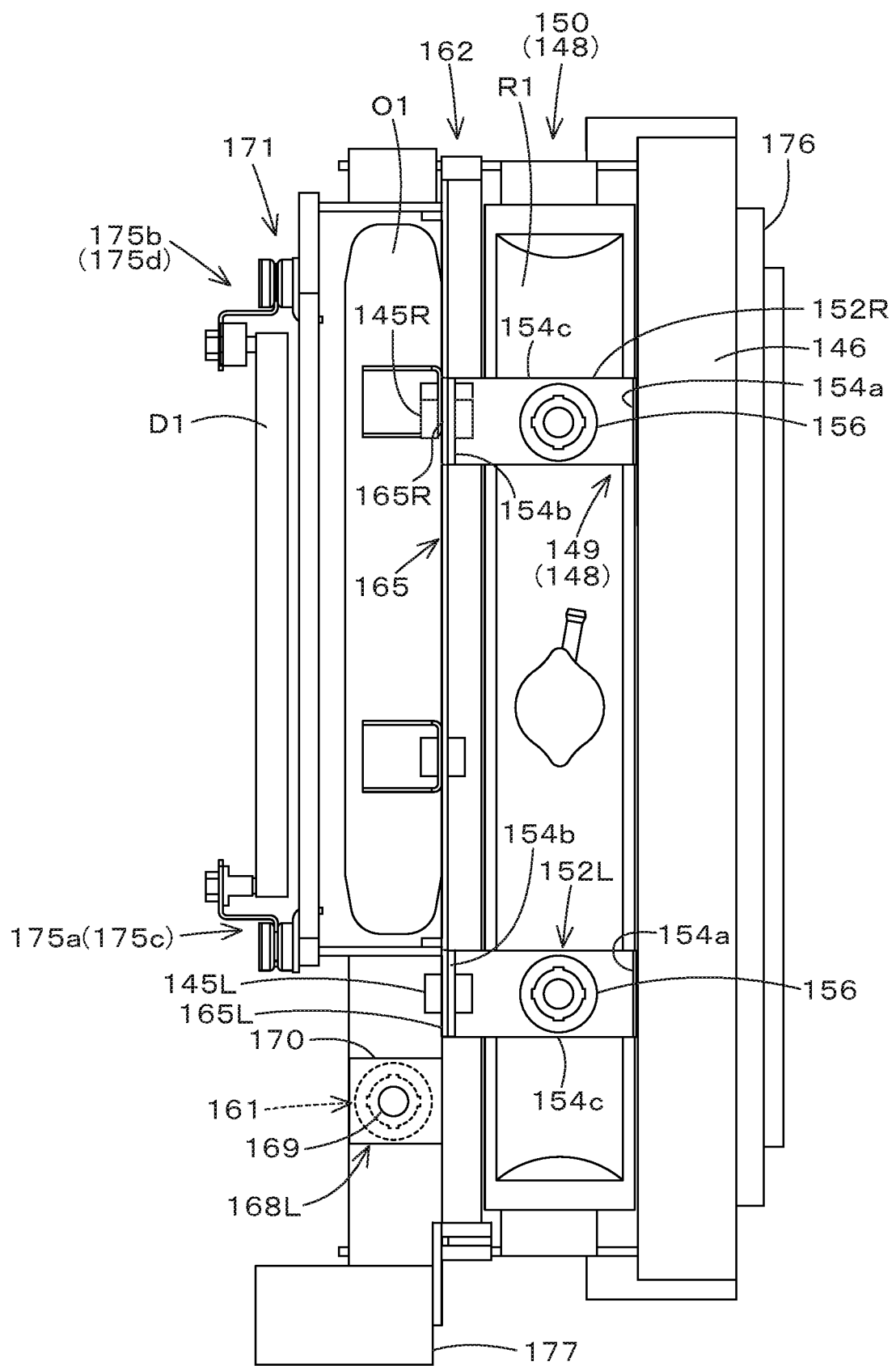
FIG. 27 is a plan view of the cooling device unit according to the embodiments.

As shown in FIG. 26 and FIG. 27, the radiator R1 is attached to the radiator bracket 148. The radiator bracket 148 is attached to the front support frame 146. A shroud 176 is attached to the rear side of the radiator R1. The shroud 176 is arranged inside the front support frame 146.

Figure 30:
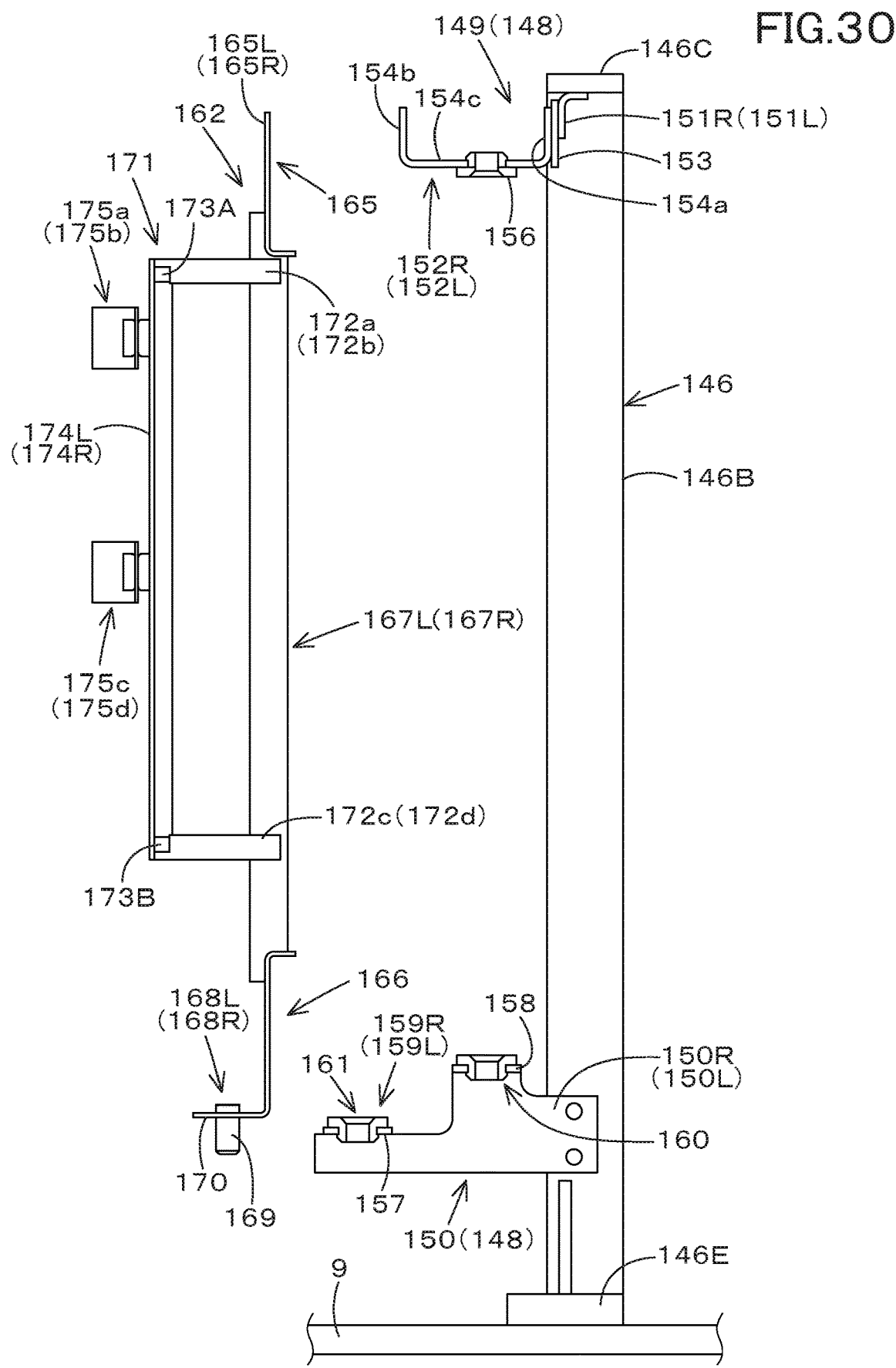
FIG. 30 is a side view illustrating a radiator bracket, an oil cooler bracket, and a condenser bracket according to the embodiment.
Figure 31:
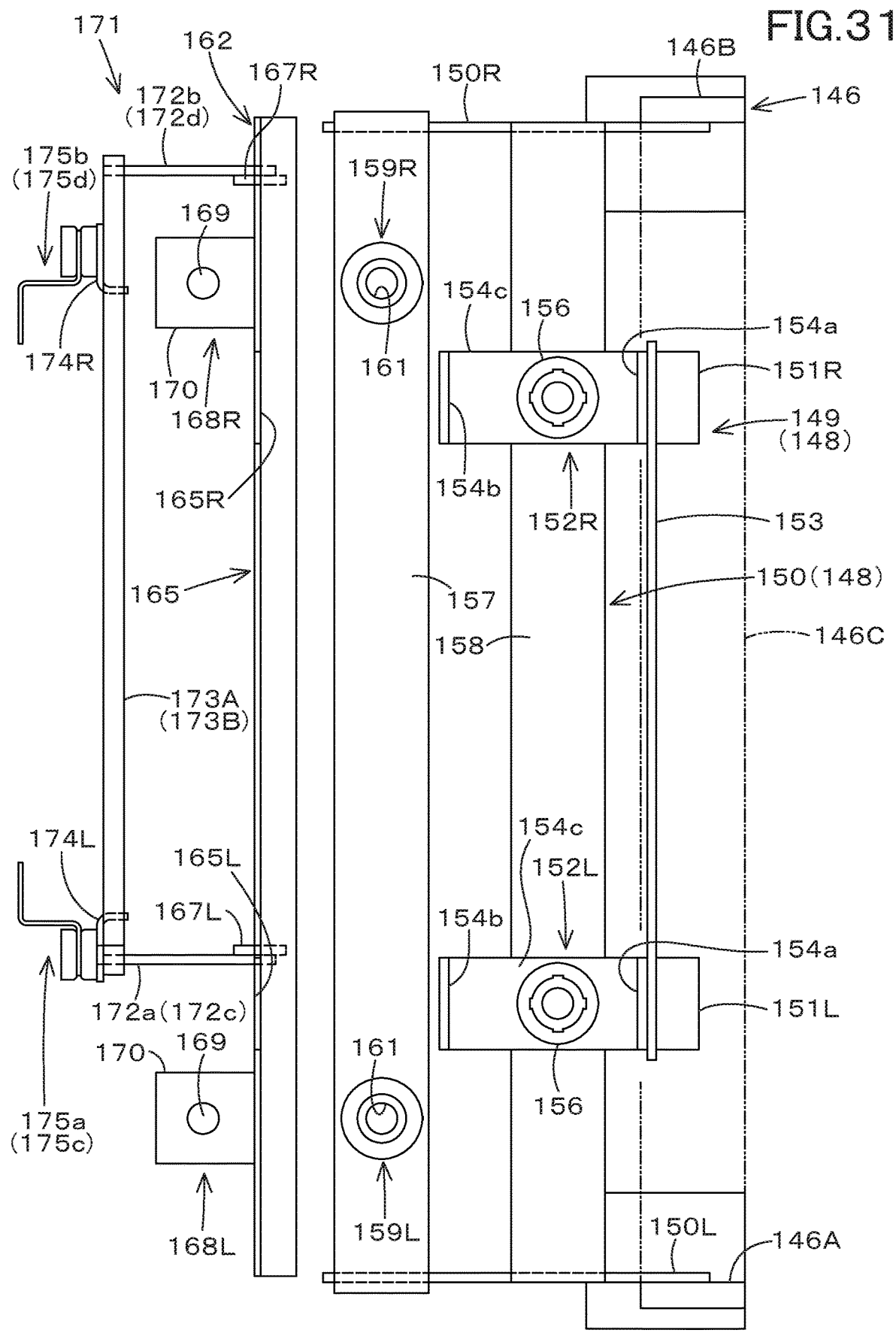
FIG. 31 is a plan view illustrating the radiator bracket, the oil cooler bracket, and the condenser bracket according to the embodiment.
Figure 32:
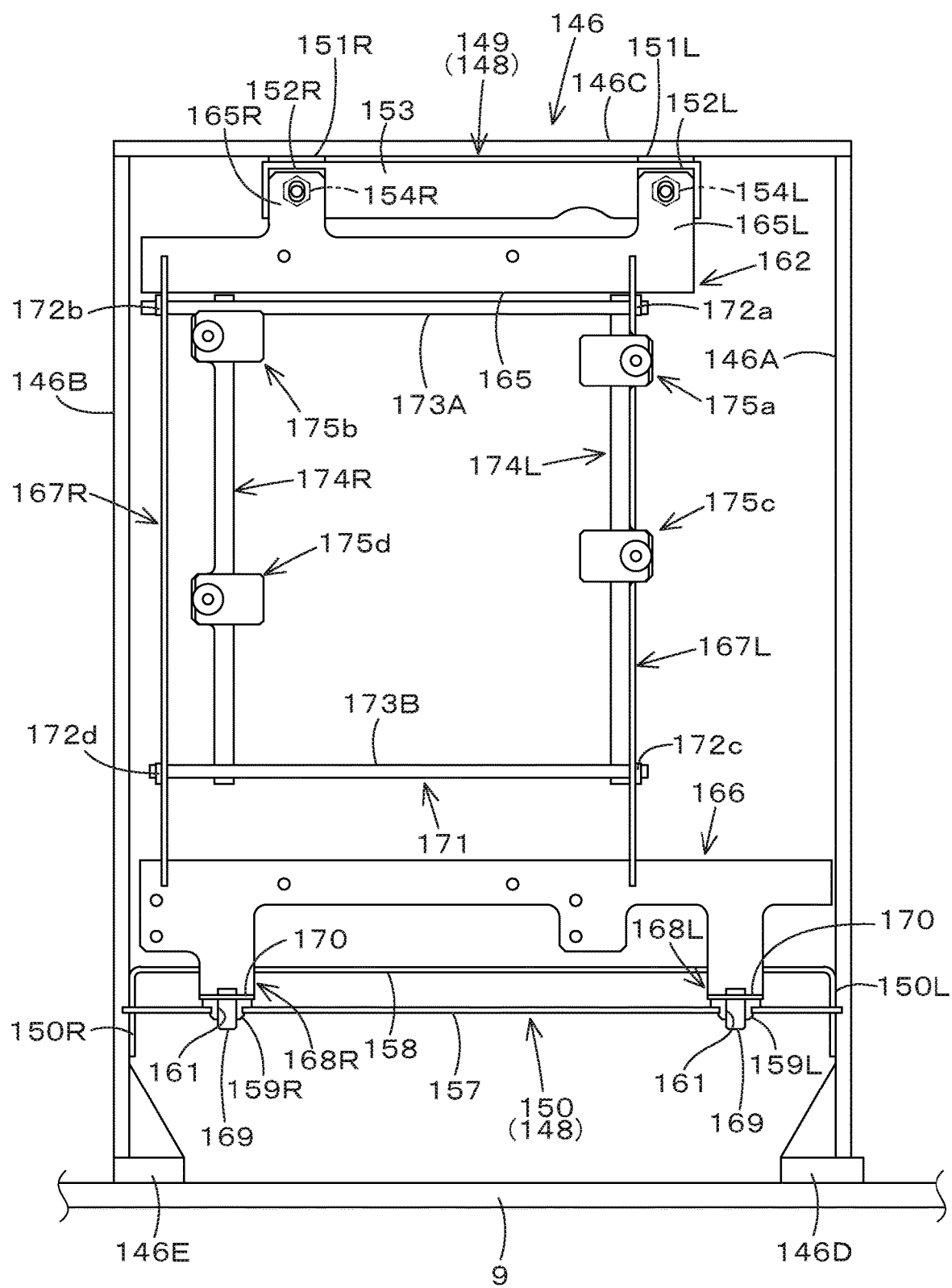
FIG. 32 is a front view illustrating the radiator bracket, the oil cooler bracket, and the condenser bracket according to the embodiment.

As shown in FIG. 30 to FIG. 32, the radiator bracket 148 has a first bracket 149 attached to the top of the front support frame 146 and a second bracket 150 attached to the bottom of the front support frame 146. The radiator R1 is provided between the first bracket 149 and the second bracket 150. The attachment stay 151L is fixed to one side (left) of the lower surface of the front beam member 146C in the machine width direction K2, and the attachment stay 151R is fixed to the other side (right).

The first bracket 149 includes a first attachment portion 152L and a first attachment portion 152R, which are arranged side by side in the machine width direction K2, and a connection plate 153 connecting the first attachment portions 152L and 152R. The left portions of the first attachment portion 152L and the connection plate 153 are attached to the attachment stay 151L, and the right portions of the first attachment portion 152R and the connection plate 153 are attached to the attachment stay 151R.

The first attachment portions 152L and 152R are projected forward from the front support frame 146. The first attachment portions 152L and 152R may include a first portion 154a connected to the connection plate 153, a second portion 154b arranged at a distance in front of the first portion 154a, and a third portion 154c connecting lower ends of the first portion 154a and the second portion 154b. The third portion 154c is provided with an upper support portion 156 made of an elastic member for supporting the upper portion of the radiator R1.

The second bracket 150 has a attachment wall 150L attached to the lower part of the first front support 146A and a attachment wall 150R attached to the lower part of the second front support 146A. The attachment walls 150L, 150R project forward from the front support frame 146. A front receiving wall 157 is provided over the front of the attachment wall 150L and the front of the attachment wall 150R, and a rear receiving wall 158 is provided over the rear of the attachment wall 150L and the rear of the attachment wall 150B.

A second attachment portion 159L is provided on one side of the front receiving wall 157 in the machine width direction K2, and a second attachment portion 159R is provided on the other side. The second attachment portions 159L and 159R are provided below the first attachment portions 152L and 152B. The second attachment portions 159L and 159R are formed of elastic members, and have open insertion holes 161 at the upper and lower sides.

The rear support wall 158 is provided with a lower support portion 160 made of an elastic member for supporting the lower portion of the radiator R1. The second attachment portions 159L and 159R are provided below the lower support portion 160.

As shown in FIG. 26 and FIG. 27, the oil cooler O1 is attached to the oil cooler bracket 162. The condenser D1 is attached to the oil cooler bracket 162. The oil cooler bracket 162 is removably attached to the radiator bracket 148.

Figure 28:
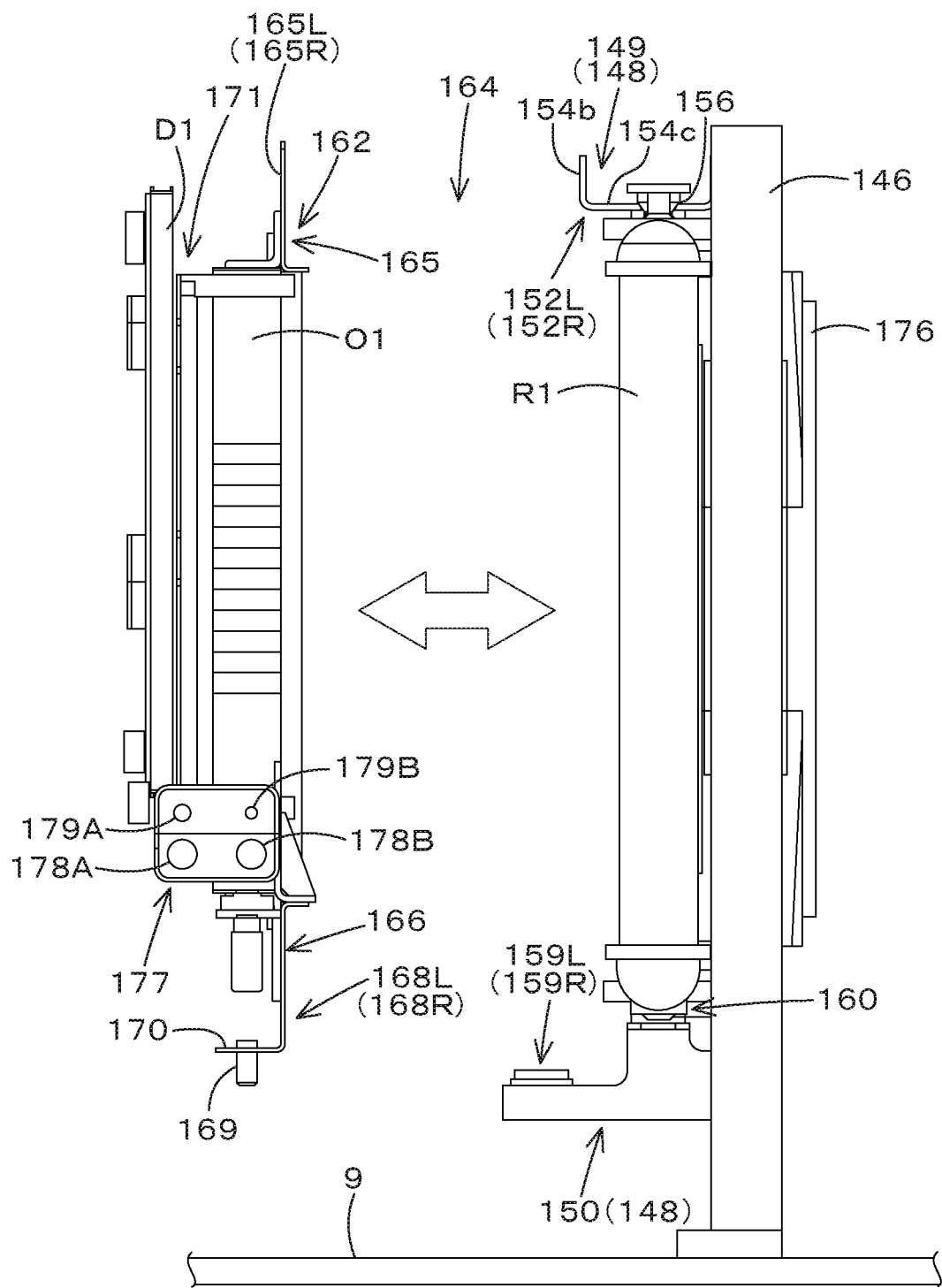
FIG. 28 is a side view illustrating a state where the oil cooler is detached according to the embodiments.
Figure 29:
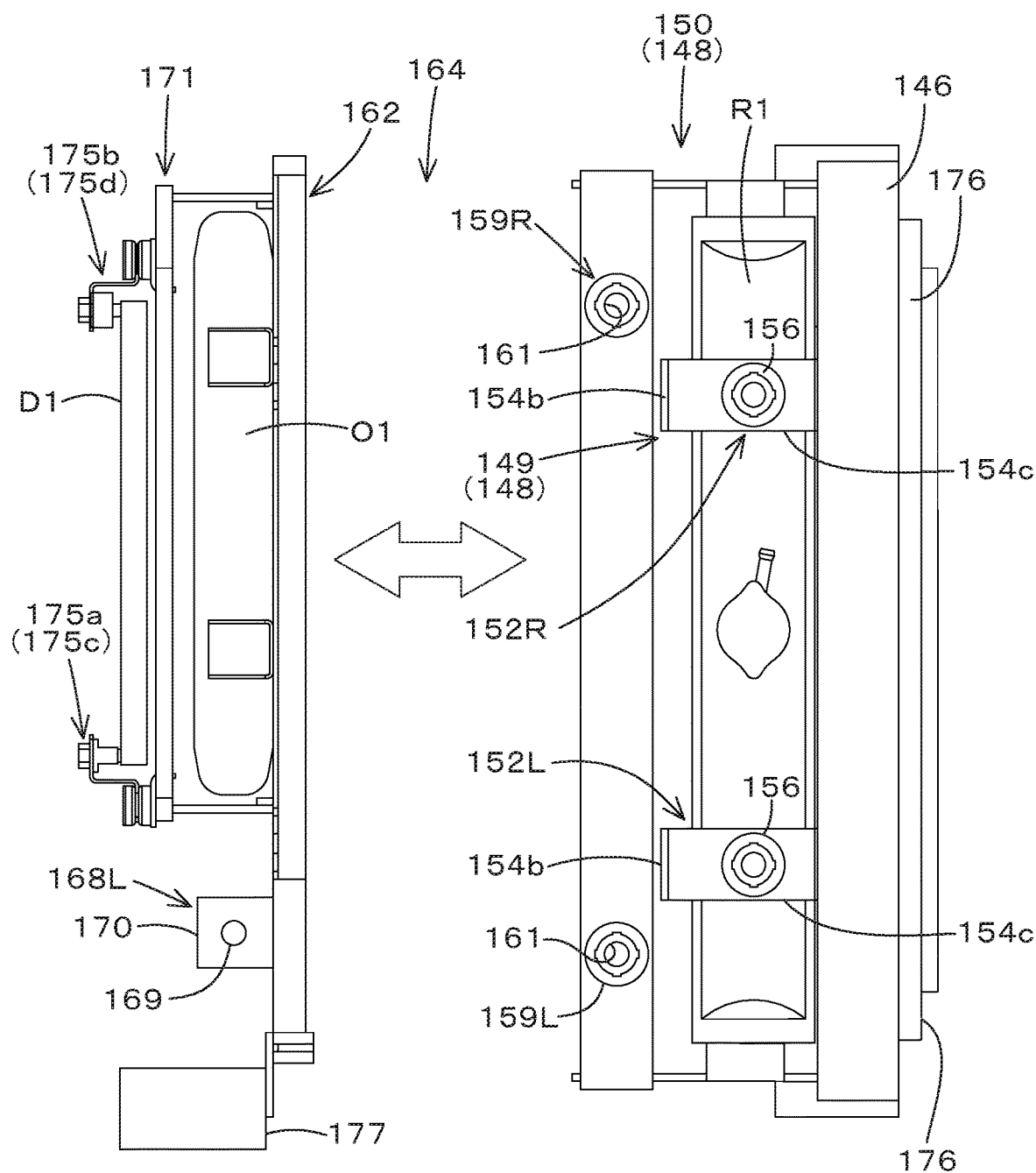
FIG. 29 is a plan view illustrating the state where the oil cooler is detached according to the embodiments.

As shown in FIG. 25, a moving space 163 for moving the oil cooler O1 and the condenser D1 is formed on the opposite side of the oil cooler O1 and the condenser D1 from the radiator R1. Thus, as shown in FIG. 28 and FIG. 29, the oil cooler O1 can be moved to a position separated from the first position by removing the oil cooler bracket 162 from the radiator bracket 148, and a cleaning space 164 is formed between the radiator R1 and the oil cooler O1 by moving the oil cooler O1, which is a space sufficient to clean them.

As shown in FIG. 30 to FIG. 32, the oil cooler bracket 162 includes an upper bracket 165, a lower bracket 166 arranged below the upper bracket 165, and connection brackets 167L and 167R connecting the upper bracket 165 and the lower bracket 166. The connection bracket 167L connects the left sides of the upper bracket 165 and the lower bracket 166 with each other. The connection bracket 167R connects the right sides of the upper bracket 165 and the lower bracket 166.

The oil cooler O1 is arranged on the front side of the oil cooler bracket 162, the upper portion thereof is fixed to the upper bracket 165, and the lower portion is fixed to the lower bracket 166 (see FIG. 26).

The upper bracket 165 includes a fixed portion 165L detachably fixed to the second portion 154b of the first attachment portion 152L by the fixing tool 145L, and includes a fixed portion 165R detachably fixed to the second portion 154b of the first attachment portion 152R by the fixing tool 145R. The fixing tools 145L and 145R are, for example, bolts. The fixing portions 165L and 165R can be detachably fixed to the first attachment portions 152L and 152R with no tools by making the fixing tool into a hooking band. In this case, the fixing portion is constituted of a pin and the first attachment portion is configured to be movable by a hinge. To fix the fixing portion to the first attachment portion, the first attachment portion is lowered from above with respect to the fixing portion and engaged via the rubber mount. In that state, the fixing portion is fixed to the first attachment portion by the hooking band.

The lower bracket 166 has an engagement portion 168L which engages with and disengages from the second attachment portion 159L, and an engagement portion 168R with which it engages with the second attachment portion 159R. The engagement portions 168L and 168R include an engagement member 169 inserted into the insertion hole 161 from above, and an contacting portion 170 held in contact with the upper surface of the second attachment portions 159L and 159R. The engagement member 169 is formed of a pin. The contact portion 170 is formed of a plate material.

The lower portion of the oil cooler bracket 162 can be easily attached to and removed from the lower portion of the radiator bracket 148 by inserting and removing the engagement member 169 vertically with respect to the insertion hole 161.

As shown in FIG. 26 and FIG. 27, a condenser bracket 171 is attached to the oil cooler bracket 162. The condenser D1 is attached to the condenser bracket 171.

As shown in FIG. 30 to FIG. 32, the condenser bracket 171 has arm portions 172a to 172d protruding from the upper and lower sides of the connection brackets 167L and 167R. The tip portions of the arm portion 172a and the arm portion 172b are connected by the upper cross member 173A, and the tip portions of the arm portion 172c and the arm portion 172d are connected by the lower cross member 173B. The left portions of the upper horizontal member 173A and the lower horizontal member 173B are connected by a first vertical member 174L, and the right portions of the upper horizontal member 173A and the lower horizontal member 173B are connected by a second vertical member 174R.

The first vertical member 174L is provided with a attachment piece 175a and a attachment piece 175c, and the second vertical member 174L is provided with an attachment piece 175b and an attachment piece 175d. As shown in FIG. 27, the condenser D1 is attached to the attachment pieces 175a to 175d.

As shown in FIG. 26 and FIG. 27, a hose guide 177 is provided on the left side of the oil cooler bracket 162.

As shown in FIG. 25, in the lower portion of the rear edge portion of the first side surface portion 15a of the first cover body 15, a cutaway portion 180 which is cut away to avoid interference with the hose guide 177 is formed. The hose guide 177 projects from the inside of the first cover 15 toward the inside of the machine through the notch 180. Hydraulic hoses 178A and 178B for circulating hydraulic fluid and refrigerant hoses 179A and 179B for circulating a refrigerant for an air conditioner are inserted through the hose guide 177. The hydraulic hoses 178A and 178B and the refrigerant hoses 179A and 179B (hereinafter, also simply referred to as hoses) are introduced into the inside of the first cover body 15 from the inboard side of the first cover body 15 via the hose guide 177. The hydraulic hoses 178A and 178B are connected to the oil cooler O1, and the refrigerant hoses 179A and 179B are connected to the condenser D1.

When the oil cooler bracket 162 is removed from the radiator bracket 148 by introducing the hose from the side (side of the machine), the hose does not disturb the oil cooler bracket 162 against the radiator bracket 148. In this manner, the radiator bracket 148 can be smoothly separated from the oil cooler bracket 162. In addition, when the oil cooler O1 is separated from the radiator R1 by introducing the hoses from the side, the hose can be easily moved (sufficiently bent), and the distance between the radiator R1 and the oil cooler O1 can be kept sufficiently.

Figure 33:
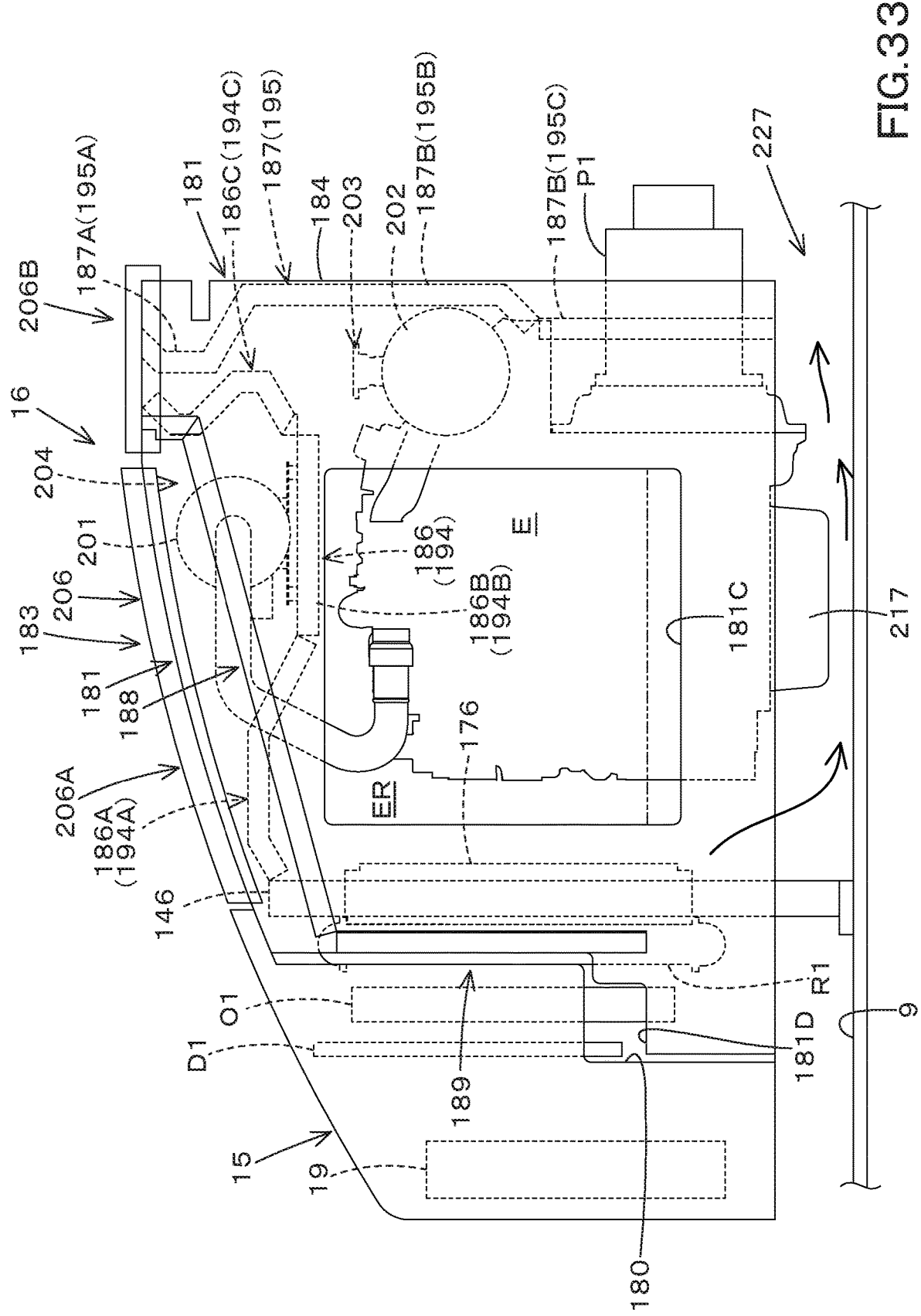
FIG. 33 is a side view illustrating a right front portion of the machine body according to the embodiments.
Figure 34:
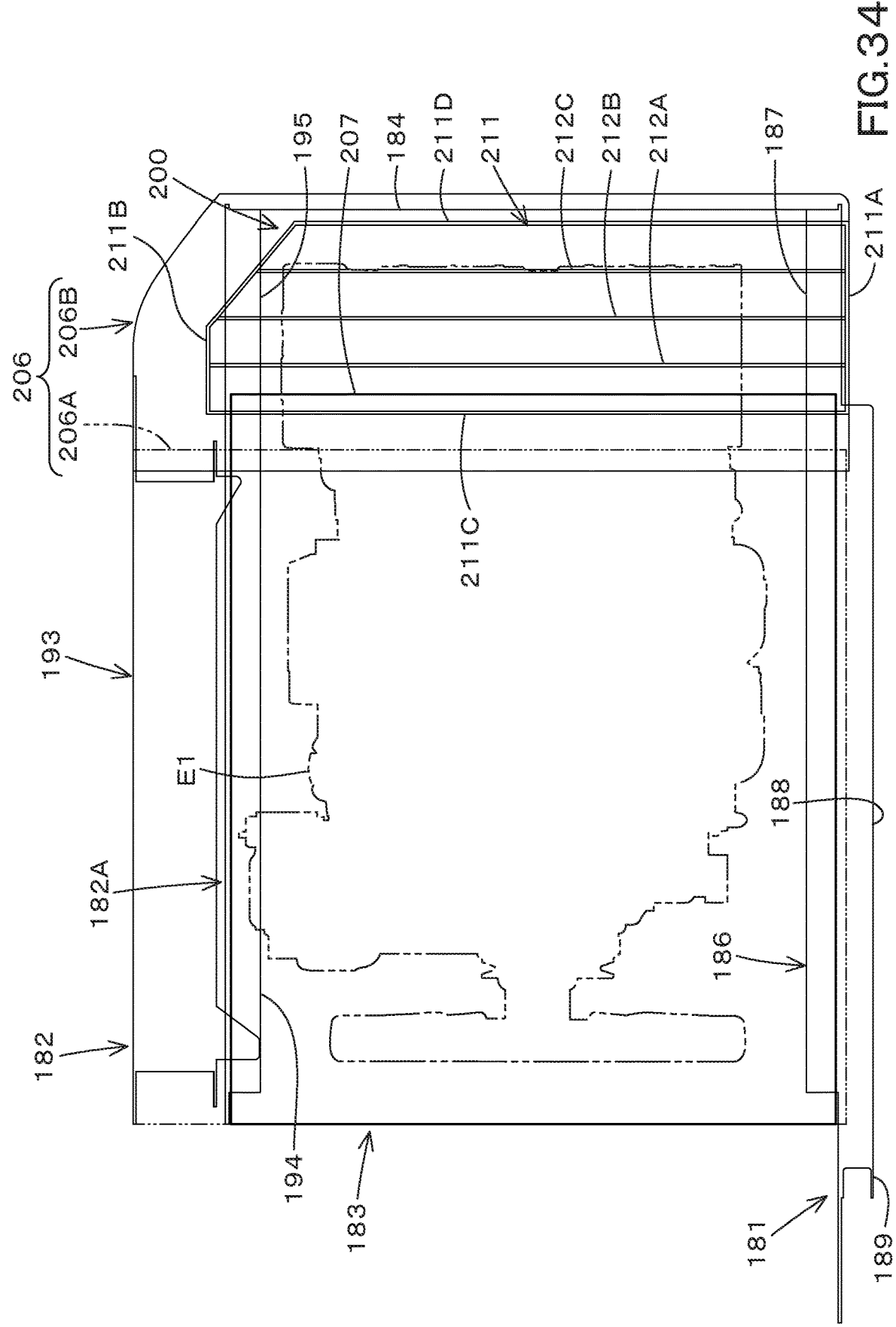
FIG. 34 is a plan view of a bonnet according to the embodiments.

As shown in FIG. 33 and FIG. 34, the bonnet 16 has a first bonnet side portion 181, a second bonnet side portion 182, a bonnet upper portion 183, and a bonnet rear portion 184.

The first bonnet side portion 181 covers the in-vehicle side (operator's side) of the prime mover E1 and forms a side of the in-vehicle side of the prime mover room ER. The second hood side 182 covers the outboard side of the prime mover E1 (opposite to the operator seat 6), and forms the outboard side of the prime mover room ER. The first bonnet side portion 181 and the second bonnet side portion 182 constitute a side surface in a direction substantially perpendicular to the flow direction of the air (cooling air) flowing over the prime mover room ER in the prime mover room ER.

The bonnet upper part 183 covers the upper side of the prime mover E1 and forms the upper surface (ceiling part) of the prime mover room ER. The bonnet rear portion 184 is a wall provided on the side where the hydraulic pump P1 is arranged, and covers the rear of the prime mover E1 and forms the rear surface of the prime mover room ER.

The front side of the prime mover room ER is separated from the inside of the first cover body 15 by a front support frame 146, a shroud 176, a partition member for partitioning between the front support frame 146 and the inner surface of the bonnet 16, a partition member for partitioning between the front support frame 146 and the shroud 176, and the like. The lower surface side of the bonnet 16 is open, and the lower surface (bottom) of the prime mover room ER is formed of the turn base plate 9. Thus, the prime mover room ER is formed on the turn base 9. The prime mover E1 is anti-vibration supported in the prime mover room ER by a mounting member (not shown).

Figure 35:
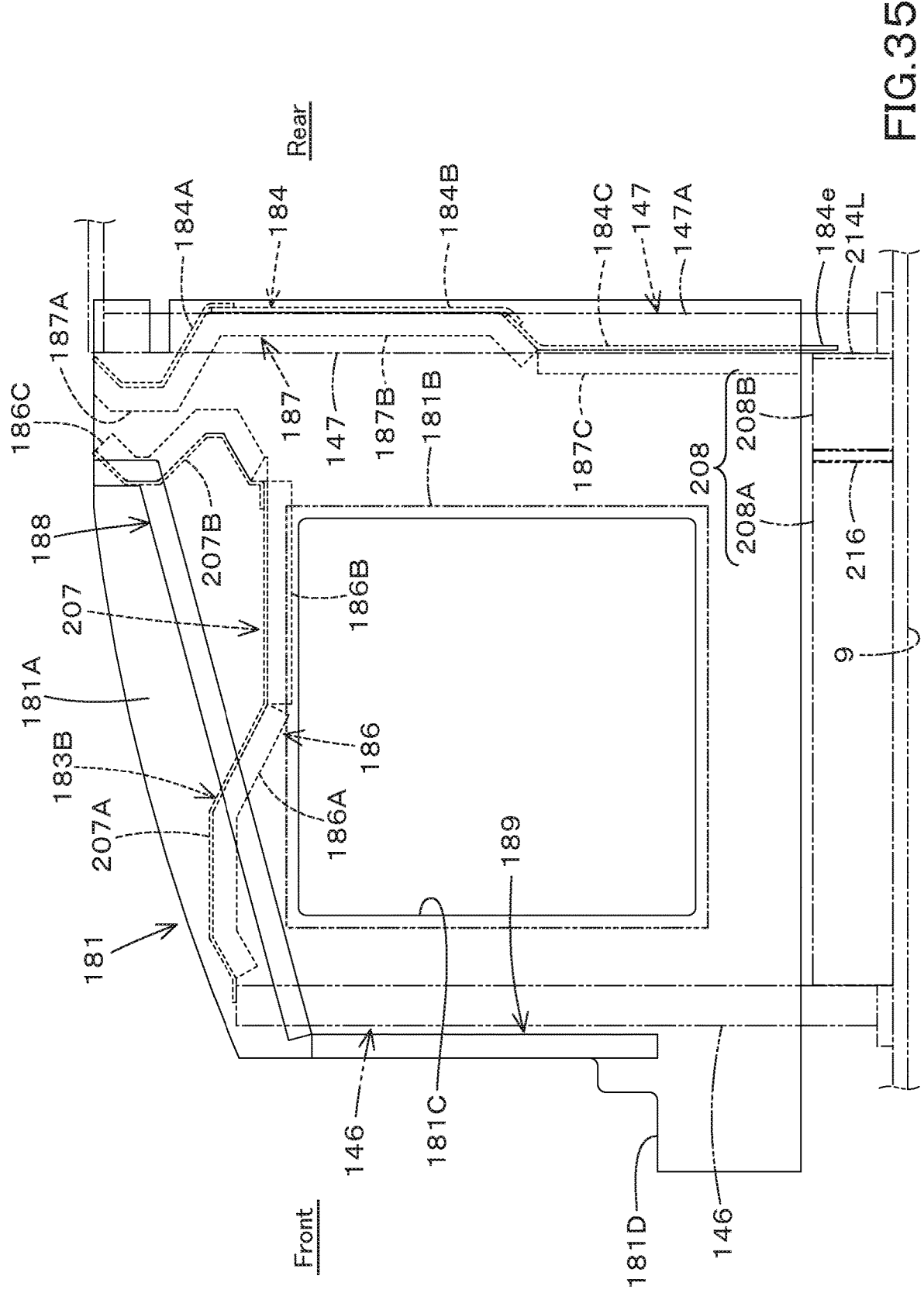
FIG. 35 is a side view of a first bonnet side portion according to the embodiments.
Figure 36:
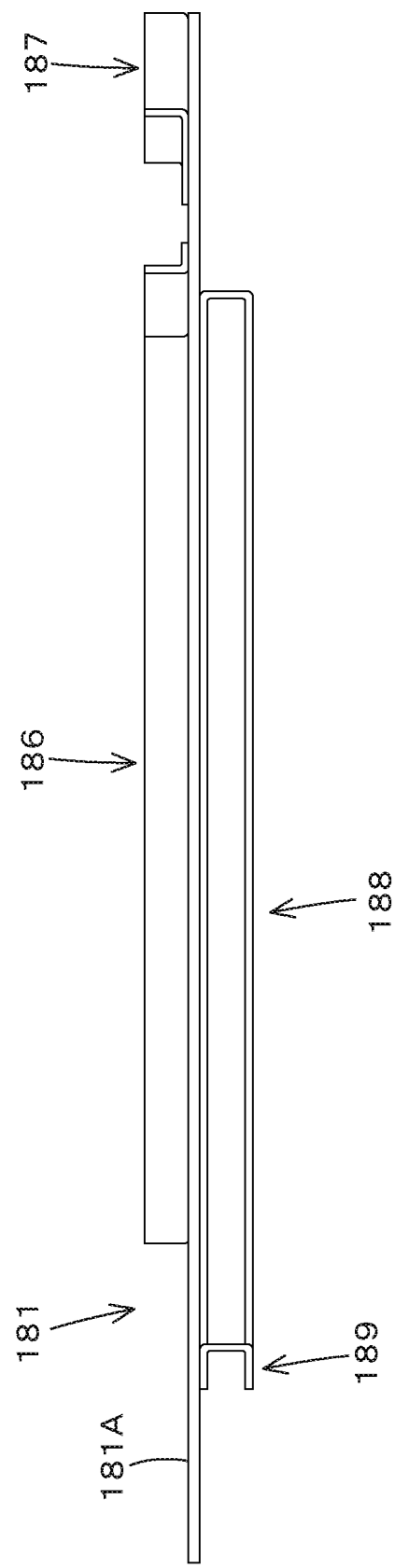
FIG. 36 is a plan view of the first bonnet side portion according to the embodiments.

As shown in FIG. 35 and FIG. 36, the first bonnet side portion 181 is formed of a plate material, and has a first side plate 181A as a main component and a cover plate 181B. The first bonnet side portion 181 is formed in a flat plate shape (or a surface shape that smoothly changes along the flow direction of the cooling air), and does not block (rectifies) the flow of the cooling air that cools the prime mover E1. The first bonnet side 181 is arranged close to the prime mover E1. As a result, the flow of cooling air flowing through the left side of the prime mover E1 is improved, and the cooling efficiency can be improved.

As shown in FIG. 33, the first side plate 181A has an opening 181C for checking the prime mover E1, and the opening 181C is formed penetrating the first side plate 181A. As shown in FIG. 35, the opening 181C is closed by a cover plate 181B, and the cover plate 181B is detachably attached to the first side plate 181A by a bolt or the like.

As shown in FIG. 21, the first bonnet side portion 181 (first side plate 181A) is provided from the front support frame 146 to the rear support frame 147. As shown in FIG. 22, the front of the first bonnet side 181 is fixed to the first front support 146A. As shown in FIG. 23, the rear of the first bonnet side portion 181 is fixed to the first rear support post 147A.

As shown in FIG. 21 and FIG. 33, the first bonnet side portion 181 projects forward from the front support frame 146. The front edge of the first bonnet side portion 181 is close to the rear edge of the first side surface portion 15a of the first cover body 15. As shown in FIG. 25, in the lower part of the front edge of the first bonnet side 181, a notch 181D is formed which is cut away to avoid interference with the hose guide 177. The notch portion 181D cooperates with the notch portion 180 to form an insertion portion through which the hose guide 177 is inserted.

As shown in FIG. 35 and FIG. 36, a first lower cover attachment portion 186 and a first rear cover attachment portion 187 are provided on the inner surface side (right surface side) of the first bonnet side portion 181. The first lower cover attachment portion 186 is provided on the upper inner surface of the first bonnet side portion 181 (above the opening 181C). The first lower cover attachment portion 186 has a front first portion 186A, an intermediate second portion 186B, and a rear third portion 186C.

The front portion of the first portion 186A is provided in a rearward-upward inclined shape (inclined to move upward as going to the rear) on the rear side of the upper end portion of the first front support frame 146. The middle portion of the first portion 186A is formed horizontally toward the rear. The rear portion of the first portion 186A is formed in a downward sloping shape (a sloping shape moving downward as going to the rear).

The second portion 186B is horizontally formed rearward from the rear end of the first portion 186A. The third portion 186C is formed in a zigzag shape that extends upward from the rear end of the second portion 186B and is bent back and forth.

The first rear cover attachment portion 187 is provided at the rear of the first hood side 181 and at the rear of the third portion 186C. The first rear cover attachment portion 187 is provided from the upper end to the lower end of the first bonnet side portion 181. An upper portion 187A of the first rear cover attachment portion 187 is formed to project forward. The upper portion 187A protrudes corresponding to the portion of the upper portion of the third portion 186C that is recessed forward. The middle portion 187B of the first rear cover attachment portion 187 extends vertically along the rear edge of the first bonnet side portion 181 and is inclined downward toward the lower end (moving forward as it goes downward). The lower portion 187C of the first rear cover attachment portion 187 is provided so as to extend in the vertical direction.

As shown in FIG. 35 and FIG. 36, on the outer surface side (left surface side) of the first bonnet side portion 181, a first collar portion 188 and a second collar portion 189 are provided. The first gutter portion 188 and the second ridge portion 189 are formed of a grooved material. The first flange portion 188 is located above the opening 181C, is inclined rearwardly from the front end to the rear end (the transition is upward as going to the rear), and opens upward. Further, the rear end portion of the first flange portion 188 extends in the vertical direction, and the front side is open.

The second flange portion 189 is vertically extended along the upper portion of the front edge of the first bonnet side portion 181, and the front side is open.

As shown in FIG. 21, the third cover body 17 is provided on the side of the operator seat 6 (cabin 5) side of the first bonnet side portion 181. In the present embodiment, the third cover body 17 is arranged on the left side of the first bonnet side portion 181. Further, the third cover body 17 (the side surface of the third cover body 17 on the side of the prime mover E1) is arranged adjacent to and facing the first bonnet side portion 181 in the machine width direction K2. Further, the third cover body 17 covers the side of the first bonnet side portion 181. Furthermore, the third cover body 17 is arranged adjacent to the cabin 5 and the machine width direction K2.

By providing the third cover body 17 between the first bonnet side portion 181 and the cabin 5, the transmission of the sound of the prime mover E1 to the operator seat 6 side is suppressed. That is, by the first bonnet side portion 181 and the third cover body 17, the structure on the operator seat 6 side of the prime mover room ER is made a noise insulation structure of a double structure. Thereby, it is possible to suppress the sound of the prime mover E1 from propagating to the operator seat 6 side.

As shown in FIG. 37, the third cover body 17 is attached at its rear upper end to the second rear beam member 147E of the rear support frame 147 by a hinge 190. As a result, the third cover body 17 can be swung from the closed position shown in FIG. 37 to the open state shown by an imaginary line.

The third cover body 17 includes a first side surface portion 17A located on the first bonnet side portion 181 side, a second side surface portion 17B opposite to the first bonnet side portion 181, and a first side of the hydraulic device placement portion 13. An upper surface portion 17C covering the upper side of the placement portion 13A and a front face portion 17D covering the front of the first placement portion 13A are open, and the lower side and the rear side are open.

As shown in FIG. 37, the first side face portion 17A is formed with a notch portion 191 formed of a first notch edge portion 191a and a second notch edge portion 191b. The first notch edge 191a is formed to be inclined downward and forward along the first gutter 188. The second notch edge portion 191b is formed in an inclined shape in which the second notch edge portion 191b is shifted forward as it goes downward from the front end of the first notch edge portion 191a. In addition, the second notch edge 191b is arranged in front of the second flange 189 at an interval. The gap 192 formed of the first notched edge portion 191a and the second flange portion 189 is used as a passage for passing the hydraulic hoses 178A and 178B and the refrigerant hoses 179A and 179B. In addition, a clearance between the first notch edge 191a and the first gutter 188 and a clearance between the second notch edge 191b and the second gutter 189 are sealed with a sealing material.

As shown in FIG. 34, the second bonnet side portion 182 has a second side plate (side plate) 182A and an openable/closable bonnet 193. The openable/closable bonnet 193 is arranged on the outer side of the second side plate 182A.

Figure 38:
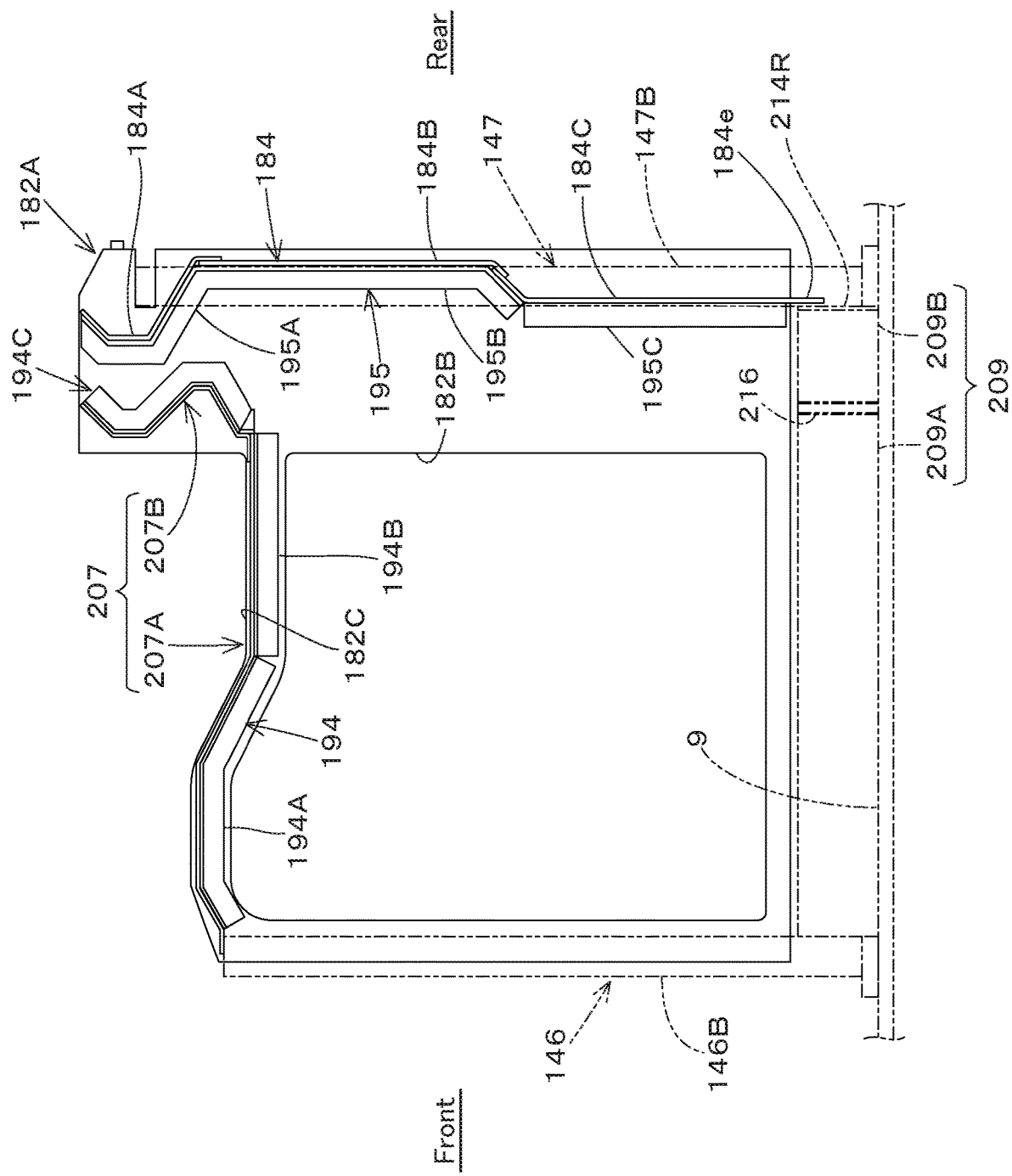
FIG. 38 is a side view of a second side plate according to the embodiments.
Figure 39:
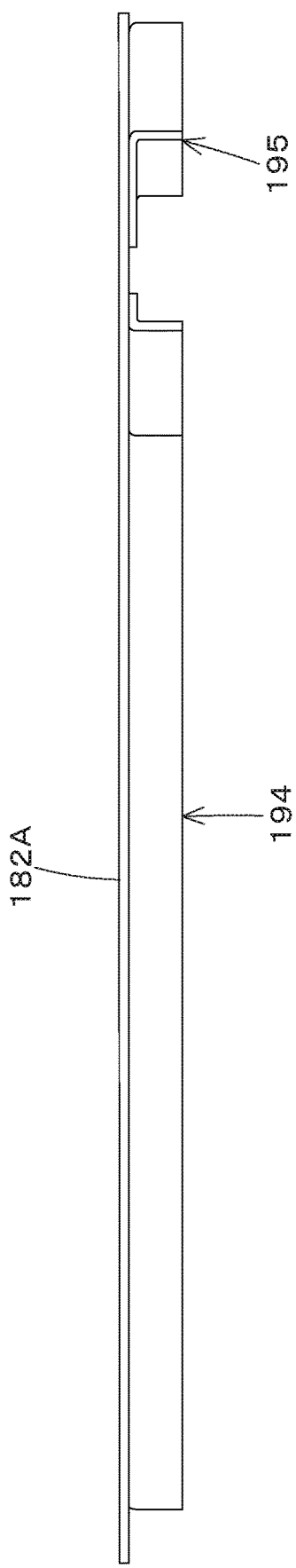
FIG. 39 is a plan view of the second side plate according to the embodiments.
Figure 42:
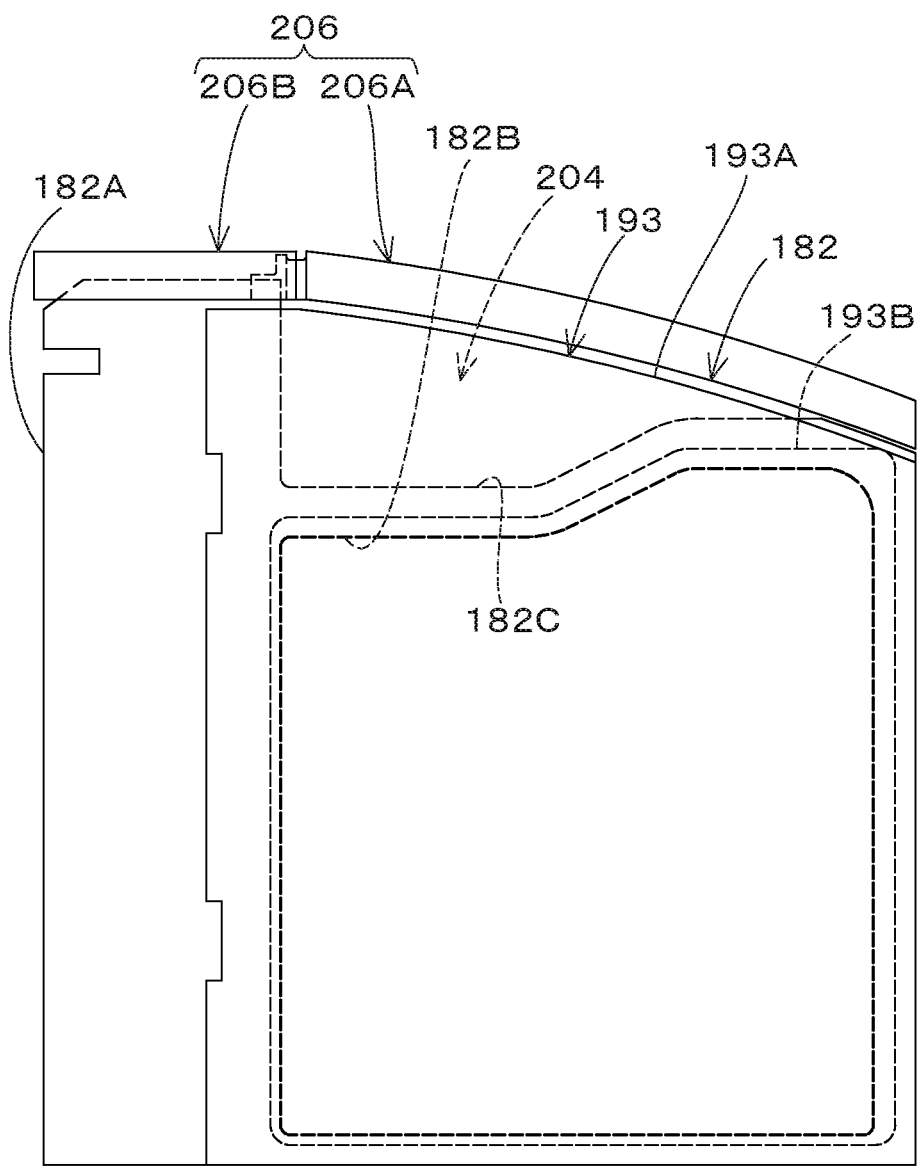
FIG. 42 is a side view of the second bonnet side portion according to the embodiments.

As shown in FIG. 38 and FIG. 39, the second side plate 182A is formed of a plate material into a flat plate shape (or a surface shape smoothly changing along the flow direction of the cooling air), and has an inspection hole 182B for checking the prime mover E1. The inspection hole 182B is formed through the second side plate (side plate) 182A. Further, as shown in FIGS. 38 and 42, a notch portion 182C recessed downward is formed at the rear of the upper portion of the second side plate 182A.

As shown in FIG. 21, the second side plate 182A is provided from the front support frame 146 to the rear support frame 147. As shown in FIG. 22, the front of the second side plate 182A is fixed to the second front support 146B. As shown in FIG. 23, the rear of the second side plate 182A is fixed to the second rear support post 147B.

As shown in FIG. 38 and FIG. 39, a second lower cover attachment portion 194 and a second rear cover attachment portion 195 are provided on the inner surface side (left surface side) of the second side plate 182A. The second lower cover attachment portion 194 is provided on the upper surface of the second side plate 182A (above the inspection hole 182B).

The second lower cover attachment portion 194 has a first portion 194A at the front, a second portion 194B at the middle, and a third portion 194C at the rear, and is formed in the same shape with the first lower cover attachment portion 186 in a side view.

That is, the front portion of the first portion 194A is provided on the rear side of the upper end portion of the first front support frame 146 so as to be inclined upward and downward. The middle portion of the first portion 194A is formed horizontally toward the rear. The rear portion of the first portion 194A is formed in a falling slope.

The second portion 194B is horizontally formed rearward from the rear end portion of the first portion 194A. The third portion 194C is formed in a zigzag shape extending upward from the rear end of the second portion 194B and being bent back and forth.

The second rear cover attachment portion 195 is provided at the rear of the second side plate 182A and at the rear of the third portion 194C. The second rear cover attachment portion 195 is provided from the upper end to the lower end of the second side plate 182A. The second rear cover attachment portion 195 has an upper portion 195A, an intermediate portion 195B, and a lower portion 195C, and is formed in the same shape as the first rear cover attachment portion 187 in a side view.

An upper portion 195A of the second rear cover attachment portion 195 is formed to project forward. The upper portion 195A protrudes corresponding to a recessed portion toward the front of the upper portion of the third portion 194C. The middle portion 195B of the second rear cover attachment portion 195 extends vertically along the rear edge of the second side plate 182A and is inclined downward toward the front at the lower end. The lower portion 195C of the second rear cover attachment portion 195 is provided so as to extend in the vertical direction.

Figure 40:
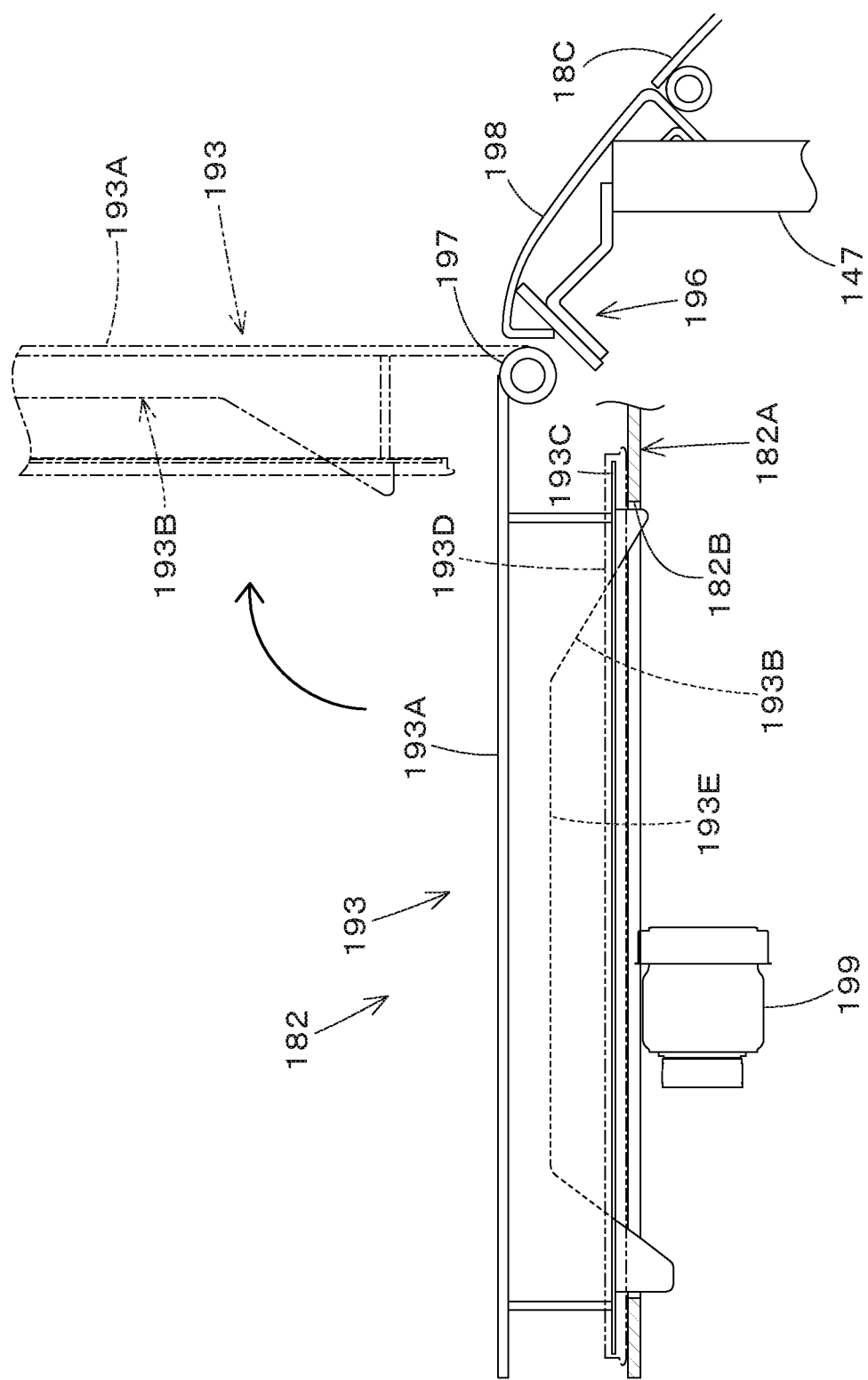
FIG. 40 is a plan view of a second bonnet side portion according to the embodiments.
Figure 41:
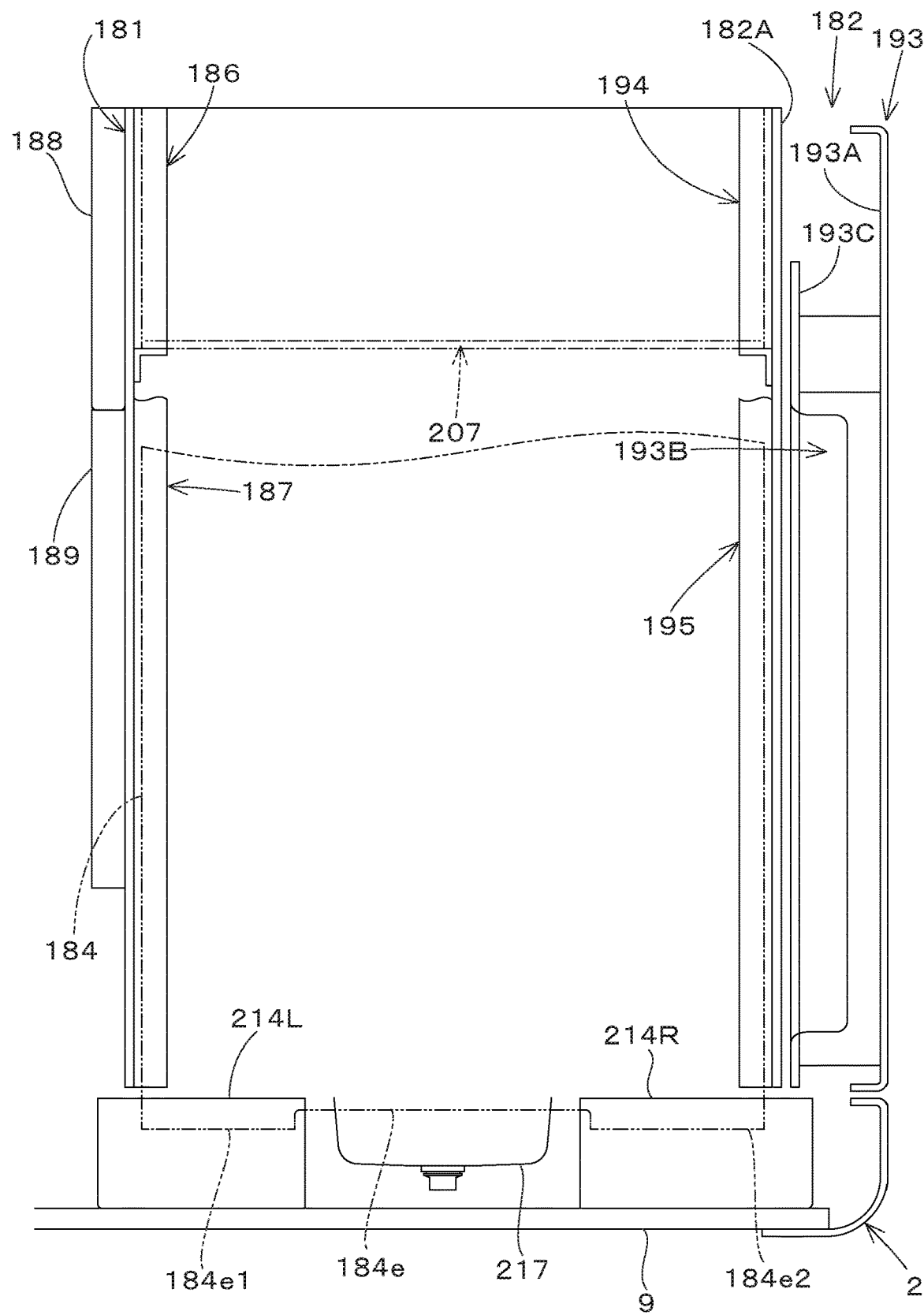
FIG. 41 is a back view of the bonnet according to the embodiments.

As shown in FIG. 40 and FIG. 41, the openable/closable bonnet 193 has a double structure including an outer cover member 193A which is an outer side wall portion and an inner cover member 193B which is an inner side wall portion.

As shown in FIG. 42, in the outer cover member 193A, the front edge and the lower edge thereof coincide with the front edge and the lower edge of the second side plate 182A in a side view. The upper portion of the outer cover member 193A covers the notch portion 182C at the upper portion of the second side plate 182A. The rear edge of the outer cover member 193A is located forward of the rear edge of the second side plate 182A.

As shown in FIG. 40, the rear edge of the outer cover member 193A is rotatably supported by a support member 196 fixed to the rear support frame 147 via a hinge 197 about a longitudinal axis. Thus, the openable/closable bonnet 193 can be opened and closed. A corner cover 198 is closed between the rear end of the outer cover member 193A and the right end of the third cover 18C.

As shown in FIG. 42, the inner cover member 193B closes the inspection hole 182B. As shown in FIG. 40, a flange portion 193C is provided on the outer circumferential portion of the inner cover member 193B, and a seal member 193D which abuts on the periphery of the inspection hole 182B is provided on the flange portion 193C. Further, the inner surface 193E (surface on the prime mover room ER side) of the inner cover member 193B is recessed toward the outside of the machine in order to avoid interference with the alternator 199, the fuel filter, and the like. Further, the inner surface 193E of the inner cover member 193B is formed in a gentle (smooth) manner and does not obstruct (rectify) the flow of the cooling air for cooling the prime mover E1. The second side plate 182A and the inner cover member 193B are arranged in proximity to the prime mover E1. As a result, the flow of the cooling air flowing on the right side of the prime mover E1 is improved, and the cooling efficiency can be improved.

Figure 43:
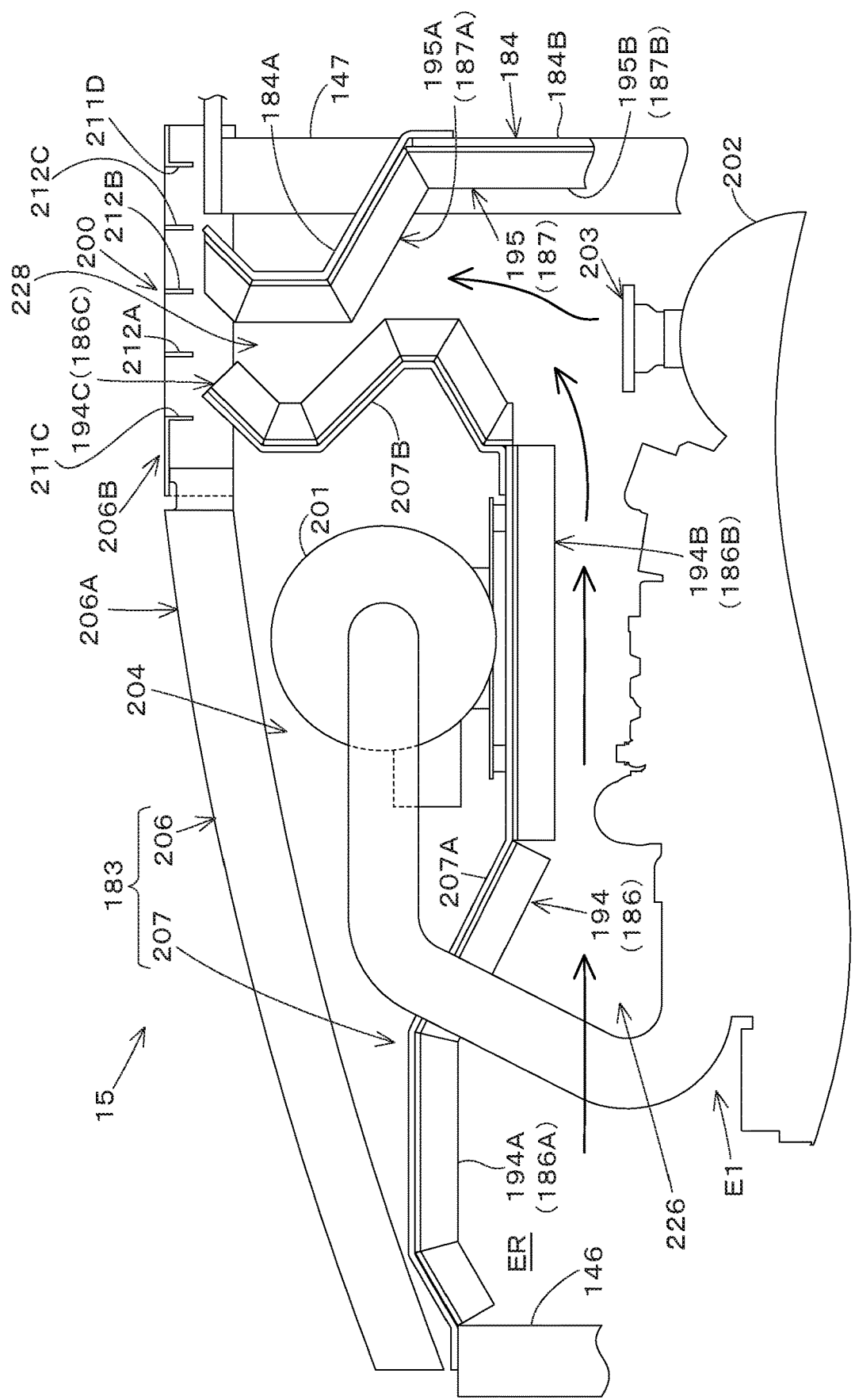
FIG. 43 is a side view illustrating an upper portion of a prime mover room according to the embodiments.

As shown in FIG. 34 and FIG. 43, the bonnet upper portion 183 has an upper cover 206 and a lower cover 207 provided below the upper cover 206. The upper cover 206 has a main cover 206A and a rear cover 206B provided behind the main cover 206A.

As shown in FIG. 43, in the front-rear direction K2, the main cover 206A covers the upper portion of the front support frame to the third portion 186C of the first lower cover attachment portion 186 and the third portion 195C of the second lower cover attachment portion 195. The rear cover 206B covers the rear support frame 147 from the rear end of the main cover 206A.

As shown in FIG. 34, the upper cover 206 covers from the upper side of the first bonnet side 181 to the right end of the second bonnet side 182 in the machine width direction K2. Further, the left end side of the upper cover 206 protrudes from the first bonnet side portion 181 to the operator seat 6 side (inward of the machine). Further, the right end side of the upper cover 206 protrudes from the second side plate 182A to the side opposite to the operator seat 6 (inward of the vehicle).

As shown in FIG. 34 and FIG. 43, the rear cover 206B is provided with an exhaust portion 200 for discharging the cooling air. The exhaust portion 200 includes an outer circumferential frame member 211 and a plurality of lateral frame members 212A, 212B, and 212C. The outer circumferential frame member 211 includes a first side member 211A, a second side member 211B, a front side member 211C, and a rear member 211D. The first side member 211A and the second side member 211B are provided at an interval in the machine width direction K2. The front side member 211C and the back member 211D are provided at an interval in the front-rear direction K2.

The plurality of lateral frame members 212A, 212B, and 212C are provided inside the outer circumferential frame 211, and are provided at an interval in the front-rear direction K1 between the front member 211C and the rear member 211D. Thus, the air can flow between the front member 211C and the lateral frame member 212A, between the lateral frame member 212A and the lateral frame member 212B, between the lateral frame member 212B and the lateral frame member 212C, and between the lateral frame member 212C and the rear member 211D.

A cover for avoiding rain (for avoiding water) may be provided above the exhaust portion 200.

As shown in FIG. 43, in the front-rear direction K1, the lower cover 207 is arranged extending from the front support frame 146 to the upper end of the third portion 186C of the first lower cover attachment portion 186 and to the upper end of the third portion 194C of the second lower cover attachment portion 194. The lower cover 207 is formed along the shapes of the first lower cover attachment portion 186 and the second lower cover attachment portion 194. The front end of the lower cover 207 is fixed to the upper end of the front support frame 146. The middle part of the lower cover 207 is close to the upper part of the prime mover E1, and the cooling efficiency is improved. Further, the rear portion of the lower cover 207 is formed in a zigzag shape extending upward and bending back and forth.

As shown in FIG. 34 and FIG. 41, the lower cover 207 is provided from the first lower cover attachment portion 186 to the second lower cover attachment portion 194 in the machine width direction K2. The left end portion of the lower cover 207 in the machine width direction K2 is fixed to the first lower cover attachment portion 186, and the right end portion is fixed to the second lower cover attachment portion 194. Further, in the present embodiment, the lower cover 207 is formed of the first plate member 207A extending from the front support frame 146 to the rear ends of the second portions 186B and 194B, and includes the second plate member 207B extending from the lower ends of the third portions 184C and 194C to the upper ends.

The lower cover 207 is formed in a flat shape (or a shape in which the surface shape smoothly changes along the flow direction of the cooling air) which does not block the flow of the cooling air flowing through the upper portion of the prime mover E1 (the upper portion of the prime mover room ER). That is, the lower cover 207 well guides and rectifies the cooling air. The lower cover 207 may be formed of a single plate, or may be formed of three or more plates.

The bonnet upper portion 183 has a double structure of the upper cover 206 and the lower cover 207, so that the sound of the prime mover E1 can be suppressed from leaking to the outside of the bonnet 16.

As shown in FIG. 43, the lower cover 207 divides the space between the prime mover room ER and the main cover 206A, and an air intake chamber 204 is formed between the lower cover 207 and the main cover 206A. That is, the intake chamber 204 is a chamber partitioned by the upper cover 207 and the lower cover 207.

As shown in FIG. 33, the left side surface of the intake chamber 204 is formed of the top of the first bonnet side portion 181. Further, as shown in FIG. 42, the right side surface of the intake chamber 204 is formed of the upper portion of the outer cover member 193A of the openable/closable bonnet 193.

As shown in FIG. 43, the air suction chamber 204 is provided with an air cleaner 201 for purifying the air sucked into the prime mover E1. An intake port for taking in the outside air to the intake chamber 204 is formed in the main cover 206A and the like. In addition, a reserve tank or the like capable of storing the cooling water of the prime mover E1 may be provided in the intake chamber 204.

As shown in FIG. 33 and FIG. 43, an exhaust gas purification device 202 for purifying exhaust gas (hereinafter referred to as exhaust gas) discharged from the prime mover E1 is provided at the rear of the prime mover E1. At an upper portion of the exhaust gas purification device 202, an exhaust port portion 203 for discharging the purified gas is provided. The exhaust port portion 203 is provided below the exhaust portion 200. Further, the exhaust gas outlet at the exhaust port portion 203 is directed upward, and the exhaust gas is discharged toward the exhaust gas portion 200. Thus, the exhaust gas is discharged to the inside of the prime mover room ER, and is mixed with the cooling air and discharged from the exhaust portion 200 to the outside of the bonnet 16. A silencer may be connected to the exhaust port 203, and the exhaust gas may be exhausted through the silencer.

As shown in FIG. 41, the bonnet rear portion 184 is formed of a plate material, and is provided across the rear of the first bonnet side portion 181 and the second side plate 182A. Further, the bonnet rear portion 184 is provided across the first rear cover attachment portion 187 and the second rear cover attachment portion 195, the left end portion is fixed to the back surface of the first rear cover attachment portion 187, and the right end portion is fixed to the back surface of the second rear cover attaching part 195.

As shown in FIG. 35 and FIG. 38, the bonnet rear portion 184 is provided from the upper end to the lower end of the first bonnet side 181 and the second side plate 182A, and the lower end 184e projects downward from the lower ends of the first bonnet side portion 181 and the second side plate 182A. Further, the bonnet rear portion 184 is formed along the shapes of the first rear cover attachment portion 187 and the second rear cover attachment portion 195 in a side view. Thus, the upper portion of the bonnet rear portion 184 is opposed to the rear portion of the lower cover 207, and a portion corresponding to a portion recessed toward the front of the lower cover 207 is formed to project forward.

In the present embodiment, the bonnet rear portion 184 is formed of the upper plate 184A corresponding to the upper portion 187A of the first rear cover attachment portion 187 and the upper portion 195A of the second rear cover attachment portion 195, the middle plate 184B corresponding to the middle portion 187B and the middle portion 195B, and the lower plate 184C corresponding to the lower portion 187C and the lower portion 195D. The bonnet rear portion 184 may be formed of a single plate material, or may be formed of two or four or more plate materials.

As shown in FIG. 35, a first partition body (partition body) 208 is provided between the turn base plate 9 and the first side bonnet 181. The first partition body 208 is arranged on one side of the oil pan 217 arranged at the bottom of the prime mover E1. The first partition body 208 constitutes the lower left end portion (bottom portion) of the prime mover room ER, and prevents the sound of the prime mover E1 from flowing around from the lower side of the first side bonnet 181 to the operator seat 6 side.

The first partition body 208 has a first front partition member (first partition member) 208A constituting a front portion and an intermediate portion, and a first rear partition member 208B constituting a rear portion. The first front partition member 208A is provided from the first front support 146A to the lateral reinforcing plate 216.

As shown in FIG. 21, the lateral reinforcing plate 216 is a member that reinforces the turn base 9, and is provided on the rear upper surface of the turn base 9 so as to extend in the machine width direction K2. The first front partition member 208A is arranged on one side of the machine width direction K2 of the oil pan 217. The surface on the oil pan 217 side of the first front partition member 208A is a guide surface 218L for guiding the cooling air. The middle portion of the guide surface 218L in the front-rear direction K1 is provided in proximity to the oil pan 217.

Figure 44:
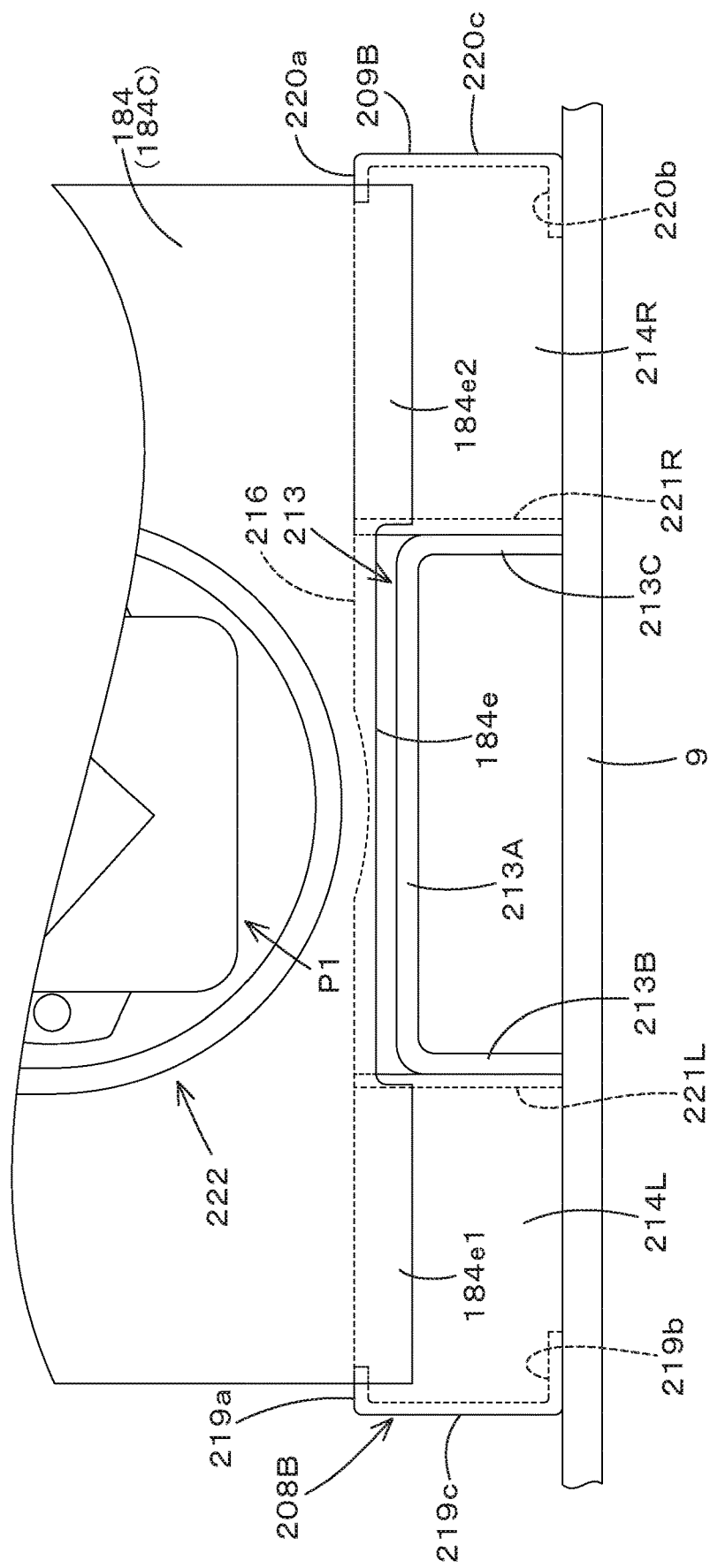
FIG. 44 is a back view illustrating a lower portion of the bonnet according to the embodiments.
Figure 46:
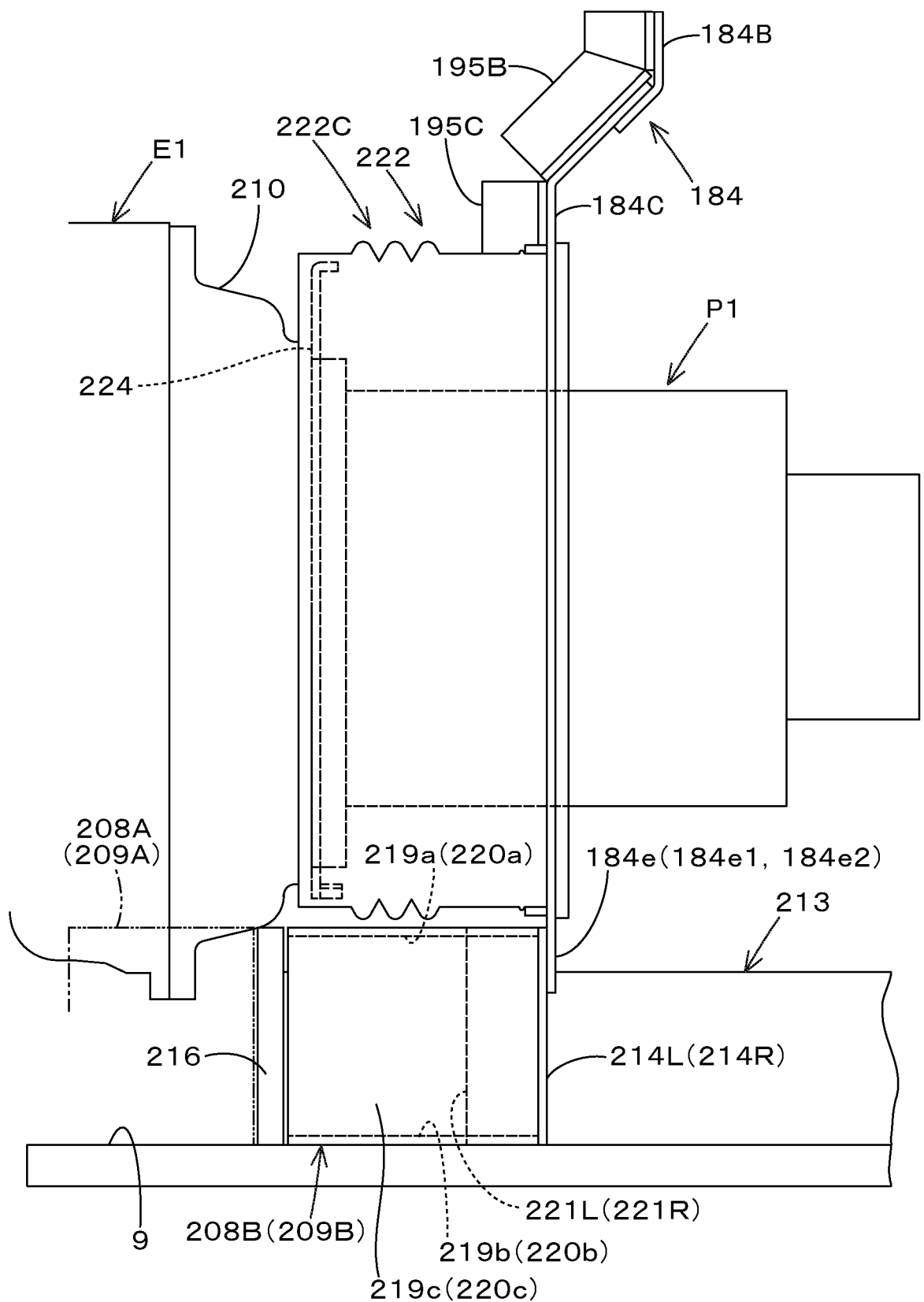
FIG. 46 is a side view illustrating the peripheral structure of the hydraulic pump according to the embodiments.

As shown in FIG. 21 and FIG. 35, the first rear partition member 208B is provided from the lateral reinforcing plate 216 to the front of the first rear support column 147A. As shown in FIG. 44 and FIG. 46, the first rear partition member 208B has an upper wall 219a, a lower wall 219b, and a side wall 219c. The side wall 219c connects the left ends of the upper wall 219a and the lower wall 219b. The lower wall 219 b is fixed on the turn base 9.

As shown in FIG. 38, a second partition (a partition) 209 is provided between the turn base 9 and the second side plate 182A. The second partition body 209 is arranged on the other side of the oil pan 217. The second partition body 209 constitutes the lower right end (bottom portion) of the prime mover room ER, and prevents the sound of the prime mover E1 from wrapping around and leaking from the lower side of the second side bonnet 182 to the side opposite to the operator seat 6.

The second partition body 209 has a second front partition member (second partition member) 209A constituting a front portion and an intermediate portion, and a second rear partition member 209B constituting a rear portion. The second front partition member 209A is provided from the second front support 146B to the lateral reinforcing plate 216.

As shown in FIG. 21, the second front partition member 209A is arranged on the other side of the oil pan 217 in the machine width direction K2. The surface on the oil pan 217 side of the second front partition member 209A is a guide surface 218R for guiding the cooling air. An intermediate portion of the guide surface 218R in the front-rear direction K1 is provided in proximity to the oil pan 217.

The distance between the first front partition member 208A and the second front partition member 209A in the machine width direction K2 is wide in the front and rear portions and narrow in the middle portions. The oil pan 217 is located at the place where the distance is narrowed. Since the oil pan 217 is located at a position where the distance between the first front partition member 208A and the second front partition member 209 is narrowed, the cooling air flowing in both sides of the oil pan 217 in the machine width direction K2 flows smoothly, and the engine oil in the oil pan 21 can be cooled well.

As shown in FIG. 33, the distance between the oil pan 217 and the turn base 9 is also narrow, and the cooling air flows favorably under the oil pan 217. The opening is not formed below the prime mover E1 of the revolving base 9 and the cooling air flowing in the lower part of the prime mover E1 (lower part of the prime mover room ER) flows to the rear of the prime mover E1.

In addition, since the opening is not formed below the prime mover E1 of the turn base plate 9, the dust wound up by the second traveling device 3R is prevented from entering the prime mover room ER, and thus the oil pan 217 is not damaged by the foreign matter on the second traveling device 3R (on the crawler) even when the prime mover E1 is arranged on the right side of the machine body 2.

As shown in FIG. 21 and FIG. 38, the second rear partition member 209B is provided from the lateral reinforcing plate 216 to the front of the second rear support column 147B. As shown in FIG. 44 and FIG. 46, the second rear partition member 209B has an upper wall 220a, a lower wall 220b, and a side wall 220c. The side wall 220c connects the right ends of the upper wall 220a and the lower wall 220b. The lower wall 220 b is fixed on the pivoting base plate 9.

As shown in FIG. 33, a pump housing 210 is attached to a lower rear surface of the prime mover E1, and a hydraulic pump P1 is attached to the pump housing 210 so as to project rearward. Thus, the hydraulic pump P1 is attached to the downstream side of the flow direction of the cooling air in the prime mover E1.

Figure 45:
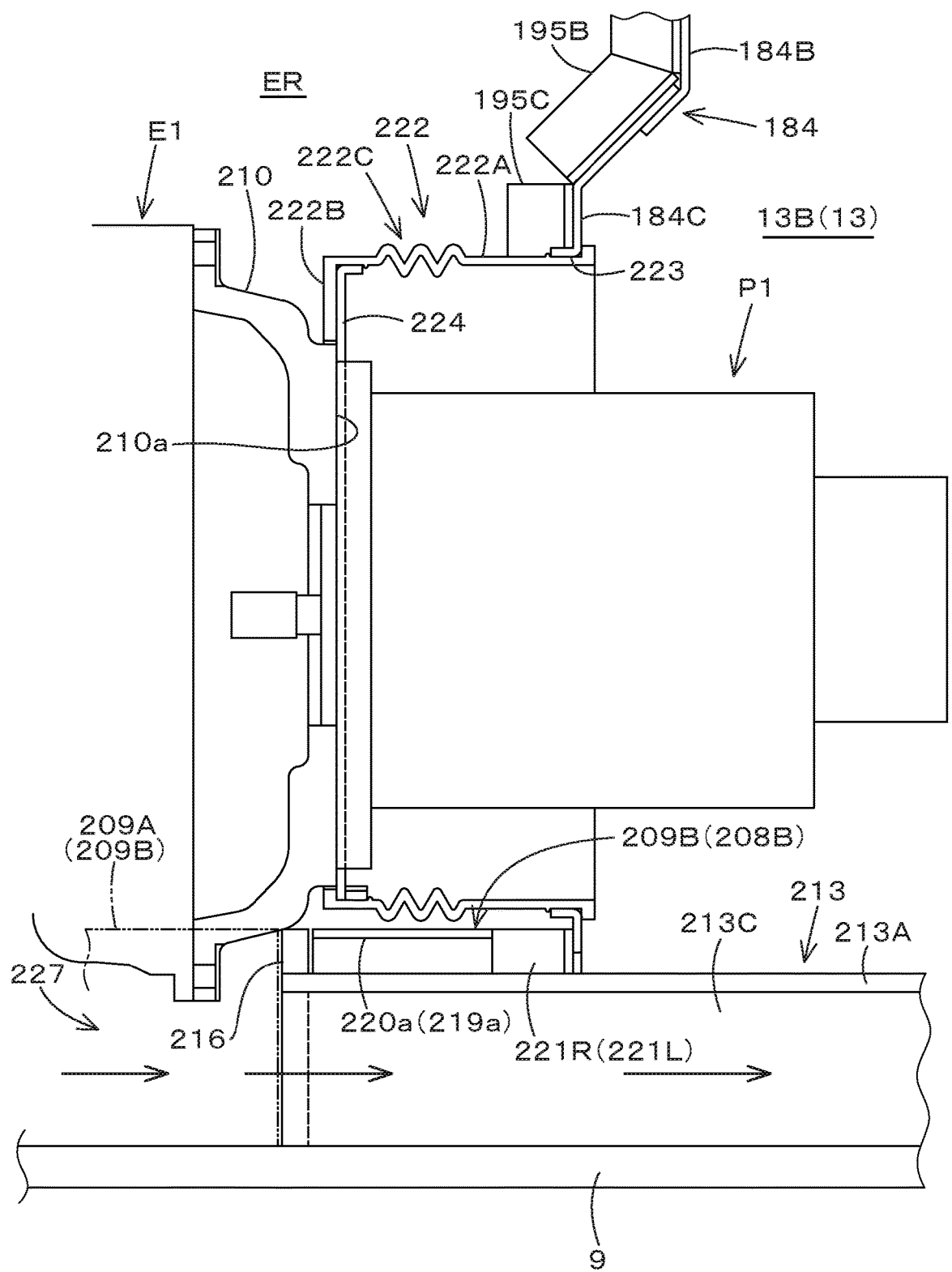
FIG. 45 is a side cross-section view illustrating a peripheral structure of a hydraulic pump according to the embodiments.

As shown in FIGS. 44 and 45, a guide member 213 is provided below the hydraulic pump P1. The guide member 213 extends rearward from below the hydraulic pump P1 to guide the cooling air rearward. The guide member 213 extends to the rear end side of the turn base 9 (see FIG. 21). The front end portion of the guide member 213 penetrates the lateral reinforcing plate 216 in the front-rear direction K1.

The guide member 213 has an upper wall 213A, a first upright wall 213B, and a second upright wall 213C, and is formed in a hollow shape. The upper wall 213A is located below the hydraulic pump P1, and the front is located directly below the hydraulic pump P1. The first upright wall 213B extends downward from one end (left end) of the upper wall 213A in the machine width direction K2 and is fixed at its lower end to the turn base 9 (machine 2). The second upright wall 213C extends downward from the other end (right end) of the upper wall 213A in the machine width direction K2 and has its lower end fixed to the turn base 9 (machine 2). The guide member 213 is open at the front and the rear, and the lower side is closed by the pivot base 9. Thus, the cooling air which has flowed rearward from the lower part of the prime mover E1 passes through the guide member 213 and is guided to the rear of the machine body 2 (turning board 9). When attaching and detaching the hydraulic pump P1 to and from the prime mover E1, the hydraulic pump P1 can be moved while supporting the hydraulic pump P1 with the upper wall 213A of the guide member 213. Thereby, attachment or detachment of hydraulic pump P1 can be made easy.

When the hydraulic pump P1 is attached to the pump housing 210, it is possible to move the hydraulic pump P1 while supporting the hydraulic pump P1 on the upper wall 213A and supporting the hydraulic pump P1 on the upper wall 213A. Similarly, when the hydraulic pump P1 is removed from the pump housing 210, the hydraulic pump P1 can be supported by the upper wall 213A. Thus, the hydraulic pump P1 can be easily attached and detached.

As shown in FIG. 44 and FIG. 46, the first contact plate 221L is fixed to the left surface of the front of the first upright wall 213B. The first backing plate 221L is provided at a position facing the rear of the first rear partition member 208B. The second backing plate 221R is fixed to the right surface of the front of the second standing wall 213C. The second backing plate 221R is provided at a position facing the rear of the second rear partition member 209B.

As shown in FIG. 44, the first partition plate 214L is provided on one side (left side) of the machine width direction K2 of the guide member 213, and the second partition plate 214R is provided on the other side (right side). The first partition plate 214L and the second partition plate 214R are arranged such that the plate surfaces face in the front-rear direction.

As shown in FIG. 46, the first partition plate 214L is fixed to the rear end of the first rear partition member 208B and the first contact plate 221L. The second partition plate 214R is fixed to the rear end of the second rear partition member 209B and the second contact plate 221R.

As shown in FIG. 37, the lower part of the bonnet rear part 184 is connected to the first partition plate 214L and the second partition plate 214R. Specifically, the left portion 184e1 of the lower end portion 184e of the bonnet rear portion 184 is fixed to the upper portion of the back surface of the first partition plate 214L, and the right portion 184e2 of the lower end portion 184e of the bonnet rear portion 184 is fixed to the upper portion of the back surface of the second partition plate 214R.

The rear portion of the prime mover room ER is partitioned by a wall constituted of a rear support frame 147, a bonnet rear portion 184, a first partition plate 214L and a second partition plate 214R. A fourth cover 18 is provided at the rear of this wall. The fourth cover 18 is a rear cover that covers the hydraulic fluid tank T2 and the fuel tank T1, which are members provided behind the bonnet rear portion 184.

By the wall including the bonnet rear portion 184 and the fourth cover body 18, the rear of the prime mover E1 has a double-layered noise insulation structure, and the sound of the prime mover E1 can be suppressed from being transmitted from the prime mover room ER to the outside.

As described above, the cooling efficiency is improved by forming the noise insulation structure of the double structure around the prime mover room ER, and making the inner wall of the double structure flat or the surface shape changes smoothly along the flow direction of the cooling air. The heat balance can be improved by enhancing the heat balance. Also, the sound absorbing material can be eliminated or minimized. In addition, noise reduction due to the decrease in the rotational speed of the cooling fan F1 can be expected.

As indicated by the arrows in FIG. 43, the cooling air generated by the cooling fan F1 and flowing in the upper part of the prime mover room ER flows below the lower cover 207 and reaches the rear of the lower cover 207. The cooling air that has flowed to the rear of the lower cover 207 ascends between the rear of the lower cover 207 (the second plate 207B) and the top of the bonnet rear 184 (the upper plate 184A), and is discharged from the exhaust portion 200 to the outside of the bonnet 15.

That is, a first cooling route (first cooling passage) 226 is formed at the upper part of the prime mover room ER, allowing the cooling air flowing between the prime mover E1 and the bonnet upper portion 183 to pass through the bonnet upper portion 183 and being discharged to the outside. There is. The first cooling route 226 is formed of the rear of the lower cover 207 and the top of the bonnet rear 184, and has an exhaust passage 228 for guiding the cooling air to the exhaust portion 200. The exhaust passage 228 is a first discharge portion that discharges the cooling air flowing between the prime mover E1 and the ceiling portion of the prime mover room ER to the outside of the prime mover room ER. The exhaust gas of the prime mover E1 is discharged to the exhaust passage 228 through the discharge port portion 203, and the cooling air and the exhaust gas are discharged to the outside of the prime mover room ER through the first discharge portion.

In the present embodiment, the first cooling route 226 is constituted of the upper portion of the first bonnet side portion 181, the upper portion of the second bonnet side portion 182, the lower cover 207, the upper portion of the bonnet rear portion 184, and the exhaust portion 200.

As indicated by arrows in FIG. 33, the cooling air generated by the cooling fan F1 and flowing through the lower part of the prime mover room ER passes backward between the prime mover E1 and the turn base 9 and through both sides of the prime mover E1. As indicated by the arrows in FIG. 45, the cooling air having flowed to the rear of the prime mover E1 flows through the guide member 213 to the rear of the prime mover E1. The guide member 213 is a second discharge portion that discharges the cooling air flowing between the prime mover E1 and the bottom of the prime mover room ER to the outside of the prime mover room ER.

That is, at the lower part of the prime mover room ER, a second cooling route 227 for supplying the cooling air flowing between the prime mover E1 and the turn base plate 9 to the rear of the prime mover E1 is formed.

The second cooling route 227 includes a lower portion of the first bonnet side portion 181, a lower portion of the second bonnet side portion 182, the turn base plate 9, the first partition 208, the second partition 209, the guide member 213, and the like.

As shown in FIG. 45, the hydraulic pump P1 is covered by the pump partition 222 and is separated (partitioned) from the prime mover room ER. Thus, the prime mover room ER and the hydraulic equipment arrangement part 13 (second arrangement part 13B) are partitioned by the pump partition 222, and the hydraulic pump P1 is located in the hydraulic equipment arrangement part 13. The pump partition 222, together with the bonnet rear portion 184 and the lateral reinforcing plate 216, constitutes a downstream side wall portion which is a downstream side wall portion in the flow direction of the cooling air flowing on the prime mover E1 in the prime mover room ER. The first discharge portion is provided on the ceiling of the prime mover room ER, on the downstream side wall, or between the bottom of the prime mover room ER and the downstream side wall. In addition, the second discharge portion is provided at the bottom of the prime mover room ER, the downstream side wall, or between the bottom of the prime mover room ER and the downstream side wall. Further, the guide member 213 constituting the second discharge portion is arranged penetrating the position corresponding to the region between the first partition body 208 and the second partition body 209 in the downstream side wall portion and passing below the hydraulic pump P1.

In addition, the pump partition 222 is a tubular shape surrounding the hydraulic pump P1, and is provided between the prime mover E1 (pump housing 210) and the bonnet rear portion 184. The pump partition 222 is formed of an elastic member. The pump partition 222 also has a peripheral wall 222A surrounding the hydraulic pump P1. A flange portion 222B extending radially inward is provided at the front end of the peripheral wall 222A, and a mounting plate 224 is provided inside the flange portion 222B. The mounting plate 224 is fixed to the back surface 210 *a* of the pump housing 210 by a bolt or the like. The front of the peripheral wall 222A is fitted and attached to the outer circumferential portion of the mounting plate 224. The rear part of the peripheral wall 222A is fitted and attached to the edge of the insertion hole 223 formed in the bonnet rear part 181. Thus, the pump partition 222 protrudes from the insertion hole 223 to the prime mover room ER side.

The front part of the peripheral wall 222A is provided with a bellows part 222C which can expand and contract in the front-rear direction K1, and the pump partition 222 easily changes its shape (extends and contracts) in the front-rear direction K1.

The pump partition 222 is open at the rear, and the rear portion of the hydraulic pump P1 projects rearward from the pump partition 222 (the second placement portion 13B of the hydraulic device placement portion 13).

By the pump partition 222, the hydraulic pump P1 can be protected from dust, and serviceability is improved.

Figure 47:
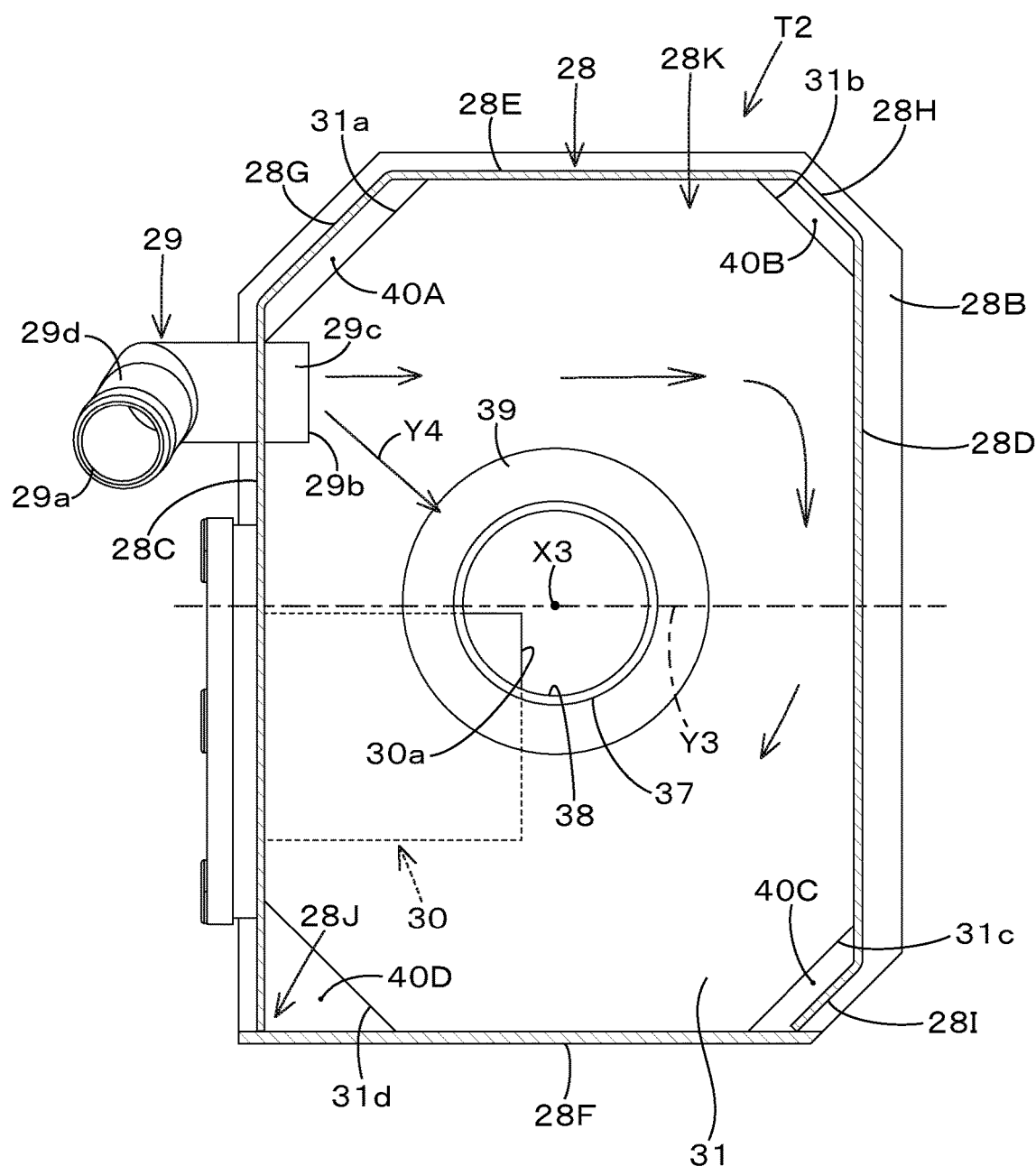
FIG. 47 is a plan cross-section view of an operation fluid tank according to the embodiments.
Figure 48:
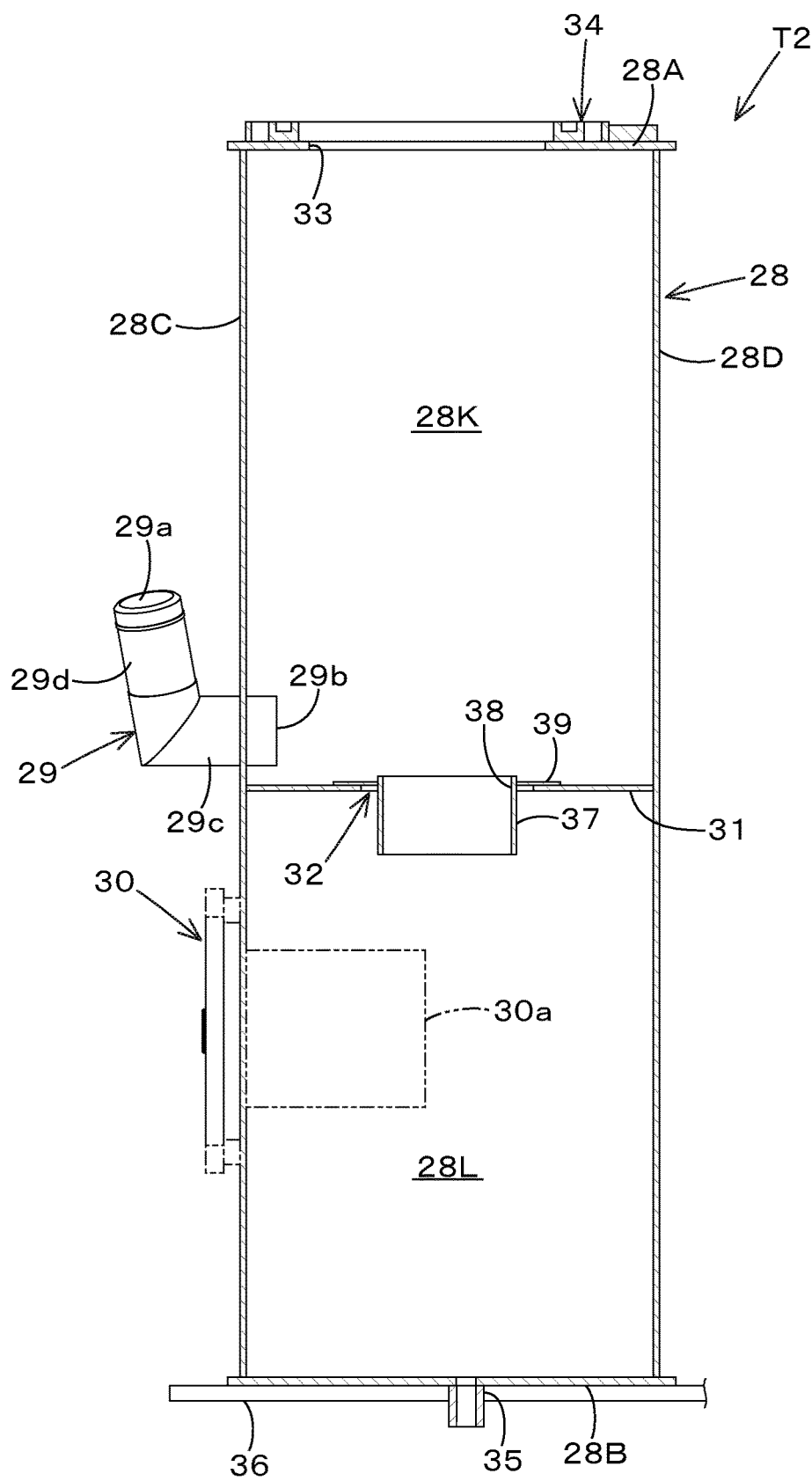
FIG. 48 is a side cross-section view of the operation fluid tank according to the embodiments.

Next, the structure of the hydraulic fluid tank T2 will be described with reference to FIG. 47 and FIG. 48.

The hydraulic fluid tank T2 has a tank main body 28 that stores hydraulic fluid. The tank main body 28 includes the upper wall 28A, the lower wall 28B located below the upper wall 28A, and a plurality of vertical walls (first vertical wall 28C to seventh vertical wall 28I) connecting the upper wall 28A and the lower wall 28B. The tank main body 28 has a prismatic shape and has a plurality of corner portions. In the present embodiment, the hydraulic fluid tank T2 is formed in a vertically long rectangular parallelepiped shape (square pole shape).

The upper wall 28A has an opening 33 formed through the upper wall 28B. A mounting seat 34 is provided around the opening 33 on the upper surface of the upper wall 28B. A tank cover for closing the opening 33 is attached to the mounting seat 34.

A drain pipe 35 is attached to the lower wall 28B. The drain pipe 35 is openably closed by a plug member. An attachment plate 36 mounted on a mounting base fixed on the turn base 9 is fixed to the lower surface of the lower wall 28B.

The first vertical wall 28C to the seventh vertical wall 28I are wall portions extending in the vertical direction. The first vertical wall 28C is a wall on the front side. The second vertical wall 28D is a wall portion on the back side and faces the first vertical wall 28C.

The third vertical wall 28E is a right wall, and is formed along the direction from the first vertical wall 28C to the second vertical wall 28D. The fourth vertical wall 28F is a left wall portion and faces the third vertical wall 28E. The fifth vertical wall 28G is a wall that connects the first vertical wall 28C and the third vertical wall 28E, and constitutes a first corner (corner on the right front) that is one corner of the four corners of the tank main body 28. The fifth vertical wall 28G is inclined with respect to the first vertical wall 28C and the third vertical wall 28E.

The sixth vertical wall 28H is a wall connecting the second vertical wall 28D and the third vertical wall 28E, and constitutes a second corner (corner at the rear right) which is another one of the four corners of the tank main body 28. The sixth vertical wall 28H is inclined with respect to the second vertical wall 28D and the third vertical wall 28E. The seventh vertical wall 28I is a wall connecting the second vertical wall 28D and the fourth vertical wall 28F, and constitutes a third corner (corner at the left rear) which is further another one of the four corners of the tank main body 28. The seventh vertical wall 28I is inclined with respect to the second vertical wall 28D and the fourth vertical wall 28F.

A fourth corner (corner at the left front) 28J, which is a corner between the first vertical wall 28C and the fourth vertical wall 28F, is formed at a right angle.

The hydraulic fluid tank T2 has a partition wall 31 that divides the inside of the tank main body 28 into an upper chamber 28K on the upper side and a lower chamber 28L on the lower side. The dividing wall 31 is provided substantially at the center of the tank main body 28 in the vertical direction. Moreover, the partition wall 31 has the penetration hole 32 which penetrated this partition wall 31 up and down in the center part, and was formed.

A cylindrical passage forming member 37 having an axial center in the vertical direction is inserted into the insertion hole 32. A ring-shaped mounting plate 39 is fixed to the upper portion of the passage forming member 37. The mounting plate 39 is fixed to the upper surface of the partition wall 31 and closes the gap between the passage forming member 37 and the insertion hole 32. The inner circumferential surface of the passage forming member 37 is a main passage 38 communicating the upper chamber 28K with the lower chamber 28L.

The partition wall 31 is formed in a substantially rectangular shape in plan view, and has first corner edge 31*a* to fourth corner edge 31*d* formed of cutting diagonally at four corners. The first corner edge (edge portion) 31*a* corresponds to the first corner portion (fifth vertical wall 28G), the second corner edge (edge portion) 31*b* corresponds to the second corner portion (sixth vertical wall 28G), the third corner edge (edge portion) 31*c* corresponds to the third corner (seventh vertical wall 28I), and the fourth corner (edge portion) 31*d* corresponds to the fourth corner 28J.

A first passage 40A is formed between the first corner portion 31*a* and the first corner portion, and a second passage 40B is formed between the second corner portion 31*b* and the second corner portion. A third passage 40C is formed between the corner edge 31*c* and the third corner, and a fourth passage 40D is formed between the fourth corner 31*d* and the fourth corner 28J. The first passage 40A to the fourth passage 40D are gaps (clearance passages) formed of the edge of the partition wall 31 and the inner surface of the tank main body 28, and communicate the upper chamber and the lower chamber.

A return pipe 29 and a suction pipe 30 are attached to the first vertical wall 28C. The return pipe 29 is a pipe that is used for a hydraulic device and causes a hydraulic fluid of return to return to the hydraulic fluid tank T1 (tank main body 28) to flow into the tank main body 28. The suction pipe 30 is connected to the hydraulic pump P1 via a hydraulic hose, a joint, and the like, and causes the hydraulic fluid of the lower chamber 28L sucked by the hydraulic pump P1 to flow out of the tank.

The return pipe 29 is horizontally offset with respect to the main passage 38 along the wall surface of the first vertical wall 28C. Specifically, the return pipe 29 is offset from the main passage 38 to the third vertical wall 28E and a position away from the main passage 38. That is, the return pipe 29 is arranged so that the flow direction of the hydraulic fluid flowing into the upper chamber 28K from the return pipe 29 (the pipe axial direction at the outlet 29a of the return pipe 29) is directed to a direction different from the direction extending toward the main passage 38.

The return pipe 29 has an inlet 29a into which return hydraulic fluid enters and an outlet port 29b through which the hydraulic fluid flows into the upper chamber 28K. The pipe portion 29d on the inflow port 29a side of the return pipe 29 faces the upper side. The pipe portion 29c on the outlet port 29b side of the return pipe 29 is provided in the horizontal direction. The pipe portion 29c is provided in a direction substantially orthogonal to the first vertical wall 28C. The tube portion 29c penetrates the first vertical wall 28c slightly above (nearly) the partition wall 31 and is fixed to the first vertical wall 28c.

The outlet port 29b (return pipe 29) is arranged such that the flow direction of the hydraulic fluid is directed to the second vertical wall 28D and biased from the main passage 38 to the third vertical wall 28E. In addition, the outlet 29b (return pipe 29) may be configured such that the flow direction of the hydraulic fluid is directed in a direction inclined at a predetermined angle in the horizontal direction with respect to the direction Y4 toward the main passage 38.

In addition, the outlet port 29b may be configured to direct the direction parallel to the horizontal line Y3 passing through the center X3 of the main passage 38 and allow the hydraulic fluid to return to a position away from the main passage 38. In addition, in the example of a figure, although the line Y3 has shown the line (line parallel to the third vertical wall 28E) orthogonal to the first vertical wall 28C. However, the embodiment is not limited to that configuration.

Further, the outlet port 29b is arranged closer to the partition wall 31 than the center portion in the vertical direction of the upper chamber 28K. This prevents the outlet 29 b from being exposed above the oil surface when the oil level of the hydraulic fluid is lowered.

The suction pipe 30 is provided closer to the partition wall 31 than the center of the lower wall 28B and the partition wall 31 in the vertical direction. The suction pipe 30 is provided closer to the fourth vertical wall 28F than the center of the tank main body 28 in the machine width direction K2 in the machine width direction K2. The suction port 30 a side of the suction pipe 30 partially overlaps the main passage 38 in a plan view. The suction port 30a faces the second vertical wall 28D.

The return hydraulic fluid flowing into the upper chamber 28K from the outlet port 29b generates a flow of hydraulic fluid flowing around the main passage 38 (a flow along the wall of the vertical wall of the tank main body 28), and the return hydraulic fluid is mixed well with the hydraulic fluid in upper chamber 28K.

The hydraulic fluid in the upper chamber 28K flows into the lower chamber 28L from the clearance passages (the first passage 40A to the fourth passage 40D) from the main passage 38 in the center portion of the tank main body 28 and from the hydraulic fluid in the lower chamber 28L when the hydraulic fluid in the lower chamber 28L is sucked by the hydraulic pump P1, and thus the hydraulic fluid in the upper chamber 28K is mixed well with the hydraulic fluid of the lower chamber 28L.

The flow of the hydraulic fluid flowing around the main passage 38 and the flow of the hydraulic fluid flowing from the main passage 38 and the clearance passages at the four corners to the lower chamber 28L allow the hydraulic fluid to be well mixed, thereby suppressing temperature unevenness of the hydraulic fluid. Also, the tank main body 28 is reinforced by the partition wall 31.

In addition, since the first corner portion 28G, the second corner portion 28H and the third corner portion 28I are inclined (chamfered), the flow of hydraulic fluid along the wall of the vertical wall of the tank main body 28 is generated. Moreover, it can suppress that stagnation is formed in the corner part of the tank main body 28.

In addition, when the hydraulic pump stops suctioning, air bubbles mixed in the hydraulic fluid in the lower chamber 28L are favorably discharged to the upper chamber 28K through the main passage 38 and the first to fourth passages 40A to 40D. Further, even if the hydraulic fluid tank T2 is inclined, air bubbles mixed in the hydraulic fluid in the lower chamber 28L escape from any of the clearance channels at the four corners of the tank main body 28.

As shown in FIG. 6 and FIG. 7, at the front of the cabin 5, a plurality of front mounting members are provided to support the front of the cabin 5 in an anti-vibration manner on the machine body 2. In the present embodiment, the plurality of front mounting members are the left front mounting member 251L and the right front mounting member 251R. At the rear of the cabin 5, there are provided a plurality of rear mounting members for supporting the rear of the cabin 5 in an anti-vibration manner on the machine body 2. In the present embodiment, the plurality of rear mounting members are the left rear mounting member 252L and the right rear mounting member 252R.

As shown in FIG. 6 and FIG. 7, the left intermediate post (left front support post) 64L of the cabin 5 is provided at a middle portion in the front-rear direction K1 of the left side surface of the cabin 5. The right middle post (right front support post) 64L of the cabin 5 is provided at the middle of the front-rear direction K1 of the right side surface of the cabin 5. The intermediate posts 64L and the intermediate posts 64R are provided at substantially the same position in the front-rear direction K1. The left and right middle posts 64L and 64R are formed from the lower end to the upper end of the cabin 5.

As shown in FIG. 6 and FIG. 7, the cabin 5 has a left rear support 253L provided behind the intermediate post 64L and a right rear support 253R provided behind the intermediate post 64R. The rear support post 253L is provided at the corner between the right side and the back of the cabin 5, and is provided at the corner between the right side and the rear of the cabin 5. The left and right rear struts 253L, 253R are formed from the lower end to the upper end of the cabin 5.

The middle posts 64L and 64R and the rear columns 253L and 253R are strength members that form a frame (cabin frame) of the cabin 5. A support member which is a strength member of the cabin 5 is not provided in front of the middle posts 64L and 64R.

As shown in FIG. 4, the cabin 5 has a roof 254 that covers the upper side of the operation portion 42 (operator seat 6). The roof 254 is provided across the upper ends of the middle posts 64L and 64R and the rear posts 253L and 253R.

As shown in FIG. 6 and FIG. 7, the entrance 62 is formed between the intermediate post 64L and the rear support 253L. That is, the middle post (the front support) 64L forms the entrance 62 which is opened and closed by the door 53 between the rear support 253L and the middle support (the front support).

Figure 49:
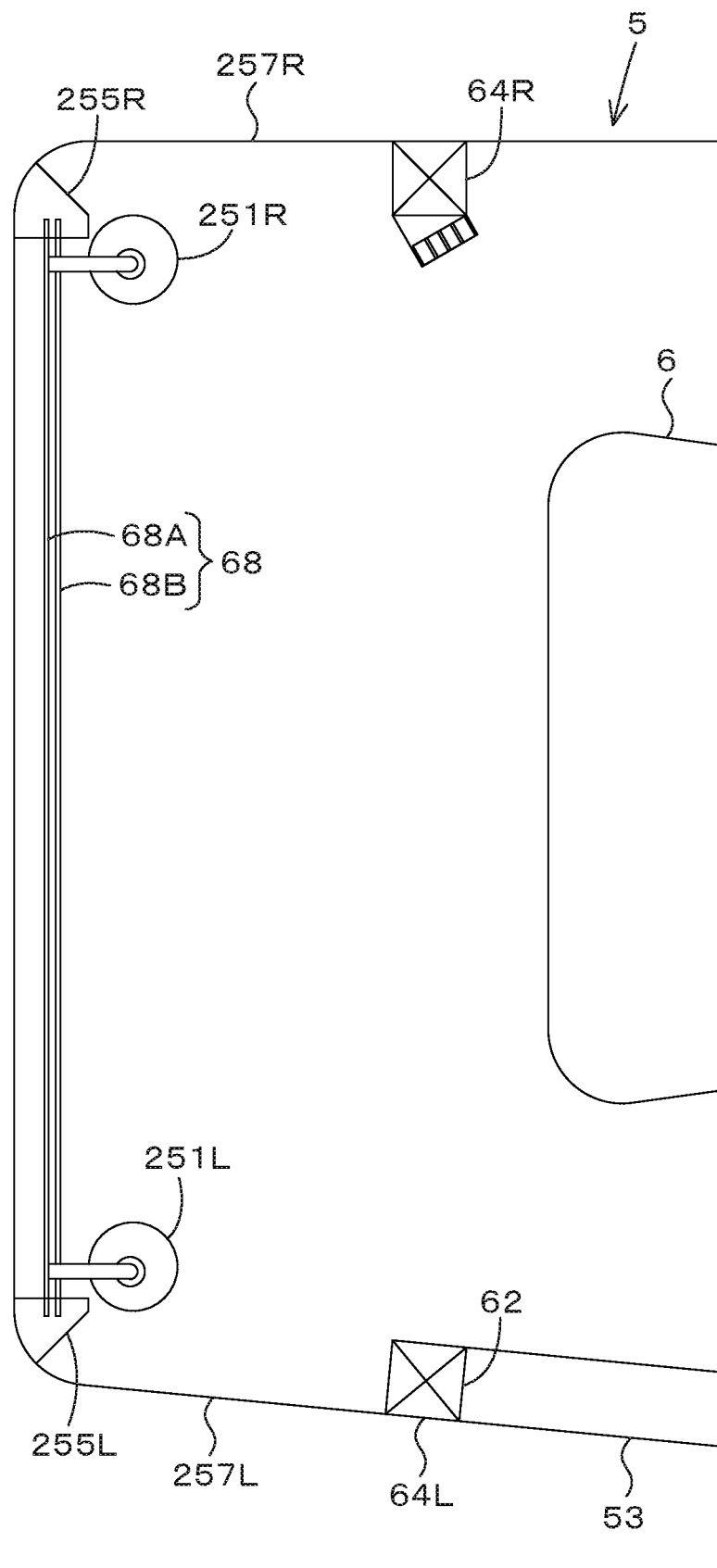
FIG. 49 is a plan view illustrating a front portion of the cabin according to the embodiments.

As shown in FIG. 49, the front mounting member 250L is arranged behind the left end of the windshield (front panel) 68. The front mounting member 250R is arranged rearward of the right end of the windshield 68. That is, the windshield 68 is provided in front of the front mounting members 251L and 251R. The windshield 68 has a transparency that allows the operator to view the front.

The middle post 64L is provided at the rear of the front mounting member 250L. The intermediate post 64L is arranged between the front mounting member 250L and the operator seat 6 and closer to the operator seat 6 in the front-rear direction K1. The middle post 64R is provided at the rear of the front mounting member 250R. The intermediate post 64R is arranged between the front mounting member 250R and the operator seat 6 and closer to the operator seat 6 in the front-rear direction K1.

Figure 50:
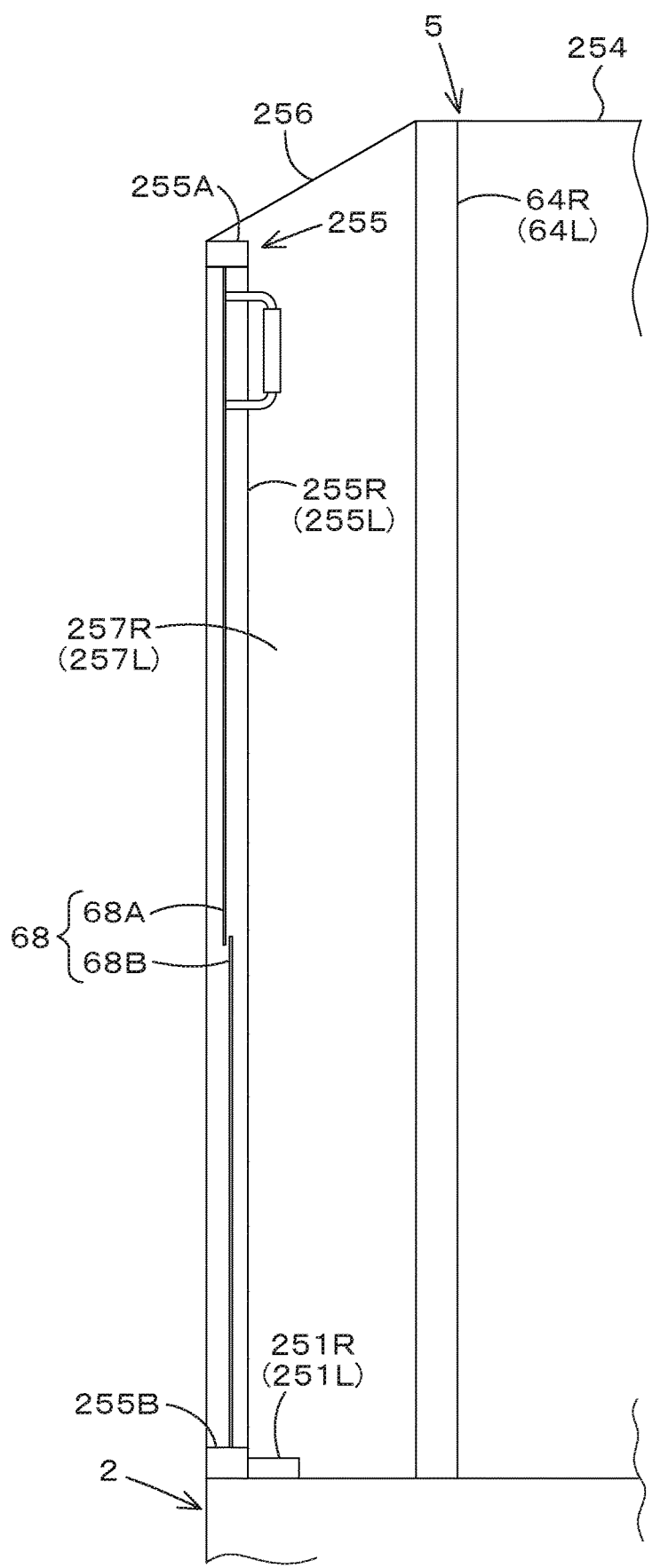
FIG. 50 is a side view illustrating the front portion of the cabin according to the embodiments.
Figure 51:
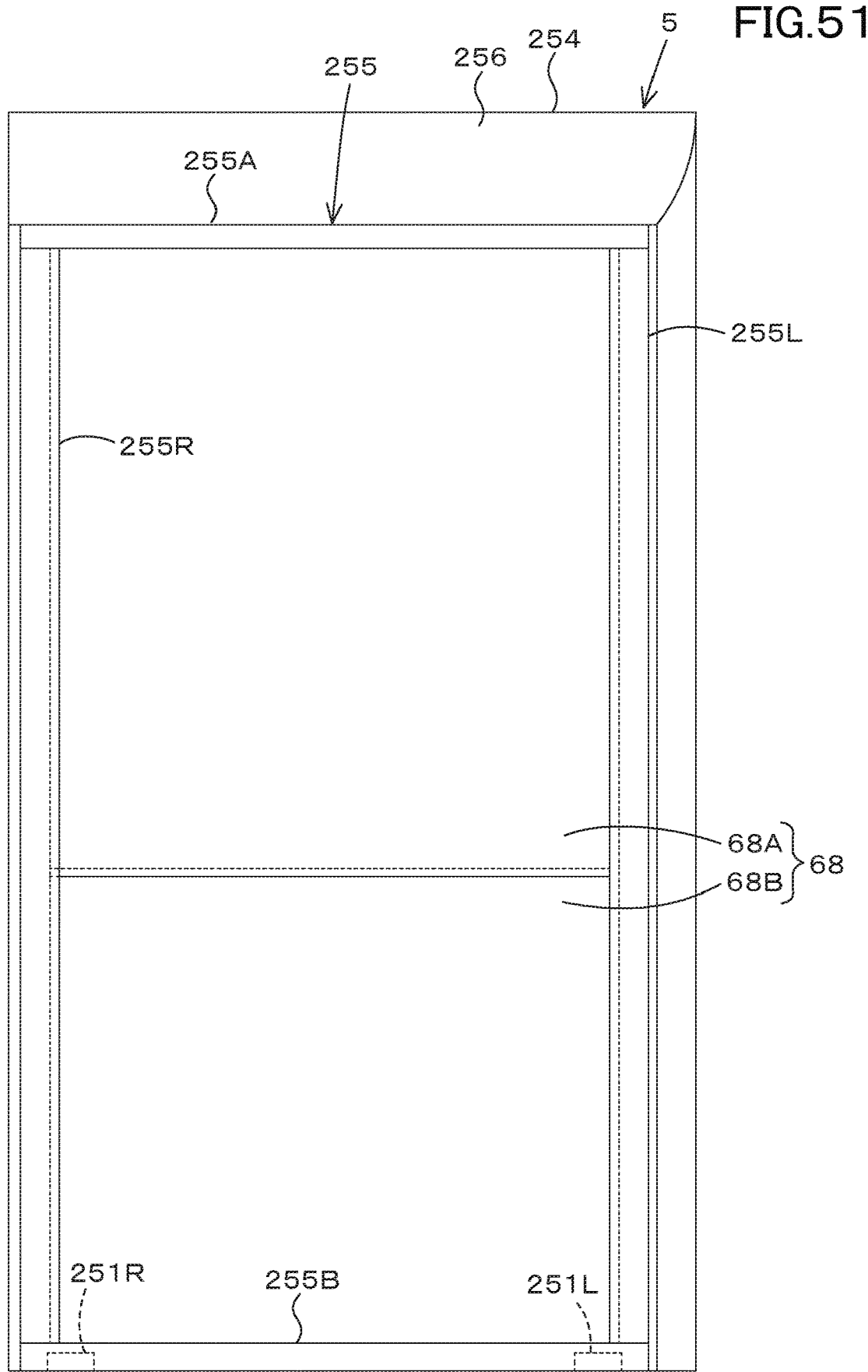
FIG. 51 is a front view of the cabin according to the embodiments.

As shown in FIG. 49 to FIG. 51, a panel frame 255 to which a windshield 68 is fitted is provided on the front side of the cabin 5. The panel frame 255 has an upper lateral frame 255A, a lower lateral frame 255B, a left vertical frame 255L, and a right vertical frame 255R. The upper lateral frame 255A is provided on the upper side of the windshield 68 so as to extend in the machine width direction K2. The lower lateral frame 255B is provided below the windshield 68 and extends in the machine width direction K2. The vertical frame 255L connects the left ends of the upper lateral frame 255A and the lower lateral frame 255B. The vertical frame 255R connects the right ends of the upper lateral frame 255A and the lower lateral frame 255B. The vertical frame 255L and the vertical frame 255R are provided with a rail member for guiding the upper glass (upper panel) movably up and down, and the upper glass 68A is fitted between the vertical frame 255L and the vertical frame 255R so as to be vertically movable. The lower glass (lower panel) 68B is fixed to the lower lateral frame 255B, the vertical frame 255L, and the vertical frame 255R.

Conventionally, there is a front support extending in the vertical direction forward of the front mounting member, and this front support is a thick member because it is a strength member that forms a cabin frame. For this reason, the operator's forward and upward visibility is impaired by the front support. On the other hand, in the present embodiment, by providing the intermediate posts (front columns) 64L and 64R behind the front mounting members 251L and 251R, the thick column members arranged on the side of the windshield 68 disappear. In this manner, the operator's forward and upper visibility can be improved.

As shown in FIG. 50 and FIG. 51, the upper lateral frame member 255A is located in front of and below the roof 254. A front upper panel 256 is provided between the upper lateral frame member 255A and the front end of the roof 254. The front upper panel 256 may have, for example, a permeability that allows the operator to view the outside of the cabin 5. Thereby, the visibility of the upper front of the cabin 5 can be improved.

As shown in FIG. 49, the left front side panel 257L is provided between the vertical frame 255L and the middle post 64L. The right front side panel 257R is provided between the vertical frame 255R and the middle post 64R. The front side panel 257L and the front side panel 257R may have, for example, a permeability that allows the operator to view the cabin 5 outside the cabin. Thereby, the visibility of the front diagonal side of the cabin 5 can be improved.

As shown in FIG. 6 and FIG. 7, the rear window 52 is a partition wall that opens and closes in order to connect the driving portion 42 and the space 46 while partitioning the driving portion 42 and the space 46. The partition wall (rear window 52) may be formed at a height from the vicinity of the step (floor surface) 49 to the vicinity of the roof 254. Also, the partition wall (rear window 52) may be permeable from the bottom to the top. With the partition wall (rear window 52) being permeable to the lower part (up to near the step 49), the rear view (left rear viewability) of the cabin 5 is significantly improved. Further, by forming the partition wall (rear window 52) from the vicinity of the step 49 to the vicinity of the roof 254, air permeability becomes better when the partition wall (rear window 52) is opened, and the door 53 is closed. Even in the state, the air permeability of the cabin 5 can be improved. In addition, when the lower end of the partition wall (rear window 52) is formed to be located in the vicinity of the step 49, the flow of wind in the operator's foot space is obtained by opening the partition wall (rear window 52). In this manner, the flow of wind in the operator's foot space is generated, and the air permeability of the foot space of the room of the cabin 5 can be improved.

The partition wall may be employed also for a canopy-type working machine 1 equipped with a canopy instead of the cabin 5. For example, in the case where the side wall (left side surface) of the fuel tank T1 forms the first forming surface 47, the fuel tank T1 is exposed, so a partition wall may be provided to partition the driving portion 42 and the space 46.

Figure 52:
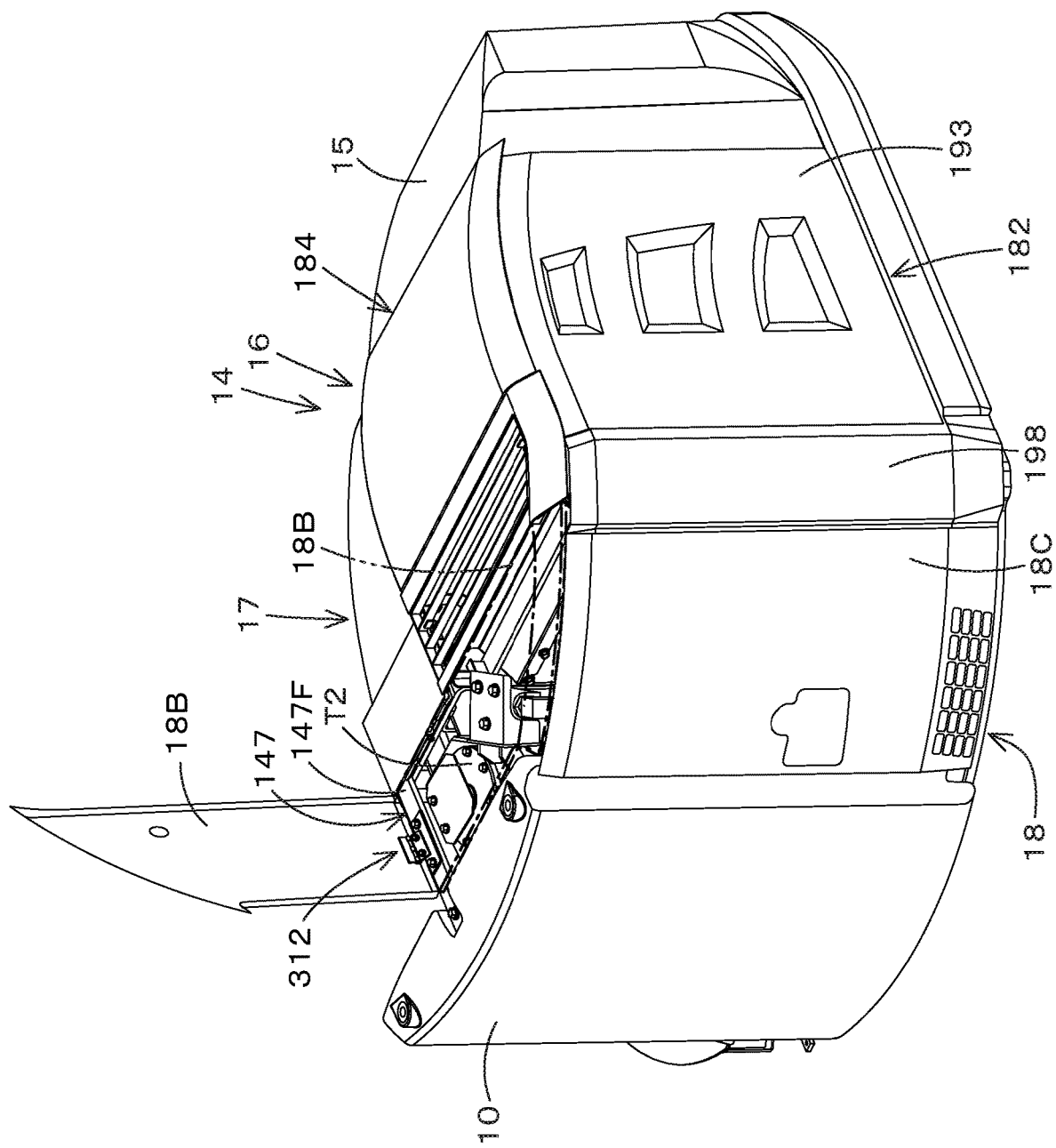
FIG. 52 is an outside view illustrating a state where a cover device is closed according to the embodiments.
Figure 53:
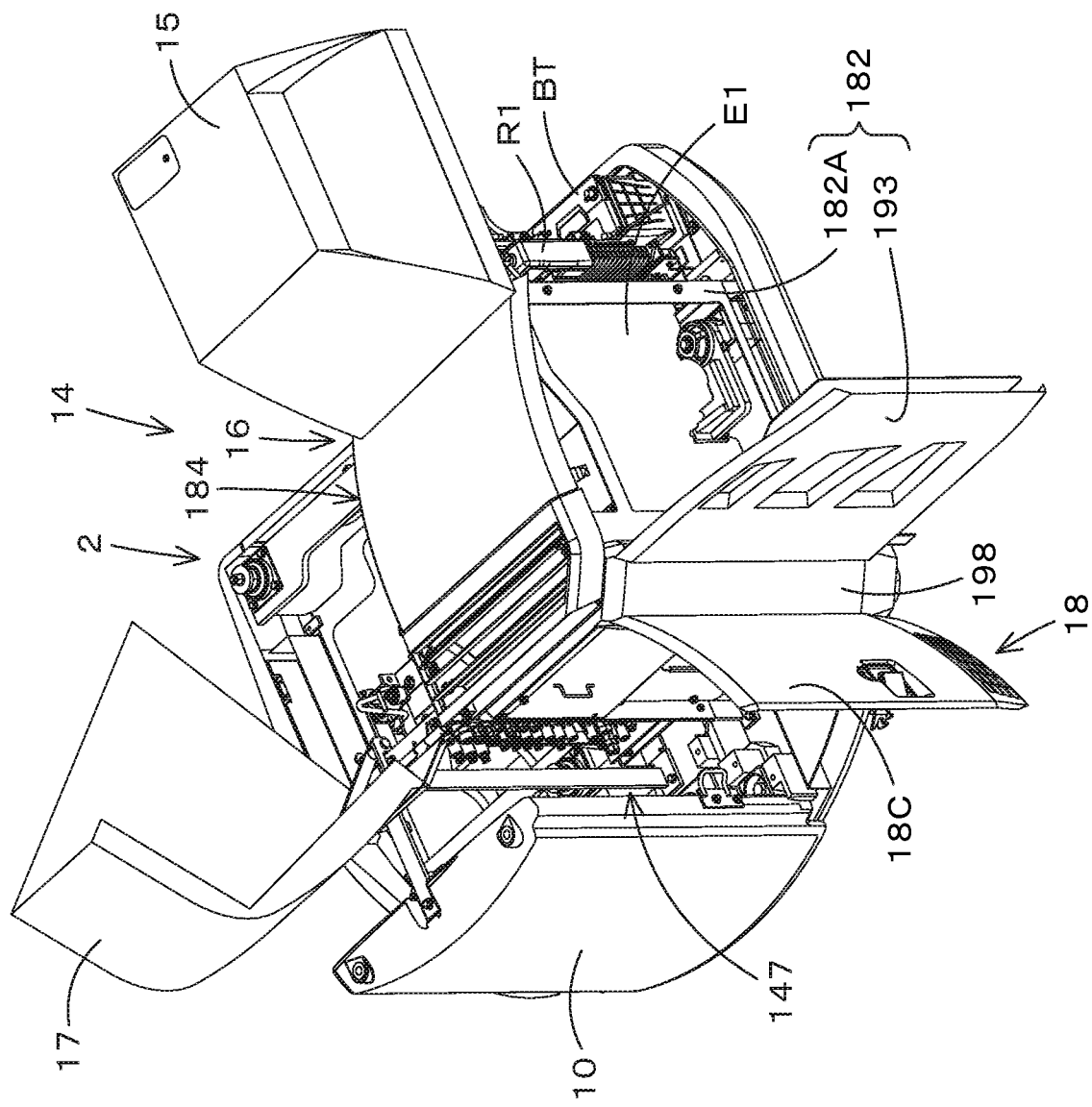
FIG. 53 is an outside view illustrating a state where the cover device is opened according to the embodiments.

FIG. 52 shows a state in which the cover device 14 is closed. Specifically, the first cover body 15, the third cover body 17, the third cover 18C and the openable/closable bonnet 193 are shown closed, and the second cover 18B is closed (see phantom line) and open (solid line) Reference). FIG. 53 shows the state in which the cover device 14 is open. Specifically, the first cover 15, the third cover 17, the third cover 18C, and the openable/closable bonnet 193 are open.

Figure 54:
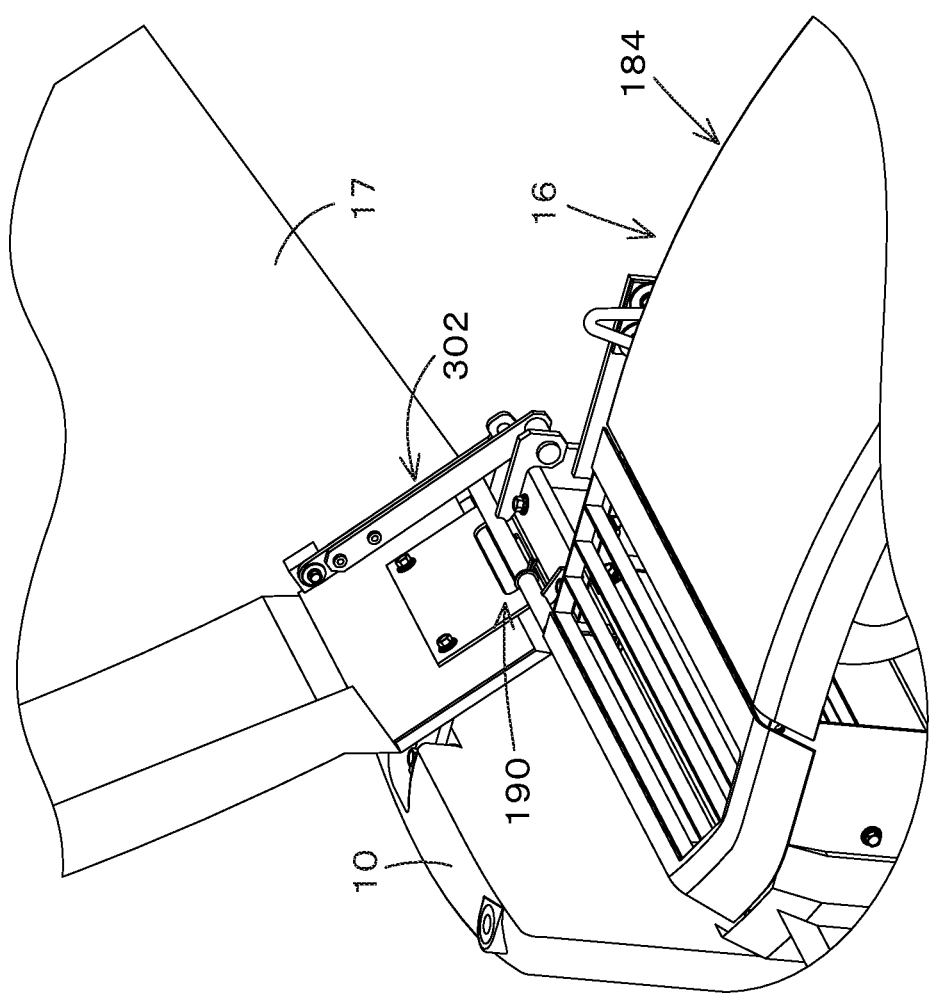
FIG. 54 is a perspective view illustrating a pivotally-supporting portion of a third cover body according to the embodiments.
Figure 55:
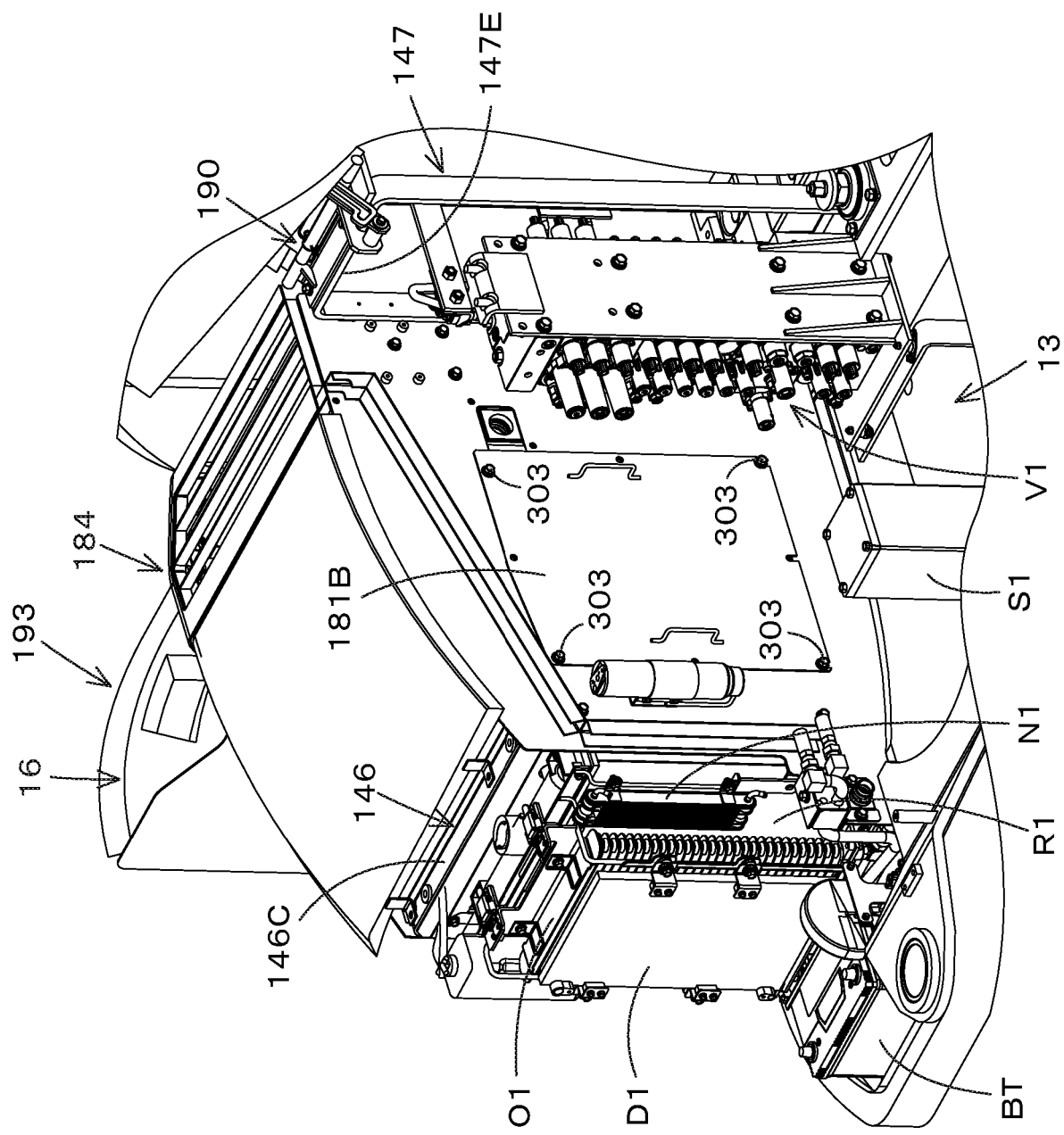
FIG. 55 is a perspective view of a first side portion bonnet under a state where the third cover body is opened according to the embodiments.

As described above, the third cover body 17 is attached to the second rear beam member 147E of the rear support frame 147 via the hinge 190 (see FIG. 37). Specifically, as shown in FIGS. 54 and 55, the third cover body 17 is pivotally supported about an axis whose rear upper portion extends in the machine width direction K2 via a hinge 190. Thus, the third cover body 17 is supported by the rear support frame 147 so as to be vertically pivotable, and is opened by pivoting upward from the closed state shown in FIG. 1n addition, the third cover body 17 is largely opened so as to be inclined backward. Thereby, maintenance of the device (swivel joint S1, the turn motor M3, the control valve V1) shown in FIG. 1 housed in the third cover body 17 can be easily performed. Further, a rocking restriction mechanism (referred to as a first rocking restriction mechanism) 302 is provided across the rear support frame 147 and the third cover body 17. The first rocking restriction mechanism 302 permits rocking of the third cover body 17 up and down, and is locked when the third cover body 17 is positioned at an open position in which the third cover body 17 is inclined backward, and then holds the third cover body 17 in the opened position. In addition, when the lock by the first swing restricting mechanism 302 is released, the third cover body 17 can be closed.

As shown in FIG. 55, when the third cover body 17 is in the open position, the cover plate 181B provided on the first bonnet side portion 181 is exposed. With the third cover 17 open, the bolt 303 fixing the lid plate 181B can be removed. Thereby, the third cover body 17 can be attached or detached. Further, by removing the cover plate 181B, as shown in FIG. 33, the prime mover E1 can be accessed through the opening 181C.

Figure 56:
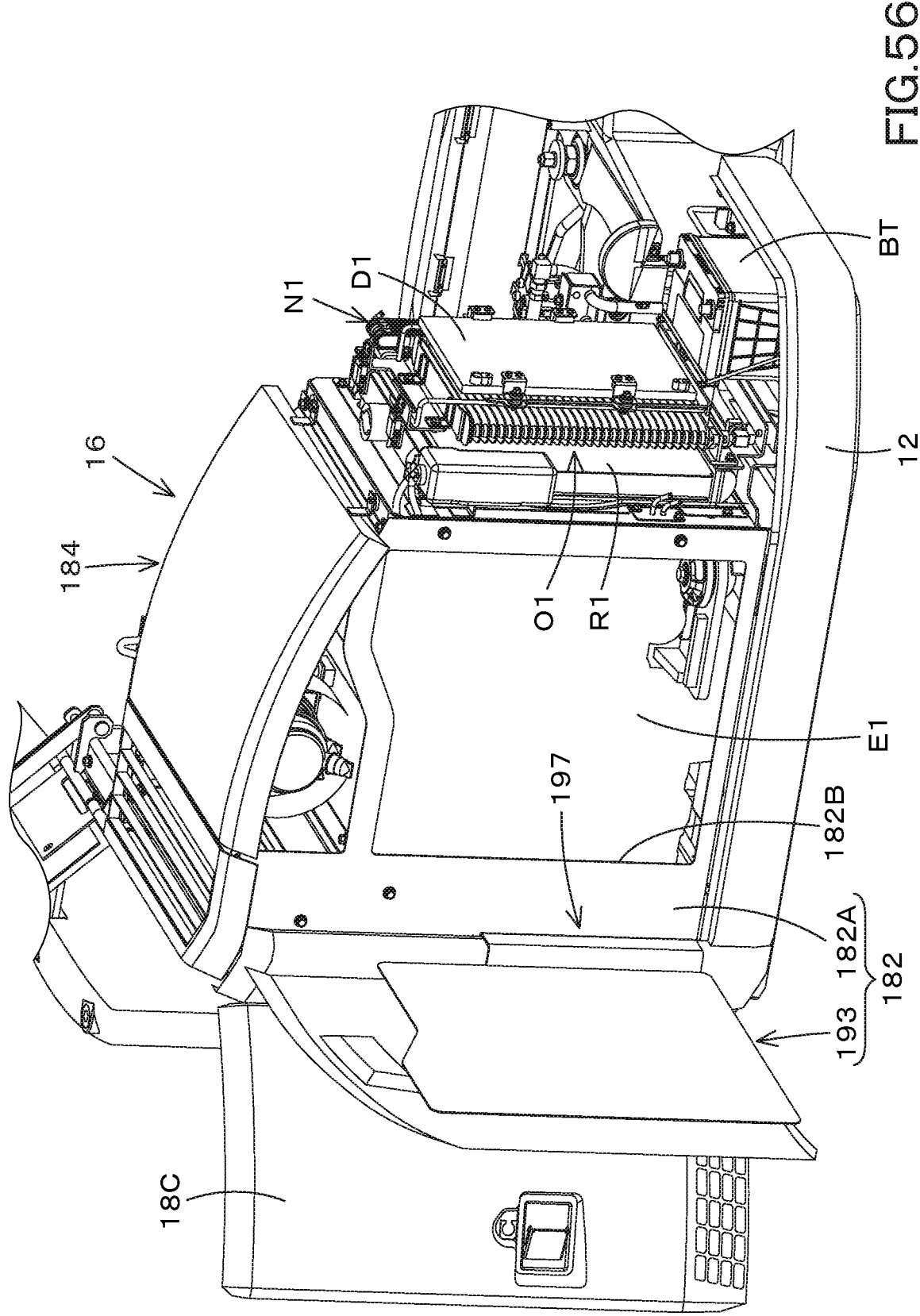
FIG. 56 is a perspective view illustrating a state where an opening-closing bonnet according to the embodiments.

As described above, the open/close bonnet 193 of the second bonnet side portion 182 is supported so as to be able to open and close via the hinge 197 (see FIG. 40). Specifically, as shown in FIG. 56, the openable/closable bonnet 193 is pivotally supported at its rear portion by a hinge 197 so as to be rotatable about its longitudinal axis. Thus, the openable/closable bonnet 193 is swingably supported in the machine width direction K2, and is opened by swinging from the closed state shown in FIG. 52 to the outside of the machine. Further, the openable/closable bonnet 193 opens to a position where it extends toward the outside of the machine. Thus, the prime mover E1 can be easily accessed through the inspection hole 182B.

Figure 57:
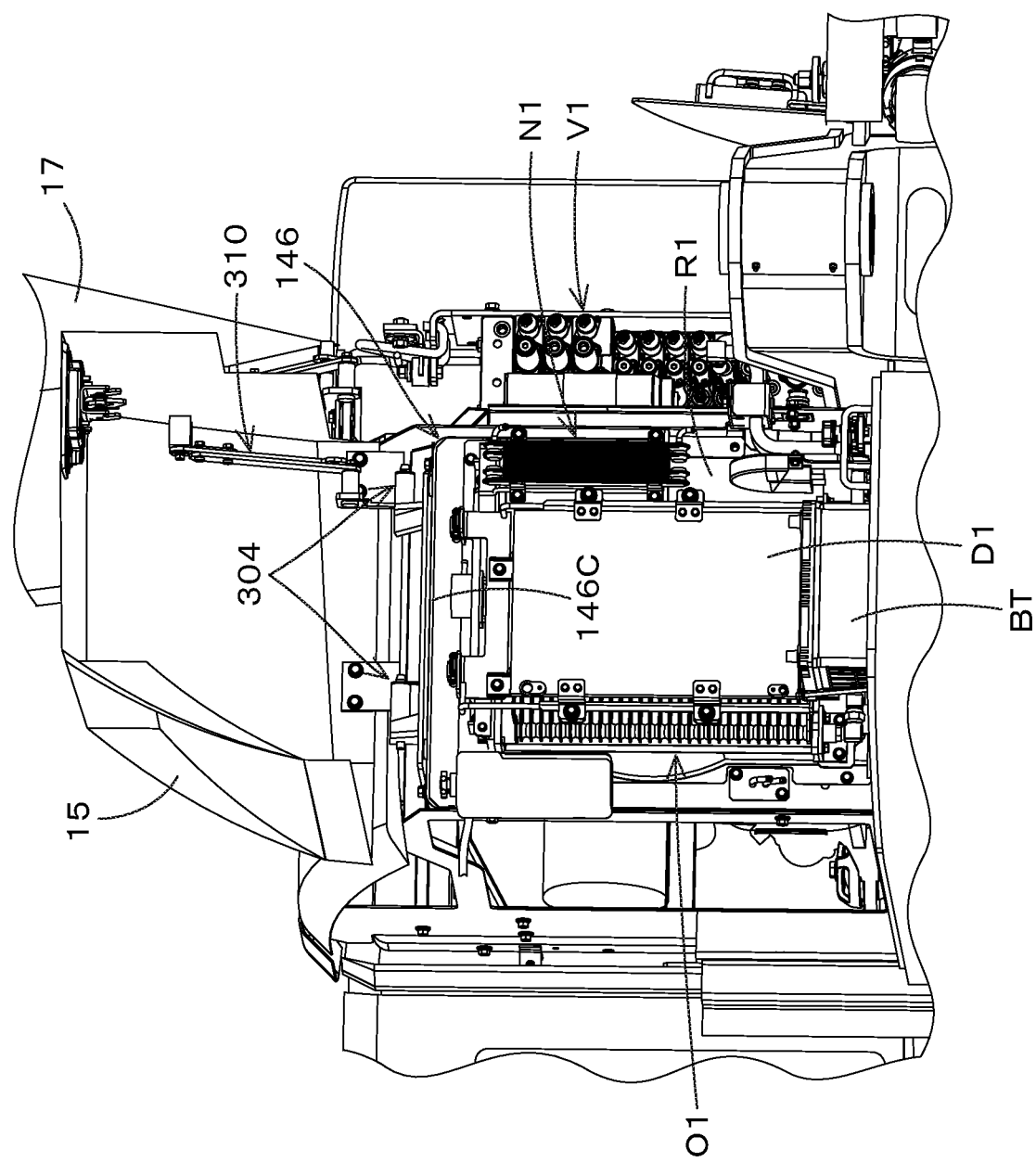
FIG. 57 is a perspective view illustrating a state where a first cover body is opened according to the embodiments.

As described above, the first cover body 15 is pivotally supported by the front beam member 146C of the front support frame 146 (see FIG. 25). Specifically, as shown in FIG. 57, the first cover body 15 is rotatably supported about an axis whose rear upper portion extends in the machine width direction K2 by a hinge 304. Thus, the first cover body 15 is supported swingably in the vertical direction, and is opened by swinging upward from the closed state shown in FIG. 52. Thus, maintenance and the like of devices (radiator R1, oil cooler O1, condenser D1, fuel cooler N1, battery BT, and the like) arranged on the front side of the prime mover E1 (front support frame 146) shown in FIG. 56 may be performed.

Further, as shown in FIG. 57, by opening the first cover body 15 and the third cover body 17, the radiator R1 is opened from the front side to the side (left side) of the first bonnet side portion 181. As a result, maintenance and the like of the devices accommodated in the first cover body 15 and the hydraulic devices arranged in the hydraulic device arrangement portion 13 can be easily performed.

As shown in FIG. 57, a rocking restriction mechanism (referred to as a second rocking restriction mechanism) 310 is provided across the front support frame 146 and the first cover body 15. The second swing restricting mechanism 310 allows the upper and lower swings of the first cover body 15 and is locked when the first cover body 15 is positioned at a predetermined open position. Hold in the open position. In addition, the first cover body 15 can be closed by releasing the lock by the second swing restricting mechanism 310.

Figure 58:
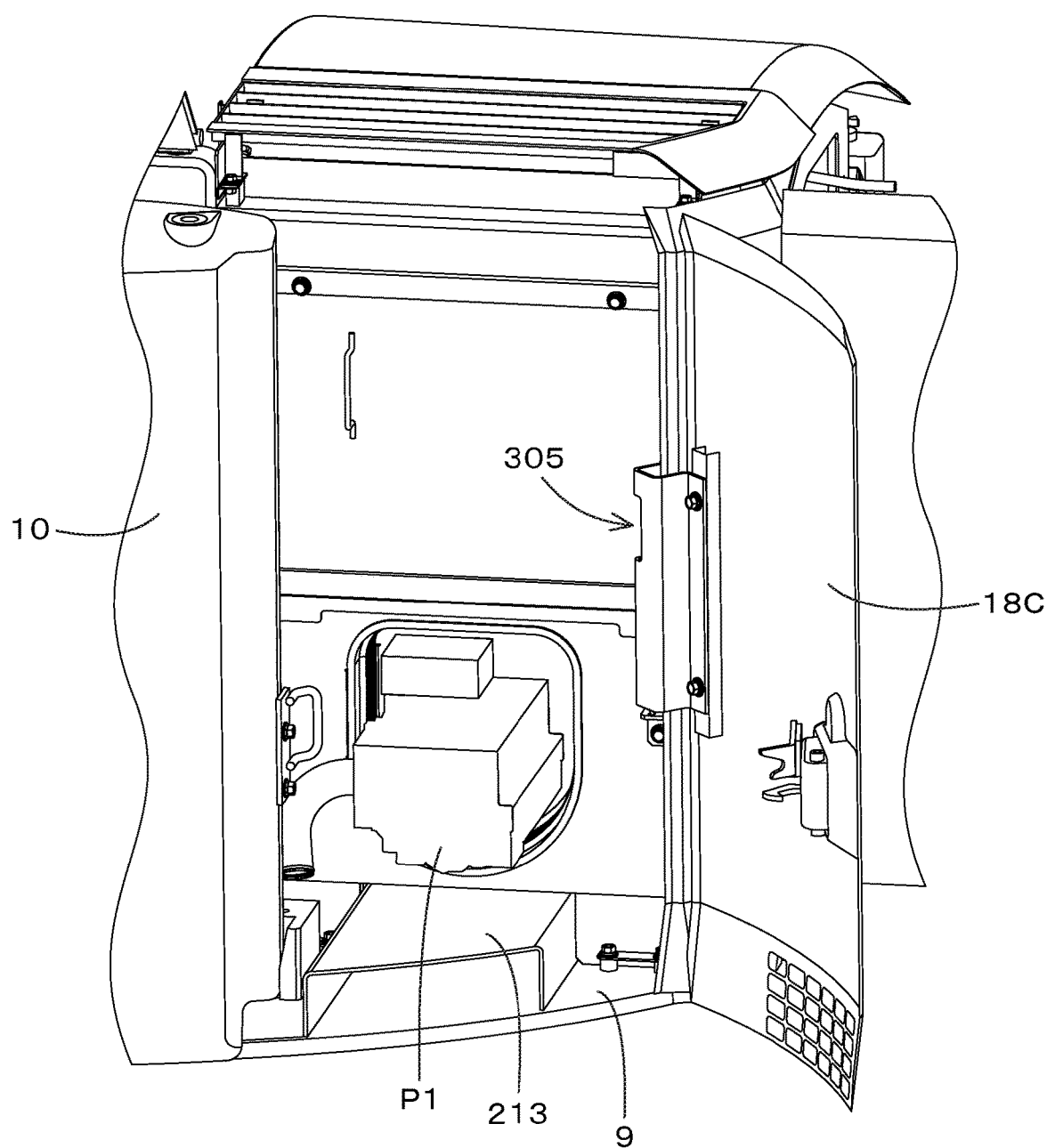
FIG. 58 is a perspective view illustrating a state where the third cover body is opened according to the embodiments.

As described above, the third cover (cover portion) 18C can be opened and closed (see FIG. 1). Specifically, as shown in FIG. 58, the third cover 18C is rotatably supported about the longitudinal axis by the hinge 305 on the vehicle body side (right side). Thus, the third cover 18C is swingably supported in the machine width direction K2, and opens by swinging outward from the closed state shown in FIG. 52. Thereby, maintenance and the like of hydraulic pump P1 can be performed.

Figure 59:
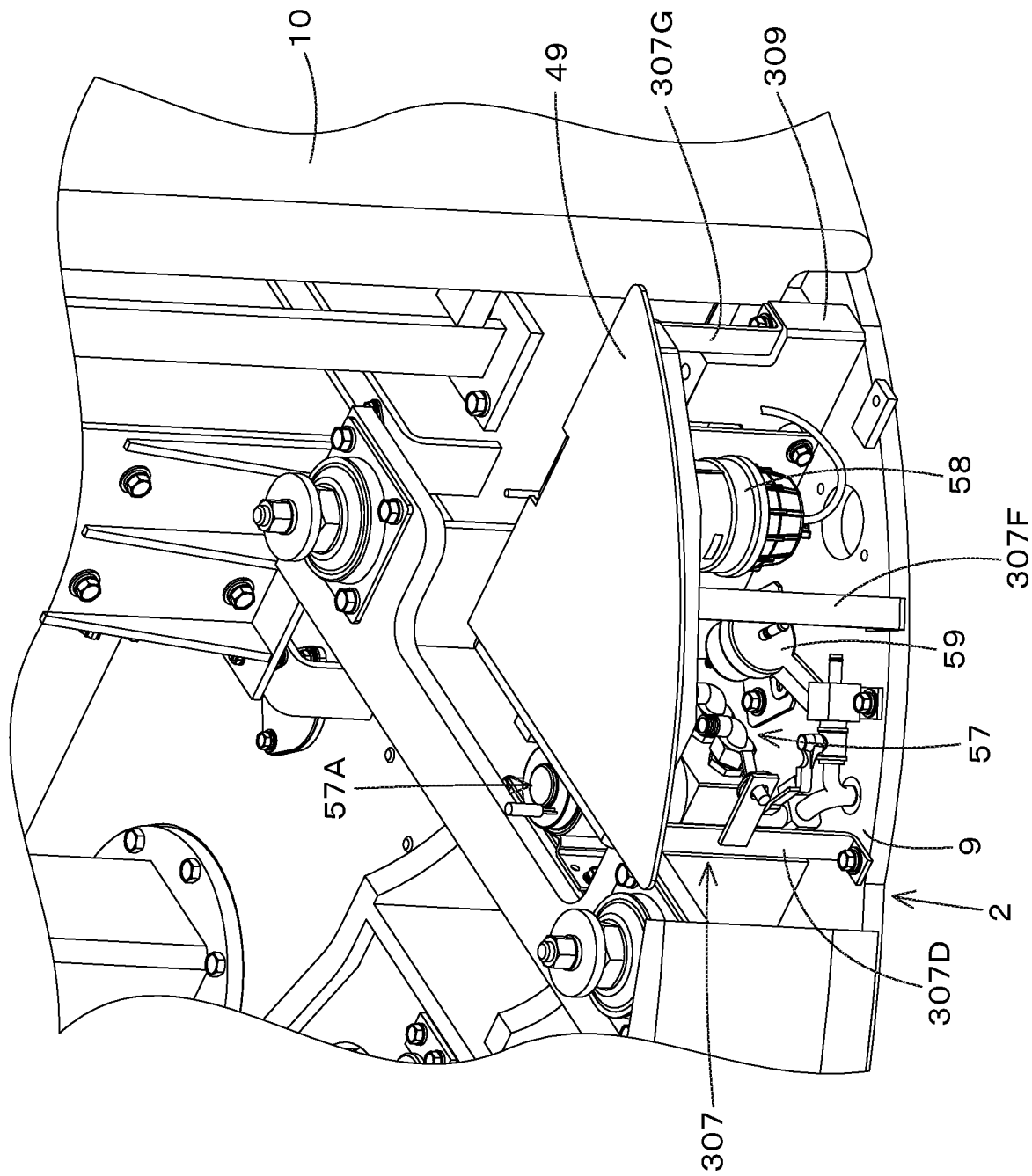
FIG. 59 is a perspective view illustrating a state where a step is closed according to the embodiments.
Figure 60:
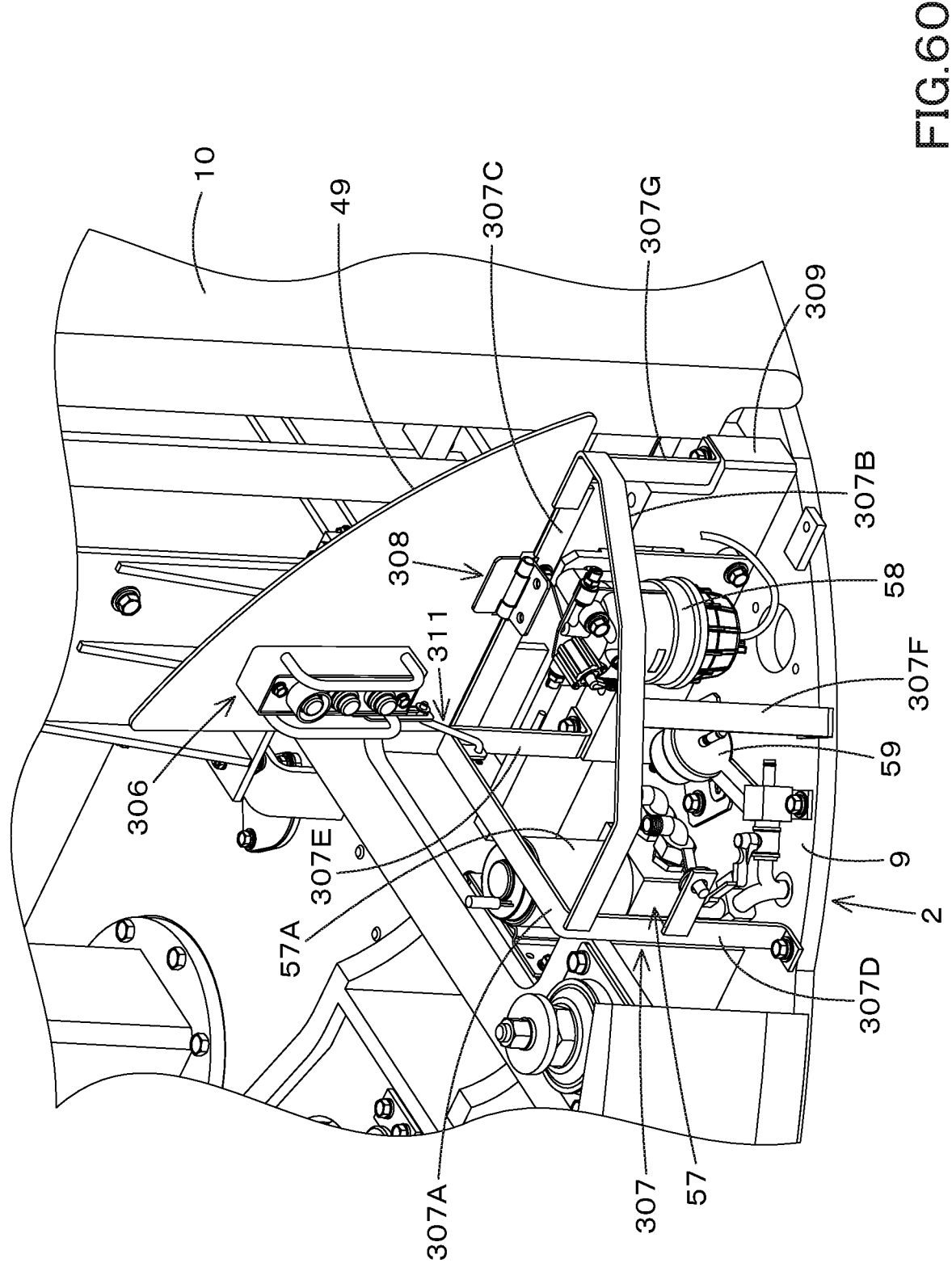
FIG. 60 is a perspective view illustrating a state where the step is opened according to the embodiments.

As shown in FIG. 59, the step 49 is supported by a step frame (frame member) 307 provided on the machine body 2. As shown in FIG. 60, the step frame 307 includes a first frame member 307A, a second frame member 307B, a third frame member 307C, and a plurality of support legs (first support leg 307D to fourth support leg 307G). The first frame member 307A constitutes an upper front side of the step frame 307 and extends in the machine width direction K2. The front end portion of the step 49 is placed and supported on the first frame member 307A. The first support leg 307D extends downward from the left end of the first frame member 307A, and is bolted to the turn base 9. The second support leg 307E extends downward from the right end of the first frame member 307A, and is bolted to the support block 309 fixed to the turn base 9. The support block 309 is, for example, a mount for mounting the fuel tank T1.

The second frame member 307B constitutes a rear portion from the left side (outboard side) of the upper portion of the step frame 307, and the left end portion and the rear end portion of the step 49 are placed and supported. The front portion of the second frame member 307B is fixed to the top of the first support leg 307D. An upper portion of the third support leg 307F is fixed to an intermediate portion of the second frame member 307B, and a lower portion is bolted to the pivoting base plate 9. An upper portion of the fourth support leg 307G is fixed to the rear right side of the second frame member 307B, and a lower portion is bolted to the support block 309.

The third frame member 307C constitutes the upper right side (inboard side) of the step frame 307. The front portion of the third frame member 307C is fixed to the upper portion of the second support leg 307E. The rear portion of the third frame member 307C is fixed to the rear right side of the second frame member 307B. The right side (inboard side) of the step frame 307 is attached by a hinge 308. More specifically, the step 49 is rotatably supported about an axis extending in the front-rear direction K1 (horizontal direction) by the hinge 308 on the vehicle body side. Thus, the step 49 is supported swingably in the vertical direction, and is opened by swinging upward from the closed state shown in FIG. 59 (see FIG. 60). The step 49 may be pivotally supported by the first frame member 307A so as to be rotatable about an axis extending in the machine width direction K2.

As described above, the upper portion of the step frame 307 is annularly formed along the outer shape of the step 49 by the first frame member 307A, the second frame member 307B and the third frame member 307C. Thus, by opening the step 49, as shown in FIG. 60, maintenance of the sedimenter 58 (cleaning of the filter, drainage of water), maintenance of the fuel pump 59, and the like can be performed. Further, on the lower surface side (back side) of the step 49, an operation mechanism 306 for operating the fuel supply device 57 is provided. The operation mechanism 306 includes an operation switch for operating the fuel supply pump 57A of the fuel supply device 57.

As shown in FIG. 60, a restricting rod 311 for holding the step 49 in the open state is provided across the first frame member 307A and the back side of the step 49.

As shown in FIG. 52, the second cover (cover) 18B covering the upper side of the hydraulic fluid tank T2 can be opened and closed. As shown in FIG. 61, the rear portion of the upper frame member 147F of the rear support frame 147 is fixed to the weight 10 by a bolt. The left end side (inboard side) of the second cover 18B is attached to the upper frame member 147F via a hinge 312. The hinge 312 is pivotable about an axis extending in the front-rear direction K1. Thus, the second cover 18B is pivotally supported so as to be rotatable about the axial center in the front-rear direction K1 on the machine inward side, and is opened by pivoting upward from the closed state shown by imaginary lines in FIG. 52 (see the solid line in FIG. 52).

The working machine 1 of the present embodiment has the following effects.

The working machine 1 includes the machine body 2, the operating portion 42 having a operator seat 6 and a operating device 41 and mounted on one side of the machine body 2 in the machine width direction K2, a prime mover E1 mounted on the other side of the machine body 2 in the machine width direction K2, and the hydraulic device arrangement portion 13 in which the hydraulic device is arranged, the hydraulic device arrangement portion 13 being provided between the operating portion 42 and the prime mover E1.

According to this configuration, the operating portion 42 does not interfere with access to the hydraulic device arranged in the hydraulic equipment arrangement portion 13. That is, hydraulic equipment can be easily accessed.

Further, the machine body 2 can be pivoted about a pivot axis X1 extending in the vertical direction, and the operating portion 42 is a part of the vehicle width direction K2 from a center line Y1 passing through the pivot axis X1 and extending in the front-rear direction K1. The prime mover E1 may be arranged closer to the side, and may be arranged closer to the other side in the machine width direction K2 than the center line Y1.

According to this configuration, the balance in the machine width direction K2 of the machine body 2 can be improved.

The hydraulic device arranged in the hydraulic device arrangement portion 13 may include a swivel joint S1 for circulating the hydraulic fluid, a turn motor M3 for swinging the machine body 2, and a control valve V1 for controlling a plurality of hydraulic actuators.

According to this configuration, it is possible to access the swivel joint S1, the turn motor M3 and the control valve V1 without lowering the operating portion 42.

In addition, the machine body 2 can be pivoted about a pivot axis X1 extending in the vertical direction, the swivel joint S1 is arranged at the pivot axis X1 position, the turn motor M3 is arranged in front of the swivel joint S1, and the control valve V1 may be arranged behind the swivel joint S1.

According to this configuration, the swivel joint S1, the turn motor M3 and the control valve V1 can be compactly arranged in the machine width direction K2 in the hydraulic device arrangement, and the enlargement of the machine width direction K2 of the machine body 2 can be suppressed.

In addition, at least a part of the hydraulic device arranged in the hydraulic device placement portion 13 may be arranged on the other side (in the machine width direction K2) than the operation portion 42. According to this configuration, it is possible to access the hydraulic device without lowering the operating portion 42.

Further, the control device U1 may be provided in the hydraulic device arrangement portion 13.

According to this configuration, the controller U1 can be accessed without lowering the operating portion 42. That is, the controller U1 can be easily accessed.

In addition, the working machine 1 includes the fuel tank T1 for storing the fuel of the prime mover E1 and a hydraulic fluid tank T2 for storing hydraulic fluid for operating the hydraulic actuator are provided, and the fuel tank T1 and the hydraulic fluid tank T2 may be arranged in the machine width direction k2 behind the operation portion 42 of the machine body 2.

According to this configuration, by arranging the fuel tank T1 and the hydraulic fluid tank T2 behind the operating portion 42, the weight balance of the working machine 1 can be improved. Further, the fuel tank T1 and the hydraulic fluid tank T2 can be formed in a shape (longitudinal shape) having a high height and a small horizontal cross-sectional area, and thus can be arranged compactly in the machine width direction K2 on the machine body 2.

In addition, the working machine 1 includes the support bracket 20 provided so as to project forward to the machine body 2, a swing bracket 21 swingably supported on the support bracket 20, and a swing cylinder C2 for swinging the swing bracket 21. One end side of the cylinder C2 may be attached to the swing bracket 21, and the other end side may be attached to the machine body 2 below the operating portion 42.

According to this configuration, the swing cylinder C2 can be compactly arranged below the operating portion 42.

Further, the working machine 1 may include the radiator R1 arranged in front of the prime mover E1, the cooling fan F1 arranged between the radiator R1 and the prime mover E1 and configured to generate the cooling air flowing rearward, and may include a cover body (first cover body 15) covering the radiator R1 and having the outside air inlet port 19 for introducing external air into the cover body on the front side.

According to this configuration, when the working machine 1 is advanced, for example, an obstacle such as a branch of a tree can be prevented from being stuck in the outside air intake port 19.

The working machine 1 includes the machine body 2 capable of turning about a pivot axis X1 extending in the vertical direction, the operator seat 6 mounted on one side of the machine body 2, and the prime mover E1 arranged on the other side of the machine body 2, and the fuel tank T1 mounted on the machine body 2 behind the operator seat 6. The fuel tank T1 has a width in the height direction wider than a width along the machine width direction K2 and the width along the longitudinal direction K1.

According to this configuration, by providing the fuel tank T1 behind the operator seat 6, the restriction in the height direction is eliminated, and the fuel tank T1 having a high height and a small horizontal cross-sectional area (of an elongated shape) can be formed. Thus, even when the machine body 2 is inclined, the fuel in the fuel tank T1 can be effectively used.

The fuel tank T1 may have a shape in which the width in the height direction is wider than the sum of the width in the machine width direction K2 and the width in the machine longitudinal direction K1.

According to this configuration, since the fuel tank T1 can be increased in height to reduce the cross-sectional area in the horizontal direction, the fuel in the fuel tank T1 can be more effectively used.

The fuel tank T1 may further include a weight 10 arranged behind the fuel tank T1, and the fuel tank T1 may be arranged to face the weight 10.

According to this configuration, it is possible to effectively protect the fuel tank T1 having an elongated shape by the weight 10.

Further, substantially the entire area of the rear end surface of the fuel tank T1 may be opposed to the weight 10. According to this configuration, the fuel tank T1 can be more effectively protected by the weight 10.

Further, a hydraulic fluid tank T2 for storing hydraulic fluid for driving the hydraulic actuator may be provided on the side of the fuel tank T1 and at a position facing the weight 10. According to this configuration, the fuel tank T1 and the hydraulic fluid tank T2 can be effectively protected by the weight 10.

Further, the machine body 2 may have the step 49 provided on the side of the fuel tank T1.

According to this configuration, even if the fuel tank T1 is formed in a vertically long shape, fuel can be easily supplied to the fuel tank T1 by riding on the step 49 of the fuel tank T1. In addition, the working such as maintenance can be facilitated.

In addition, a fuel supply device 57 may be provided below the step 49 to supply fuel to the fuel tank T1.

According to this configuration, the fuel supply device 57 can be easily accessed, and fuel can be easily supplied to the vertically long fuel tank T1.

The working machine 1 includes the machine body 2, the operating portion 42 mounted on the machine body 2 and having the operator seat 6 and the operating device 41, the rear mounting member arranged rearward from the operating portion 42, and the floor surface (the step 49) that is a side surface of the rear mounting member provided to the rear of the operating portion 42 and to the side of the rear mounting member. The upper space (the space 46) of the floor surface is opened to the exterior of the vehicle.

According to this configuration, it is possible to form a space 46 opened to the outside of the vehicle body behind the operating portion 42, and this space 46 can be used effectively. For example, on the step 49, cleaning work, maintenance work, refueling work and the like can be performed.

In addition, the driving portion 42 is arranged in the cabin 5, the cabin 5 may have a rear window 52, and the rear window 52 may be provided at a position where the cabin 5 and the space (space 46) are communicated.

According to this configuration, the air permeability and ventilation of the cabin 5 can be improved. Further, visibility when looking at the outside of the cabin 5 through the rear window 52 is improved.

Further, the rear mounting member has the weight 10 mounted at the rear of the machine body 2 and the cover member (first cover 18A) provided between the weight 10 and the operation portion 42. The first forming surface 47, which is one side of the machine width direction K2 in the space (space 46), may be defined by the side surface of the weight 10 and the side surface of the cover member.

According to this configuration, the space 46 behind the operation portion 42 can be easily formed.

In addition, the first forming surface 47 may be located closer to the center portion in the machine width direction K2 of the machine body 2 than the center portion in the vehicle machine width direction K2 of the operating portion 42.

According to this configuration, the width of the space 46 can be increased.

In addition, the driving portion 42 may include a door 53 on the side surface of the vehicle exterior side, and at least a part of the door 53 may be accommodated in the space when the door 53 is opened.

According to this configuration, when the door 53 is opened, it can be accommodated in the orbit of the machine body 2, so that the risk of the door 53 coming into contact with an object around the machine body and being damaged can be reduced.

In addition, the floor surface is the step 49 on which the operator can ride, and a fuel tank T1 having a filler port at the top may be arranged in the vicinity of the floor surface.

According to this configuration, when the operator gets on the step 49 and performs the refueling operation, even if the vertically long fuel tank T1 is mounted, the fuel can be easily refueled.

Further, the rear window 52 may be formed at a height from the vicinity of the floor surface to the vicinity of the roof covering the upper side of the operator seat 6.

According to this configuration, it is possible to improve the visibility behind the driving portion 42.

In addition, the rear window 52 may be capable of opening and closing so as to connect the operating portion 42 and the space.

According to this configuration, by opening the rear window 52, the air permeability of the operator's foot space can be improved.

In addition, the working machine 1 includes the cabin 5 surrounding the operator seat 6, and the cabin 5 has front mounting members 251L and 251R that support the front of the cabin 5 in a vibration-proof manner to the machine body 2, and front support posts 64L and 64R provided further rearward from the front mounting members 251L and 251R.

According to this configuration, the forward and upper visibility of the operator can be improved.

In addition, the cabin 5 may include a front panel 68 which is provided in front of the front mounting members 251L and 251R and has a transparency allowing the operator to view the front.

According to this configuration, since the front columns 64L and 64R are provided at a distance rearward of the front panel 68, visibility through the front panel 68 can be improved.

In addition, the cabin 5 may have a rear support 253L provided behind the front support 64L, and the front support 64L may form an entrance 62 opened and closed by the door 53 with the rear support 253L.

According to this configuration, since the front support 64L forming the entrance 62 can be lowered rearward, visibility of the operator's front and upper can be improved.

Further, the front support columns 64L and 64R may be arranged between the front mounting members 251L and 251R and the operator seat 6 and closer to the operator seat 6 in the front-rear direction K1.

According to this configuration, the positions of the front struts 64L and 64R can be lowered sufficiently backward.

The working machine 1 has the machine body 2 capable of turning about a turning axis X1 extending in the vertical direction, the operating portion 42 mounted on the machine body 2 and having the operator seat 6 and the operating device 41, the support bracket 20 provided protruding on the machine body 2, the swing bracket 21 rotatably supported in the horizontal direction about the swing shaft 26 by the support bracket 20, and the boom 22 swingably supported in the vertical direction by the swing bracket 21. The operating portion 42 is arranged on one side in the machine width direction K2 from the center line Y1 passing through the turning axis X1 and extending in the front-rear direction. The swing shaft 26 is located at a position on the other side in the machine width direction K2 than the driving portion 42.

According to this configuration, the cabin 5 is provided on one side of the machine width direction K2 with respect to the center line Y1 passing through the turning axis X1 and extending in the front-rear direction. It is located on the other side in the machine width direction K2. That is, the center line Y1 is located on the side of the operating portion 42 and on the side where the boom 22 is arranged. Thus, the boom 22 can be arranged close to the center line Y1, and the weight balance in the machine width direction K2 of the working machine 1 can be improved.

In addition, a center line Y1 may be located between the line Y2 in the front-rear direction passing through the axial center X2 of the swing shaft 26 and the side surface on the other side of the driving portion 42.

According to this configuration, the support bracket 20, the swing bracket 21, and the boom 22 can be arranged near the center line Y1, and the weight balance in the machine width direction K2 of the working machine 1 can be improved.

Further, the swing bracket 21 may be arranged at a position where a part of the swing bracket 21 overlaps the center line Y1 when the boom 22 is in the front direction of the machine body.

Also by this configuration, the support bracket 20, the swing bracket 21 and the boom 22 can be arranged near the center line Y1, and the weight balance in the machine width direction K2 of the working machine can be improved.

In addition, the working machine 1 includes the prime mover E1 provided on the other side in the machine width direction K2 with respect to the center line Y1 of the machine body 2, and a line Y2 in the front-rear direction K1 passing through the axial center X2 of the swing shaft 26 may extend between the prime mover E1 and the operating portion 42.

According to the above configuration, the cabin 5 is arranged on one side of the machine body 2, the prime mover E1 is arranged on the other side of the machine body 2, and the swing bracket 21 and the boom 22 are provided forward between the cabin 5 and the prime mover E1. Since the base 22A of the above is located, the weight balance in the machine width direction K2 of the machine body 2 can be improved.

The working machine 1 includes the detection device 45 configured to detect the position of the boom 22 and the rotation angle of the swing bracket 21 relative to the support bracket 20, and includes the control device U1 configured to obtain the detection signal of the detection device 45 and to control the boom 22. The control device U1 may stop the boom 22 before the boom 22 interferes with the operating portion 42.

According to this configuration, it is possible to prevent the boom 22 from interfering with the driving portion 42.

The working machine 1 includes the operator seat 6, the operation base 81 arranged in front of the operator seat 6, the operation member 82 provided on the operation base 81 and configured to be operated by being gripped, and the elbow rest member 83 extending from the operation base 81 to the operator seat 6 side.

According to this configuration, the operator can operate the operation member 82 by holding an elbow on the elbow holder 83 when gripping and operating the operation member 82. Thereby, the operator's fatigue due to the long operation can be reduced.

Further, by providing the operation member 82 and the elbow rest member 83 on the operation base 81 provided in front of the operator seat 6, the operator operates the operation member 82 in a forward inclined posture in a state of sitting on the operator seat 6. Thereby, for example, in the working machine 1 in which the operator seat 6 is provided in the cabin 5, the operator's face approaches the windshield, so the visibility is improved. In addition, since the elbow rest member 83 is not on the side of the operator seat 6, the elbow rest member 83 does not become a restriction on the degree of freedom of the body width.

The operation base 81 may have a base 86 and a attachment base 93 supported on the base 86 so that the vertical position adjustment is possible, and the operation member 82 and the elbow rest member 83 may be provided on the attachment base 93.

According to this configuration, the heights of the steering member 82 and the elbow holder 83 can be adjusted in accordance with the height of the operator.

In addition, the steering member 82 includes a first steering handle 82L and a second steering handle 82R located to the side of the first steering handle 82L, and the elbow rest member 83 is aft from the rear side of the first steering handle 82L. The first arm rest 83L and the second arm rest 83R are arranged such that the distance between the first arm rest 83L and the second arm rest 83R increases toward the rear side. The opposing surfaces may be provided in an inclined manner.

According to this configuration, the operator can operate the second steering handle 82R and the second steering handle 82R in a comfortable posture (with the elbow stretched) by moving the elbow away from the torso. Moreover, the space interval of the machine width direction K2 of first armrest 83L and second armrest 83R can be taken widely.

The working machine 1 includes the traveling device 3, the floor portion 5B for supporting the operator seat 6, and the traveling operation member 85 provided on the floor 5B and operating the traveling device 3 by a stepping operation. The traveling operation member 85 includes the first traveling pedal 85L located below the one armrest 83L and a second traveling pedal 85R located below the second armrest 83R.

According to this configuration, the operator has a posture for operation placing the elbow on the front side of the operator seat 6 and gripping the first steering handle 82L and the second steering handle 82R, placing one of his feet on the first traveling pedals 85L below the first arm rest 83L, and placing the other one of his feet on the second traveling pedal 85R below the second armrest 83R. That is, conventionally, the operator is in a posture in which the knee is bent, and the operator whose posture is high has a posture in which the upper body moves upward. Thereby, the adjustment range of the front and back position of the operator seat 6 can be made small. That is, the device for adjusting the front and back position of the operator seat 6 can be made compact. Further, for example, in the working machine 1 in which the operator seat 6 is provided in the cabin 5, the dimension of the cabin 5 in the front-rear direction K1 can be made compact.

Further, the operation base 81 may have the base 86 and the attachment base 93 provided on the upper portion of the base 86. The attachment base 93 may have the main portion 93A on which the first steering handle 82L and the second steering handle 82R are mounted, the first extending portion 93L to which the first arm rest 83L is attached, the first extending portion 93L extending rearward from one side of the main portion 93A in the machine width direction, and the second extending portion 93R to which the second arm rest 83R is attached, the second extending portion 93R extending rearward from the other side of the main portion 93A in the machine width direction.

According to this configuration, the first arm rest 83L and the second arm rest 83R can be easily supported, and the support strength of the first arm rest 83L and the second arm rest 83R can be secured.

Further, the operator seat 6 may have a seat portion 6A and a backrest portion 6B, the seat portion 6A and the first extension portion 93L may partially overlap in the vertical direction, and the seat portion 6A and the second extension portion 93R may partially overlap in the vertical direction.

According to this configuration, the operator seat 6 approaches the operation base 81, and the operating portion 42 including the operator seat 6 and the operation base 81 can be made compact.

In addition, the elbow holder 83 may be pivotally supported at the front by the operation base 81 and may be pivotable upward at the rear.

According to this configuration, the operator can easily get on and off.

Further, the working machine 1 may have the slide rail 78 to adjust the position of the operator seat 6 the front-rear direction, the slide rail 78 being configured to adjust the position in the inclination direction in which the operator seat 6 is shifted upward as the operator seat 6 is moved rearward.

According to this configuration, the vertical position of the operator seat 6 can be simultaneously adjusted by adjusting the front-rear position of the operator seat 6. In addition, by simultaneously performing the adjustment of the longitudinal position and the adjustment of the vertical position of the operator seat 6, the adjustment of the operator seat 6 corresponding to the height of the operator can be performed within a small movement range in the longitudinal direction. The device for adjusting the front and back position of 6 can be made compact. Also, for example, in a working machine in which the operator seat 6 is provided in the cabin 5, the dimension of the cabin 5 in the front-rear direction K1 can be made compact.

In addition, it has a control lever (dozer lever 80) capable of swinging operation, and a lever control mechanism 133 for controlling the swinging of the control lever. The operating table 81 has a base 86 and a attachment base 93 provided on the upper side of the base 86 and to which the operation lever is attached. The lever restricting mechanism 133 has an interlocking member (rod member 135) that moves following the swing of the operating lever, and a neutral spring 141 that biases the interlocking member to return the operating lever from the swinging position to the neutral position. The interlocking member is arranged along the lower surface side of the attachment base 93 and moves in a direction along the lower surface within a predetermined range, and the neutral spring 141 may be provided along the interlocking member.

According to this configuration, the vertical width of the lever restricting mechanism 133 can be reduced. Thus, the space below the attachment base 93 can be made larger, and, for example, when a pedal is provided below the operation lever, a space for disposing the operator's leg can be secured.

The working machine 1 is provided with the floor portion 5B, the operator seat 6 arranged on the floor 5B, and the foot rest 79 provided on the floor 5B beside the operator seat 6 and on which the operator places his foot.

According to this configuration, the operator can bend and rest the leg in a state in which the foot is positioned behind the knee.

Further, the traveling device 3 may be provided with a traveling operation member 85 which is provided in front of the footrest 79 and operates the traveling device 3 by a stepping operation.

According to this configuration, the foot can be easily moved between the footrest 79 and the travel operation member 85.

Further, the foot rest portion 79 may include the first portion 79L located on one side of the operator seat 6 and include the second portion 79R located on the other side of the operator seat 6. The travel operation member 85 may include the first traveling pedal 85L located in front of the first portion 79L and include the second traveling pedal 85R located in front of the second portion 79R.

According to this configuration, movement of the foot between the first portion 79L and the first traveling pedal 85L and movement of the foot between the second portion 79R and the second traveling pedal 85R can be easily performed.

In addition, while the operator is sitting in the operator seat 6, one foot can be moved on the floor 5B from the first traveling pedal 85L to the first portion 79L, and the other foot can be moved on the floor 5B from the second traveling pedal 85R to the second portion 79R.

According to this configuration, movement of the foot between the first traveling pedal 85L and the first portion 79L and movement of the foot between the second traveling pedal 85R and the second portion 79R can be easily performed.

In addition, the working machine 1 may include the operation base 81 arranged in front of the operator seat 6 and includes the operation member 82 provided on the operation base 81 and operated by being gripped. The operation base 81 may have the base 86 standing on the floor 5B, and have the attachment base 93 attached to the upper portion of the base 86. The steering member 82 may include the first steering handle 82L arranged on one side of the attachment base 93 in the machine width direction K2, and include the second steering handle 82R arranged on the other side of the attachment base 93 in the machine width direction K2. The travel operation member 85 may include the first traveling pedal 85L provided below one side of the attachment base 93 in the machine width direction K2 and include the second traveling pedal 85R provided below the other side of the attachment base 93 in the machine width direction K2.

According to this configuration, the foot can be moved from the first traveling pedal 85L and the second traveling pedal 85R located on the operation base 81 side in front of the operator seat 6 to the foot rest portion 79 on the floor portion 5B arranged on the side of the operator seat 6, and thus the operator can bend the knee and rest the leg in a state in which the foot is positioned to the side of the operator seat 6 and behind the knee.

Further, the slide rail 78 may be provided to adjust the position of the operator seat 6 in the inclination direction in which the operator seat 6 is shifted upward as the operator seat 6 is moved rearward.

According to this configuration, by moving the operator seat 6 along the slide rail 78, it is possible to simultaneously adjust the longitudinal position and the vertical position of the operator seat 6. Further, the device for adjusting the front and rear position and the upper and lower position of the operator seat 6 can be made compact. Further, for example, in the working machine 1 in which the operator seat 6 is provided in the cabin 5, the dimension of the cabin 5 in the front-rear direction K1 can be made compact.

The working machine 1 includes the operator seat 6, the traveling device 3, and the traveling operation member 85 for operating the traveling device 3 by a stepping operation. The traveling operation member 85 includes the first traveling pedal 85L arranged on one side portion of the operator seat 6 in the machine width direction, and includes the second traveling pedal 85R arranged on the other side portion of the operator seat 6 in the machine width direction.

According to this configuration, the operator can operate the first traveling pedal 85L and the second traveling pedal 85R in a state where the distance between the left and right legs is increased. Thereby, the operability of the first traveling pedal 85L and the second traveling pedal 85R can be improved.

Further, the distance between the first traveling pedal 85L and the second traveling pedal 85R may be gradually wider as it goes forward.

According to this configuration, the operator can operate the pedal in a comfortable posture, and the operability of the first traveling pedal 85L and the second traveling pedal 85R can be improved.

In addition, the first traveling pedal 85L and the second traveling pedal 85R may be inclined such that they move downward as they go forward.

According to this configuration, for example, in the case where the operation is performed with the operator seat 6 close to the first traveling pedal 85L and the second traveling pedal 85R, bending of the ankle can be reduced because the pedals are inclined downward to the front, and the foot can be placed easily on the pedal and the pedal can be easily depressed.

In addition, the working machine 1 may include the first pedal shaft 104L positioned on the upper surface side of the first traveling pedal 85L and supporting the first traveling pedal 85L so as to be able to swing back and forth, and include the second pedal shaft 104R positioned on the upper surface side of the second traveling pedal 85R and supporting the second traveling pedal 85R so as to be able to swing back and forth.

According to this configuration, by setting the arch on the first pedal shaft 104L and the second pedal shaft 104R and placing the foot on the first traveling pedal 85L and the second traveling pedal 85R, the foot treading works even on a slope or the like, and thus the operator is hard to get tired.

The first pedal shaft 104L may be arranged rearward of the center portion of the first traveling pedal 85L in the front-rear direction K1, and the second pedal shaft 104R may be arranged rearward of the center portion of the second traveling pedal 85R in the front-rear direction K1.

According to this configuration, the first pedal shaft 104L and the second pedal shaft 104R can be easily aligned with the position of the arch.

Further, the working machine may include the floor portion 5B for supporting the operator seat 6, the control base 81 having the attachment base 93 mounted on the upper portion of the base 86 and arranged in front of the operator seat 6, the first steering handle 82L provided on one side of the attachment base 93 in the mounting width direction K2, and the second steering handle 82R provided on the other side of the attachment base 93 in the mounting width direction K2. The first traveling pedal 85L is provided below one side of the attachment base 93 in the machine width direction K2, and the second traveling pedal 85R is provided below the other side of the attachment base 93 in the mount width direction K2.

According to this configuration, it is possible to use the upper space as the taller person, and to make the front and rear direction of the operator seat 6 compact. Further, for example, in the case of the working machine 1 in which the operator seat 6 is provided in the cabin 5, the dimension of the cabin 5 can be made compact in the front-rear direction K1.

The rear of the first traveling pedal 85L may be located below one side of the operator seat 6 in the widthwise direction K2, and the second traveling pedal 85R may be located below the other side of the operator seat 6 in the widthwise direction K2.

According to this configuration, the operator seat 6 can be brought close to the first traveling pedal 85L and the second traveling pedal 85R, and the dimensions of the operating portion 42 including the operator seat 6, the first traveling pedal 85L, and the second traveling pedal 85R can be made compact in the front-rear direction K1.

The working machine 1 includes the operator seat 6, the operation base 81 provided in front of the operator seat 6, the first steering handle 82L provided on one side of the operation base 81 separating from a center portion in the machine width direction K2, the second steering handle 82R provided on the other side, and the monitor 84 provided between the first steering handle 82L and the second steering handle 82R.

According to this configuration, since the monitor 84 is provided between the first steering handle 82L and the second steering handle 82R, the movement of the eyes in checking the monitor 84 can be reduced in the case where the first steering handle 82L and the second steering handle 82R are grasped and operated. As a result, the visibility of the monitor 84 can be improved and the operability of the steering member 82 can be improved.

Further, the traveling device 3 and a traveling operation member 85 provided on the floor 5B in front of the operator seat 6 and operated by stepping to operate the traveling device 3 may be provided.

According to this configuration, the monitor 84 can be provided between the first steering handle 82L and the second steering handle 82R by the configuration to operate the traveling device 3 with the travel operation member 85 that is to be stepped on. Further, the traveling device 3 can be operated by the traveling operation member 85 while holding the first steering handle 82L and the second steering handle 82R.

Further, the operation base 81 has the base 86 standing on the floor portion 5B and the attachment base 93 fixed to the upper portion of the base 86. The monitor 84 is arranged at the center portion of the attachment base 93 in the machine width direction K2, the first steering handle 82L is arranged at one side of the attachment base 93 in the machine width direction K2, and the second steering handle 82R is arranged at the other side of the attachment base 93 in the machine width direction K2. It is arranged at the other side of the machine width direction K2. The travel operation member 85 may include the first traveling pedal 85L arranged below one side of the attachment base 93 in the machine width direction K2, and include the second traveling pedal 85R arranged below the other side of the attachment base 93 in the machine width direction K2.

According to this configuration, a space in which the operator's legs can be placed is formed below the first steering handle 82L and the second steering handle 82R, and the operator seat 6 can be brought close to the pilot bed 81. As a result, the dimension of the operation portion 42 including the operation base 81 and the operator seat 6 can be made compact in the front-rear direction K1.

The working machine 1 includes the first armrest 83L extending rearward from the rear side of the first steering handle 82L in the operation base 81, and includes the second armrest 83R extending rearward from the rear side of the second steering handle 82R in the operation base 81. The steering handle 82L and the second steering handle 82R allow the operator sitting in the operator seat 6 to place one elbow on the first arm rest 83L to grip the first steering handle 82L and place the other elbow on the second arm rest 82R. When the second steering handle 82R is gripped in the closed state, the operator may be arranged to be in a forward lean position.

According to this configuration, since the operator's eyes approach the monitor 84, the visibility of the monitor 84 can be improved.

In addition, the vehicle 2 provided with the operator seat 6 and the operation table 81 and the imaging device 43 for imaging the periphery of the vehicle 2 mat be provided, and the monitor 84 may display the image captured by the imaging device 43.

According to this configuration, the operator can easily confirm the periphery of the machine body 2 with the operation posture in which the first steering handle 82L and the second steering handle 82R are gripped. For example, when the operator holds the first steering handle 82L and the second steering handle 82R in a forward lean position, it is difficult to confirm the rear of the machine body 2. However, By providing the monitor 84 between the first steering handle 82L and the second steering handle 82R, the watching backward can be easily performed.

The first steering handle 82L, the second steering handle 82R, and the monitor 84 may be arranged side by side in the machine width direction K2.

According to this configuration, the first steering handle 82L, the second steering handle 82R, and the monitor 84 can be compactly arranged.

The working machine 1 includes the base plate 9, the prime mover room ER formed on the base plate 9, the prime mover E1 housed in the prime mover room ER, the cooling fan F1 for generating the cooling air for cooling the prime mover E1, the first discharge portion (exhaust passage 228) for discharging, to the outside of the prime mover room ER, the cooling air flowing between the engine room and the ceiling of the prime mover room ER (the bonnet upper portion 183), and the second discharge portion (guide member 213) for discharging, to the outside of the prime mover room ER, the cooling air flowing between the prime mover E1 and the bottom portion of the prime mover room ER (the base plate 9, the first partition body 208, and the second partition body 209).

According to this configuration, the flow of the cooling air for cooling the upper part and the lower part of the prime mover E1 can be made smooth to improve the cooling efficiency of the prime mover E1.

Further, an exhaust port 203 for exhausting the exhaust gas of the prime mover E1 is arranged in the prime mover room ER, and the first discharge part (exhaust passage 228) discharges, to the outside of the prime mover room ER, the cooling air flowing between the prime mover E1 and the ceiling (bonnet upper part 183) and the exhaust gas of the prime mover E1 discharged from the exhaust port 203.

According to this configuration, since the exhaust pipe for exhausting the exhaust gas of the prime mover E1 does not go out of the prime mover room ER, the protrusion can be eliminated, and the exhaust temperature of the exhaust gas of the prime mover E1 can be reduced and the exhaust noise also can be reduced.

Further, the prime mover room ER is provided with the downstream side wall (bonnet rear portion 184, pump partition 222, lateral reinforcing plate 216) which is a downstream side wall in the flow direction of the cooling air flowing above the prime mover E1. The first discharge portion (The exhaust passage 228) may be provided on the ceiling (bonnet upper portion 183), on the downstream side wall, or between the ceiling and the downstream side wall. The second discharge portion (guide member 213) may be provided on the bottom portion (the base plate 9, the first partition body 208, and the second partition body 209), on the downstream side wall, or between the bottom portion and the downstream side wall.

According to the above configuration, the cooling air flowing between the prime mover E1 and the ceiling of the prime mover room ER and the cooling air flowing between the prime mover E1 and the bottom of the prime mover room ER can be properly discharged outside the prime mover room ER.

The engine E1 further includes the hydraulic pump P1 mounted on the downstream side of the flow direction of the cooling air flowing above the prime mover E1, and includes the oil pan 217 arranged at the bottom of the prime mover E1. The prime mover room ER includes the first partition body 208 arranged on one side of the oil pan 217 and includes the second partition body 209 arranged on the other side of the oil pan 217. The second discharge portion includes a hollow guide member 213 which passes through a position below the hydraulic pump P1 through a position corresponding to the region between the first partition and the second partition in the downstream sidewall portion. The guide member 213 guides the cooling air flowing between the first partition 208 and the second partition 209 from inside the prime mover room ER through the lower side of the hydraulic pump P1 to the outside of the prime mover room ER.

According to the above configuration, the cooling air flowing below the prime mover E1 can be properly discharged.

In addition, the surface of the ceiling portion on the side of the prime mover E1 may have a flat surface shape or a shape that changes smoothly along the flow direction of the cooling air. In addition, the prime mover room ER is provided with side walls (first bonnet side 181 and second bonnet side 182) on the side surface in the direction substantially perpendicular to the flow direction of the air flowing above the prime mover room ER. The surface on the prime mover E1 side of the wall may have a flat surface shape or a shape that changes smoothly along the flow direction of the cooling air.

In addition, the ceiling portion includes the upper cover 206 and the lower cover 207 provided below the upper cover 206, and is sucked by the prime mover E1 into the air intake chamber 204 partitioned by the upper cover 206 and the lower cover 207. The air cleaner 201 for purifying air is provided.

According to the above configuration, it is possible to prevent the air cleaner 201 from obstructing the flow of the cooling air.

The working machine 1 includes the machine body 2, the operator seat 6 mounted on the machine body 2, the prime mover E1 mounted on the side of the operator seat 6 in the machine body 2, the first bonnet side portion 181 covering the operator seat 6 side of the prime mover E1, and the covering member (third cover body 17) for covering the arrangement portion of devices (swivel joint S1, turn motor M3, control valve V1) provided between the first bonnet side portion 181 and the operator seat 6. The side surface of the cover member on the side of the prime mover E1 is arranged adjacent to and facing the first bonnet side portion 181 and covers the side of the first bonnet side portion 181.

According to this configuration, it is possible to form a sound insulating mechanism of double structure on the side of the driving seat 6 side of the prime mover room ER by the first bonnet side portion 181 and the cover member. Thereby, it can be effectively suppressed that the sound of the prime mover E1 is transmitted to the operator seat 6 side.

Further, the surface on the side of the prime mover E1 in the first bonnet side portion 181 may have a flat surface shape or a shape that changes smoothly along the flow direction of the cooling air that cools the prime mover E1.

According to this configuration, it is possible to improve the flow of the cooling air flowing on the side of the prime mover E1.

In addition, a second bonnet side 182 covering the side opposite to the operator seat 6 of the prime mover E1 is provided, and the second bonnet side 182 covers the side of the prime mover room ER housing the prime mover E1 openable and closable. An openable/closable bonnet 193 may be provided, and the openable/closable bonnet 193 may have an outer cover member 193A which is an outer side wall portion and an inner cover member 193B which is an inner side wall portion.

According to this configuration, the outer cover member 193A and the inner cover member 193B can form a double-layered noise insulation structure with the side opposite to the operator seat 6 of the prime mover E1. This makes it possible to suppress the sound of the prime mover E1 from leaking out of the prime mover room ER. In addition, even if the second bonnet side portion 182 is formed in a double structure, the prime mover E1 can be accessed in one action by opening the openable/closable bonnet 193.

Further, the surface of the inner cover member 193B on the prime mover E1 side may have a flat surface shape or a shape smoothly changing along the flow direction of the cooling air that cools the prime mover E1.

According to this configuration, it is possible to improve the flow of the cooling air flowing on the side of the prime mover E1.

Further, a side plate is provided with a bonnet upper portion 183 covering the upper side of the prime mover E1, and the second bonnet side portion 182 supports the bonnet upper portion 183 together with the first bonnet side portion 181 and has an opening 182B formed therein. It may have 182A.

According to this configuration, the side plate 182A has a function of supporting the bonnet upper portion 183 and a function of covering the periphery of the opening 182B opened and closed by the openable/closable bonnet 193, so that the structure can be simplified.

Further, the bonnet upper portion 183 includes an upper cover 206 and an upper cover 207 provided below the upper cover 206. The upper cover 207 is provided across the first bonnet side portion 181 and the side plate 182A. The portion 206 may protrude from the first bonnet side portion 181 to the operator seat 6 and may protrude from the side plate 182A to the opposite side to the operator seat 6.

According to this configuration, water on the upper cover 206 can be prevented from intruding into the first bonnet side portion 181 and the side plate 182A side, which in turn prevents water from intruding into the prime mover room ER. As a result, rust can be prevented.

Further, the working machine may include the bonnet rear portion 184 provided over the first side bonnet 181 and the side plate 182A and covering the rear of the prime mover E1, and includes a rear cover body (fourth cover body 18) covering a member provided behind the bonnet rear 184.

According to this configuration, the rear of the prime mover E1 can be made into a double-layered noise insulation structure by the bonnet rear portion 184 and the rear cover body. This makes it possible to suppress the sound of the prime mover E1 from leaking out of the prime mover room ER.

The working machine may include the base plate 9 constituting the bottom portion of the machine body 2 and include the partition (first partition 208) provided between the base plate 9 and the first side bonnet 181.

According to this configuration, it is possible to prevent the sound of the prime mover E1 from flowing from the lower side of the first side hood 181 to the operator seat 6 side by the partition body.

Further, the cover member is rotatably supported about an axis whose rear upper portion extends in the machine width direction K2 and swings upward and opens.

According to this configuration, the equipment provided between the first bonnet side portion 181 and the operator seat 6 can be inspected.

In addition, the first bonnet side portion 181 has a cover plate 181B for closing an opening 181C accessible to the prime mover E1, and the cover plate 181B is removable with the cover member opened.

According to this configuration, the prime mover E1 can be accessed from the operator seat 6 side.

The working machine may include the second bonnet side 182 covering the side opposite to the operator seat 6 of the prime mover E1. The second bonnet side 182 includes the open/close bonnet 193 covering the side of the prime mover room ER housing the prime mover E1. The open/close bonnet 193 is pivotally supported at its rear portion so as to be rotatable about the vertical axis and is swung to be opened to the outside of the machine body.

According to this configuration, it is possible to access the prime mover E1 from the outboard side.

In addition, a cover (first cover 15) covering equipment (radiator R1, oil cooler O1, condenser D1, fuel cooler N1 and battery BT) arranged in front of the prime mover E1 is provided, and the cover has a rear upper portion It is pivotally supported about an axis extending in the width direction of the machine and swings upward and opens.

According to this configuration, it is possible to access the equipment housed in the cover from the front of the vehicle body.

In addition, a hydraulic pump P1 attached to the rear of the prime mover E1 is provided, and the rear cover body covers the rear of the hydraulic pump P1 and is rotatably supported about the longitudinal axis on the outer side of the machine. It has a cover part (third cover 18C) that opens by swinging.

According to this configuration, the hydraulic pump P1 can be accessed from the rear of the machine body.

In addition, the working machine include the operating portion 42 mounted on the machine body 2 and having the control device 41 and the operator seat 6, and the rear mounting member (first cover 18A, weight 10) arranged rearward of the operation area 42 in the machine body 2, and the step 49 on which the operator can step on, the step 49 being provided behind the driving portion 42 in the machine body 2 and on the side of the rear mounting member. The step 49 is supported pivotally about the axis extending in the horizontal direction (longitudinal direction K1), and pivots upward to be opened.

According to this configuration, the devices arranged below the step 49 can be easily accessed.

The working machine includes the hydraulic fluid tank T2 to store the hydraulic fluid for driving the hydraulic actuator, and the cover (second cover 18B) covering the upper side of the hydraulic fluid tank T2. The hydraulic fluid tank T2 is mounted on the rear of the arrangement portion for devices in the machine body 2. The cover is pivotally supported rotatably about an axis in the front-rear direction K1 on the machine inward side, and pivots upward to be opened.

According to this configuration, the hydraulic fluid tank T2 can be accessed from above, and maintenance of the hydraulic fluid T2 can be performed.

The working machine 1 includes the machine body 2, the prime mover E1 mounted on the machine body 2, the hydraulic pump P1 attached to the prime mover E1, and the pump partition 222 which separates the prime mover room ER accommodating the prime mover E1 from the hydraulic device arrangement portion in which the hydraulic pump P1 is arranged.

According to this configuration, the hydraulic device placement portion 13 in which the hydraulic pump P1 is arranged can be partitioned from the prime mover room ER by the pump partition 222, and the temperature rise in the hydraulic device placement portion 13 due to the heat of the prime mover E1 can be suppressed.

In addition, the working machine includes the bonnet (second cover body 16) covering the prime mover E1. The pump partition 222 may be provided between the prime mover E1 and the bonnet to cover the periphery of the hydraulic pump P1 and may be opened to the hydraulic device placement portion 13 side.

According to this configuration, the prime mover room ER and the hydraulic device arrangement portion 13 can be partitioned well, and the heat of the prime mover E1 can be suppressed from being transmitted to the hydraulic device arrangement portion 13.

The pump partition 222 has a cylindrical shape protruding from the insertion hole 223 formed in the bonnet to the prime mover room E1 side. The end of the pump partition 222 on the hydraulic device arrangement portion 13 side is attached to an edge of the insertion hole 223 formed in the bonnet. A part of the hydraulic pump P1 on the hydraulic device placement portion 13 side may protrude from the pump partition 222 to the hydraulic device placement portion 13 side.

According to this configuration, it can be suppressed that the heat of the prime mover E1 is transmitted to the hydraulic device arrangement portion 13.

Further, the working machine 1 includes the guide member 213 provided below the hydraulic pump P1 and configured to guide the cooling air discharged from the prime mover room ER to the outside of the prime mover room ER, the first partition plate 214L provided on one side of the guide member 213 and configured to separate the prime mover room ER from the hydraulic device arrangement portion 13, and the second partition plate 214R provided on the other side of the guide member 213 and configured to separate the prime mover room ER from the hydraulic device arrangement portion 13. The lower portion of the bonnet may be connected to the first partition plate 214L and the second partition plate 214R.

According to this configuration, it is possible to form a cooling route which allows the cooling air flowing in the lower part of the prime mover E1 to flow backward while partitioning the rear of the prime mover room ER, thereby improving the partition of the rear of the prime mover room ER and improving the cooling efficiency.

Further, the working machine 1 includes the support frame (rear support frame 147) having the first support post (first rear support post 147A) standing on the machine body 2 at one side of the hydraulic pump P1, the second support post (second rear support post 147B) arranged at the other side of the hydraulic pump P1, and a beam member (first beam member 147D) for connecting the upper portions of the first support post and the second support post. The bonnet may include the first side plate 181A arranged on one side with respect to the prime mover E1 and is fixed to the first support post, the second side plate 182A arranged on the other side with respect to the prime mover E1 and is fixed to the second support post, and the wall portion (bonnet back part 184) provided over the first side plate 181A and the second side plate 182A.

According to this configuration, the bonnet can be firmly supported.

The working machine 1 includes the machine body 2, the radiator R1 mounted on the machine body 2, the oil cooler O1 arranged at a first position facing the radiator R1, the radiator bracket 148 to which the radiator R1 is attached, and the oil cooler bracket 162 to which the oil cooler O1 is attached. The oil cooler bracket 162 is removably attached to the radiator bracket 148, and can move the oil cooler O1 to a position farther from the radiator R1 than the first position by removing the oil cooler O1 from the radiator bracket 148.

According to this configuration, by removing the oil cooler bracket 162 from the radiator bracket 148, a space sufficient for cleaning can be created between the radiator R1 and the oil cooler O1, and thus the radiator R1 and the oil cooler O1 can be easily cleaned.

In addition, a moving space for moving the oil cooler O1 may be provided on the side of the oil cooler O1 opposite to the radiator R1.

According to this configuration, the cleaning space 164 can be easily formed between the radiator R1 and the oil cooler O1.

In addition, when the moving space 163 capable of forming cleaning space 164 is provided in front of oil cooler O1, there is nothing to significantly impede the flow of cooling air in front of oil cooler O1, so the suction resistance of the cooling air can be reduced.

The radiator bracket 148 also may have the first attachment portions 152L and 152R, and the second attachment portions 159L and 159R provided below the first attachment portions 152L and 152R. The oil cooler bracket 162 may include the fixing portions 165L and 165R detachably fixed to the first attachment portions 152L and 152R by the fixing tools 145L and 145R, and the engagement portions 165L and 165R detachably engaged with the second attachment portions 159L and 159R. The second attachment portions 159L and 159R may include the insertion hole 161 opened upward. Each of the engagement portions 168L and 168R may have the engagement member 169 which is inserted from above into the insertion hole 161, and the contacting portion 170 which is held in contact with the upper surfaces of the second attachment portions 159L and 159R.

According to this configuration, the engagement portions 168L and 168R can be attached to and detached from the second attachment portions 159L and 159R by inserting and removing the engagement member 169 with respect to the insertion hole 161, and thus the attachment of the oil cooler bracket 162 can be easily detached.

In addition, the radiator bracket 148 may have the lower support portion 160 supporting the lower portion of the radiator R1, and the second attachment portions 159L and 159B may be arranged below the lower support portion 160.

According to this configuration, in the case where the lower portion of the radiator R1 is attached to the lower support portion 160, the second attachment portions 159L and 159R do not intervene the attachment of the radiator R1, and thus the radiator R1 can be attached easily.

The working machine may have a support frame (the front support frame 146) standing on the machine body 2. The radiator bracket 148 may be provided with a first bracket 149 attached to the upper portion of the support frame and having the first attachment portions 152L and 152R, and a second bracket 150 attached to the lower portion of the support frame and having the second attachment portions 152L and 152R.

According to this configuration, the support frame can be attached to the machine body 2 in a state in which the radiator bracket 148 and the radiator R1 are assembled to the support frame (in sub-assembly state), and thus the assembly can be facilitated.

In addition, the working machine may include a support frame (the front support frame 146) standing on the front portion of the side portion of the machine body 2, and a cover body (the first cover body 15) covering the radiator R1 and the oil cooler O1 and supported by the support frame so as to be able to swing upward and downward. The radiator R1 may be arranged on the front side of the support frame, the oil cooler O1 may be arranged on the front side of the radiator R1, and the cover body may be pivotally supported by the support frame and pivots upward to open the front the oil cooler O1. According to this configuration, when the cover body is swung upward to be opened, the front of the oil cooler O1 is opened, and the movement of the oil cooler O1 can be easily performed. In this manner, the radiator R1 and the oil cooler O1 can be easily cleaned.

In addition, the working device may include a cover body (the first cover body 15) covering the radiator R1 and the oil cooler O1, the prime mover E1 arranged behind the radiator R1, the cooling fan F1 arranged between the prime mover E1 and the radiator R1 and configured to generate a cooling air flowing backward. The cover body may have the outside air intake port 19 in the side surface of the front portion, the outside air intake port 19 being configured to take outside air into the cover body.

According to this configuration, by arranging the outside air inlet port 19 in the side surface of the front portion of the cover body, an obstacle such as a branch of tree can be prevented from sticking to the outside air inlet port 19 while the working machine 1 travels forward.

In addition, the working machine may include the condenser D1 for cooling the refrigerant of the air conditioner, and a condenser bracket 171 to which the condenser D1 is attached, the condenser bracket 171 attached to the oil cooler bracket 162. According to this configuration, the condenser D1 can be easily cleaned.

The hydraulic fluid tank structure includes the tank main body 28 storing hydraulic fluid, the partition wall 31 dividing the inside of the tank main body 28 into the upper chamber 28K on the upper side and the lower chamber 28 L on the lower side, the main passage 38 arranged on a center portion of the partition wall 31 and communicating the upper chamber 28K and the lower chamber 28L, the suction pipe 30 configured to output the hydraulic fluid of the lower chamber 28L to outside of the tank, and the return pipe 29 configured to output the operation fluid returning to the tank main body 28 to the upper chamber 28K. The return pipe 29 is arranged such that the flow direction of the hydraulic fluid flowing from the return pipe into the upper chamber 28K is different from the direction toward the main passage 38.

According to this configuration, the return hydraulic fluid flows into a position separating from the main passage 38 in the upper chamber 28K, and causes a flow of hydraulic fluid flowing around the main passage 38. In this manner, the return hydraulic fluid is well mixed with the hydraulic fluid in the tank main body 28, and temperature unevenness of the hydraulic fluid can be suppressed.

In addition, the tank main body 28 can be reinforced by the partition wall 31. By reinforcing the tank main body 28, it is possible to prevent the occurrence of deformation and abnormal noise caused by the internal pressure of the tank main body 28.

In addition, the return pipe 29 may be arranged so that the flow direction is directed in a direction inclined to a horizontal direction with respect to the direction toward the main passage 38.

According to this configuration, the flow of hydraulic fluid flowing around the main passage 38 is generated well.

In addition, the tank main body 28 may have the upper wall 28A, the lower wall 28B, and a plurality of vertical walls connecting the upper wall 28A and the lower wall 28B. The plurality of vertical walls may include the first vertical wall 28C to which the return pipe 29 is attached, the second vertical wall 28D opposed to the first vertical wall 28C, and the third vertical wall 28E arranged in a direction from the first vertical wall 28C toward the second vertical wall 28D. The return pipe 29 may be arranged such that the flow direction is directed to the second vertical wall 28D and is biased from the main passage 38 toward the third vertical wall 28E.

According to this configuration, the flow of the hydraulic fluid can be generated well along the inner surface of the tank main body 28, and the return hydraulic fluid can be well mixed with the hydraulic fluid in the tank main body 28.

In addition, the return pipe 29 may be arranged closer to the partition wall 31 than the upper center portion and lower center portion of the upper chamber 28K.

According to this configuration, the outlet port 29b of the return pipe 29 can be positioned below the oil surface even if the oil level of the hydraulic fluid is lowered in the tank main body 28.

In addition, the working machine may have a clearance passage (from the first passage 40A to the fourth passage 40D) which is formed of the edge portion of the partition wall 31 and the inner surface of the tank main body 28 and communicates the upper chamber 28K and the lower chamber 28L.

According to this configuration, air bubbles contained in the operation fluid of the lower chamber 28L can be removed to the upper chamber 28K even when the tank main body 28 is inclined. In addition, since the hydraulic fluid in the upper chamber 28K flows to the lower chamber 28L through the main passage 38 and the clearance passage, the hydraulic fluid in the upper chamber 28K and the hydraulic fluid in the lower chamber 28L can be well mixed each other.

In addition, the tank main body 28 may be formed in a prismatic shape, and the clearance passage may include the passages (the first passage 40A to the fourth passage 40D) provided at the plurality of corner portions 28G to 28J of the tank main body 28.

According to this configuration, even if the tank main body 28 is inclined, air bubbles contained in the hydraulic fluid of the lower chamber 28L can be removed from any of the plurality of passages of the tank main body 28 to the upper chamber 28K. In addition, since the hydraulic fluid in the upper chamber 28K flows to the lower chamber 28L through the main passage 38 and the passages 40A to 40D of the corner portions of the tank main body 28 because the hydraulic fluid in the lower chamber 28L is sucked through the suction pipe 30, the hydraulic fluid of the upper chamber 28 K and the hydraulic fluid of the lower chamber 28 L can be mixed together further well.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A working machine comprising:
an operator seat;
an operation base arranged in front of the operator seat;
an operation member arranged on the operation base and configured to be gripped and moved;
an armrest member extending from the operation base toward a side of the operator seat;
a traveling device;
a floor portion supporting the operator seat; and
a traveling operation member arranged on the floor portion and configured to operate the traveling device in accordance with a pedaling operation,
wherein the operation member includes:
a first operation handle; and
a second operation handle positioned beside the first operation handle,
wherein the armrest member includes:
a first armrest extending backward from a back side of the first operation handle; and
a second armrest extending backward from a back side of the second operation handle,
wherein the first arm rest and the second arm rest are arranged to have opposed surfaces that extend backward gradually separating from each other, and
wherein the traveling operation member includes:
a first traveling pedal arranged below the first armrest; and
a second traveling pedal arranged below the second armrest.

2. The working machine according to claim 1,
wherein the operation base includes:
a base platform; and
an attachment platform supported by the base platform and configured to be moved upward and downward,
and wherein the operation member and the armrest member is arranged on the attachment platform.

3. The working machine according to claim 1,
wherein the operator seat is configured to adjust a position in a longitudinal direction.

4. The working machine according to claim 1,
wherein the operation base includes:
a base platform; and
an attachment platform arranged on an upper portion of the base platform, the attachment platform including:
a main portion to which the first operation handle and the second operation handle are attached;
a first extending portion to which the first armrest is attached, the first extending portion extending backward from one side of the main portion in a machine width direction; and
a second extending portion to which the second armrest is attached, the second extending portion extending backward from the other side of the main portion in the machine width direction.

5. The working machine according to claim 4,
wherein the operator seat includes:
a seat portion partially overlapped with the first extending portion in a vertical direction and partially overlapped with the second extending portion in the vertical direction; and
a backrest.

6. The working machine according to claim 1,
wherein the armrest member includes:
a front portion pivotally supported by the operation base; and
a rear portion movable upward and downward.

7. The working machine according to claim 1, comprising a slide rail on which the operator seat move gradually upward sliding backward in an inclining direction such that the slide rail adjusts a position of the operator seat in a front-rear direction.

8. The working machine according to claim 1, comprising:
an operation lever to be swung; and
a lever limitation mechanism to limit swinging of the operation lever,
wherein the operation base includes:
a base platform; and
an attachment platform on which the operation lever is supported, the attachment platform being provided on an upper portion of the base platform,
wherein the lever limitation mechanism has:
a synchronization member to move in synchronization with the swinging of the operation lever; and
a neutral spring to push the synchronization member to return the operation lever from a swinging position to a neutral position,
wherein the synchronization member is arranged along a lower surface of the attachment platform and configured to move within a predetermined range in a direction extending along the lower surface,
and wherein the neutral spring is arranged along the synchronization member.

9. A working machine, comprising:
an operator seat;
an operation base arranged in front of the operator seat;
an operation member arranged on the operation base and configured to be gripped and moved;
an armrest member extending from the operation base toward a side of the operator seat;
a floor portion; and
a footrest on which a foot of an operator can be placed, the footrest is provided on the floor portion and on a side of the operator seat;
a traveling device; and
a traveling operation member arranged in front of the footrest and configured to operate the traveling device in accordance with a pedaling operation,
wherein the footrest includes:
a first portion arranged on one side of the operator seat; and
a second portion arranged on the other side of the operator seat, and
wherein the traveling operation member includes:
a first traveling pedal arranged in front of the first portion; and
a second traveling pedal arranged in front of the second portion.

10. The working machine according to claim 9,
wherein the first portion allows one of feet of the operator seated on the operator seat to move from the first traveling pedal to the first portion,
and wherein the second portion allows the other one of feet of the operator seated on the operator seat to move from the second traveling pedal to the second portion.

11. A working machine, comprising:
an operator seat;
an operation base arranged in front of the operator seat;
an operation member arranged on the operation base and configured to be gripped and moved;
an armrest member extending from the operation base toward a side of the operator seat;

a first operation handle arranged on a portion closer to one side of the operation base from a center portion of the operation base in a machine width direction;

a second operation handle arranged on a portion closer to the other side of the operation base from the center portion of the operation base in the machine width direction; and a monitor arranged between the first operation handle and the second operation handle, wherein the first operation handle, the monitor, and the second operation handle are arranged side by side in the machine width direction and overlap one another in a lateral view in the machine width direction.

12. The working machine according to claim 11, comprising a traveling device; and a traveling operation member arranged on a floor portion, the floor portion being provided in front of the operator seat, and configured to operate the traveling device in accordance with a pedaling operation, wherein the operation base includes:

a base platform arranged standing on the floor portion; and an attachment platform attached on an upper portion of the base platform, wherein the monitor is arranged on a center portion of the attachment platform in the machine width direction, wherein the first operation handle is arranged on one side of the attachment platform in the machine width direction, wherein the second operation handle is arranged on the other side of the attachment platform in the machine width direction, and wherein the traveling operation member includes:

a first traveling pedal arranged below one side portion of the attachment platform in the machine width direction; and a second traveling pedal arranged below the other side portion of the attachment platform in the machine width direction.

13. The working machine according to claim 11, comprising:

a first armrest extending backward from a back side of the first operation handle; and a second armrest extending backward from a back side of the second operation handle, wherein the first operation handle and the second operation handle are arranged on positions at which an operator seated on the operator seat takes a forward-bent posture when the operator places one arm on the first armrest and grips the first operation handle and the operator places the other arm on the second armrest and grips the second operation handle.

14. The working machine according to claim 11, comprising:

a machine body on which the operator seat and the operator base are mounted; and an imaging device to image periphery of the machine body, wherein the monitor is configured to display an image taken by the imaging device.

15. The working machine according to claim 12, wherein a clearance between the first traveling pedal and the second traveling pedal is gradually increased extending forward.

16. The working machine according to claim 12, wherein the first traveling pedal has an inclining position that inclines gradually downward extending forward, and wherein the second traveling pedal has an inclining position that inclines gradually downward extending forward.

17. The working machine according to claim 12, comprising:

a first pedal shaft arranged on a side of an upper surface of the first traveling pedal and configured to support the first traveling pedal, the first pedal shaft allowing the first traveling pedal to move forward and backward; and a second pedal shaft arranged on a side of an upper surface of the second traveling pedal and configured to support the second traveling pedal, the second pedal shaft allowing the second traveling pedal to move forward and backward.

18. The working machine according to claim 17, wherein the first pedal shaft is arranged behind a center portion of the first traveling pedal in a front-rear direction, and wherein the second pedal shaft is arranged behind a center portion of the second traveling pedal in a front-rear direction.

* * * * *